(12) United States Patent
Noda et al.

(10) Patent No.: US 7,249,363 B2
(45) Date of Patent: Jul. 24, 2007

(54) SPINDLE MOTOR, INFORMATION RECORDING AND REPRODUCING APPARATUS HAVING A SPINDLE MOTOR, AND MANUFACTURING METHOD OF SPINDLE MOTOR

(75) Inventors: Hiromitsu Noda, Osaka (JP); Shigeo Obata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 513 days.

(21) Appl. No.: 10/195,950

(22) Filed: Jul. 16, 2002

(65) Prior Publication Data

US 2003/0031114 A1   Feb. 13, 2003

(30) Foreign Application Priority Data

| Jul. 17, 2001 | (JP) | ............................ 2001-216348 |
| Jul. 17, 2001 | (JP) | ............................ 2001-216349 |
| Jul. 18, 2001 | (JP) | ............................ 2001-217766 |
| Jul. 18, 2001 | (JP) | ............................ 2001-217767 |
| Jul. 18, 2001 | (JP) | ............................ 2001-217769 |

(51) Int. Cl.
*G11B 23/03* (2006.01)

(52) U.S. Cl. ..................................... 720/721

(58) Field of Classification Search ............... 369/269; 720/721; 360/98.07, 99.04, 99.08
See application file for complete search history.

(56) References Cited

U.S. PATENT DOCUMENTS

| 5,536,088 | A   | 7/1996 | Cheever et al. |
| 5,559,382 | A   | 9/1996 | Oku et al. |
| 5,715,116 | A * | 2/1998 | Moritan et al. .......... 360/99.08 |
| 6,172,847 | B1  | 1/2001 | Sakatani et al. |
| 6,211,592 | B1  | 4/2001 | Ichiyama |
| 6,674,200 | B2 * | 1/2004 | Tokunaga .................... 310/90 |
| 2003/0185473 | A1 * | 10/2003 | Gomyo et al. ............. 384/107 |

FOREIGN PATENT DOCUMENTS

| DE | 42 21 429 A | 1/1993 |
| EP | 0 392 500 A | 10/1990 |
| JP | 04-111256 A | 4/1992 |
| JP | 06-189493   | 7/1994 |
| JP | 07-164251   | 6/1995 |
| JP | 07-312066   | 11/1995 |
| JP | 08-130582   | 5/1996 |

(Continued)

OTHER PUBLICATIONS

Partial European Search Report for EP 02 01 5679, dated Oct. 24, 2003.

*Primary Examiner*—Hoa T. Nguyen
*Assistant Examiner*—Mark Blouin
(74) *Attorney, Agent, or Firm*—RatnerPrestia

(57) ABSTRACT

A spindle motor of small size, thin type, high reliability, and high performance suited to an information recording and reproducing apparatus is presented. Specifically, a rotary disk is composed by integrally forming a disk board, and a rotary shaft of spindle motor, and a bearing is composed by forming dynamic pressure generating grooves in the rotary shaft of the rotary disk. As a result, small size and thin structure are realized, surface deflection of the disk during rotation of the spindle motor, and its axial center deflection are substantially decreased, and moreover the recording density is enhanced, the number of constituent parts is curtailed, and the cost is saved.

14 Claims, 43 Drawing Sheets

FOREIGN PATENT DOCUMENTS

| | | |
|---|---|---|
| JP | 11-018384 A | 1/1999 |
| JP | 2000-121986 | 4/2000 |
| JP | 2000-197309 | 7/2000 |
| JP | 2000-350408 | 12/2000 |
| JP | 2001-099141 | 4/2001 |
| WO | WO 98/48188 A | 10/1998 |
| WO | WO 01/18413 A | 3/2001 |

* cited by examiner

SPINDLE MOTOR, INFORMATION RECORDING AND REPRODUCING APPARATUS HAVING A SPINDLE MOTOR, AND MANUFACTURING METHOD OF SPINDLE MOTOR

TITLE OF THE INVENTION

Spindle motor, information recording and reproducing apparatus having a spindle motor, and manufacturing method of spindle motor

FIELD OF THE INVENTION

The present invention relates to an apparatus for recording and reproducing information by making use of information recording media such as magnetic disk and optical disk, and more particularly to a fluid bearing spindle motor optimum for recording and reproducing information at high density, an information recording and reproducing apparatus having such fluid bearing spindle motor, and a manufacturing method of fluid bearing spindle motor.

BACKGROUND OF THE INVENTION

Various information appliances are used recently, and there is a mounting need for increasing the memory capacity in magnetic disk apparatuses, and high density recording is demanded more and more. In this trend, high reliability is needed together with high precision of rotation of disk and the bearing device for spindle motor of a magnetic disk apparatus is desired to be smaller in rotation deflection of shaft or surface deflection of disk in order to enhance the recording density. To meet such demands, instead of ball bearings, dynamic pressure fluid bearings of small vibrations have come to be used widely in these apparatuses.

A conventional spindle motor, an information recording and reproducing apparatus having such spindle motor, and a manufacturing method of spindle motor are explained below by referring to the accompanying drawings.

FIG. 38 and FIG. 39 are drawings explaining the principal mechanical parts of a spindle motor using a dynamic pressure fluid bearing widely used in information appliances including the apparatus for recording and reproducing information by making use of magnetism, and the principal mechanical parts of the information recording and reproducing apparatus using such spindle motor, and more specifically FIG. 38 is a schematic sectional view of principal structure of information recording and reproducing apparatus having spindle motor, and FIG. 39 is a schematic sectional view partially magnifying the area near the lubricant sump in the spindle motor using a dynamic pressure fluid bearing. In FIG. 38 and FIG. 39, components corresponding to the elements in FIG. 1A relating to a first exemplary embodiment of the invention described later are identified with same reference numerals as in FIG. 1A.

In FIG. 38, a rotating element 380 is composed of a columnar rotary shaft 382 which is a shaft member having a rotor hub 381 fixed as a rotating member, a rotor yoke 11 integrally coupled to the rotor hub 381, and a rotary magnet 12 magnetized in plural poles being affixed to the rotor yoke 11. On the other hand, a stator 16 is composed of an iron core 14 fixed on a base 10 and disposed oppositely to the inner circumference of the rotary magnet 12, and a coil 15 wound around the iron core 14. A bearing sleeve 7 which is a fixed side bearing on which the columnar rotary shaft 382 as a shaft member is rotatably fitted about the rotation center axis 1 is fixed to the base 10. Further, at the lower end of the bearing sleeve 7, there is a thrust plate 8a fixed to a thrust support plate 8, and the spherical lower end 832a of the rotary shaft 382 is supported in the thrust direction.

In the inner circumference of the bearing sleeve 7, a lubricant sump 383 of an annular recess is disposed closely to the upper opening end. The portion from the upper end of the lubricant sump 383 to the opening end of the bearing sleeve 7 forms a lubricant holding area (an excess oil region) 384 which is a cylindrical fluid holding portion of a specified length along the outer circumference of the rotary shaft 382.

The bearing gap between the rotary shaft 382 and bearing sleeve 7 is filled with a dynamic pressure lubricant 21 for generating a dynamic pressure, and on the surface of the thrust plate 8a facing the lower end 382a of the rotary shaft 382, a shallow groove is formed for obtaining a support force in the thrust direction by generating a dynamic pressure in the lubricant. On the outer circumference of the rotary shaft 382, first and second radial dynamic pressure generating grooves 382b, 382c of herringbone shape are formed upward from the lower end, having widths $L_1$ and $L_2$ in the axial direction, with the central distance between the widths $L_1$ and $L_2$ being L.

When the coil 15 of the stator 16 is excited by a driving current supplied through a drive and control circuit (not shown) of the information recording and reproducing apparatus, the rotary magnet 12 rotates together with the rotary shaft 382, thereby composing a spindle motor.

A disk board 385 on which a recording medium layer is formed is placed on the flange 381a of the rotor hub 381 of the spindle motor, and is pressed and fixed to the flange 381a of the rotor hub 381 by other end of a pressure spring 386 of which one end is fixed in a groove formed in the rotary shaft 382. By integrally fixing the disk board 385 together with the rotating element 380 comprising the rotor hub 381 and rotary magnet 12, the disk board 385 is rotated along with rotation of the spindle motor, and by recording and reproducing in the disk board 385 by a known method, by using a magnetic head (not shown) mounted on a slider, or an optical pickup (not shown) having an objective lens for focusing the light, an information recording and reproducing apparatus is composed.

When the rotary shaft 382 is rotated by the spindle motor having such dynamic pressure fluid bearing, the dynamic pressure lubricant 21 in the bearing gap is sucked into the center of the radial dynamic pressure generating grooves 382b, 382c, and a dynamic pressure for obtaining a supporting force in the radial direction is generated. By such dynamic pressure fluid bearing, the rotary shaft 382 during rotation is kept free from contact with the inner circumference of the bearing sleeve 7. Since the rotary shaft 382 rotates without contacting with the bearing sleeve 7, rotation deflection of shaft or surface deflection of disk board 385 can be decreased, and the reliability of the information recording and reproducing apparatus can be enhanced together with the rotation precision of the disk board.

In the spindle motor having such dynamic pressure fluid bearing, the dynamic pressure lubricant 21 may flow out from the opening in the bearing sleeve 7 during rotation, or the dynamic pressure lubricant 21 may overflow in the assembling process, or the dynamic pressure lubricant 21 may ooze out due to thermal expansion of the dynamic pressure lubricant 21 by temperature rise. To avoid such troubles of flowing-out or oozing-out of the dynamic pressure lubricant 21, and also to prevent overflow of dynamic pressure lubricant 21 due to lack of capacity of the lubricant sump 383, a technology is proposed, for example, in Japanese Patent Publication No. JP2000-121986. According to this proposal, as shown in FIG. 39, a lubricant sump 383 of annular groove is provided in the inner circumference of the bearing sleeve 7, and the upward groove end forming the lubricant sump 383, that is, the upper end 383a of the end face at the opening end side of the bearing sleeve 7 is inclined in a reverse taper. In this proposed method, the opening width in the axial direction of the lubricant sump 383 is smaller than the width of the bottom of the lubricant sump 383, and the length in the axial direction of the lubricant holding part (excess oil region) 384 is substantially increased by the corresponding portion. That is, the upper end 383a of the lubricant sump 383 is formed in a reverse taper to increase the inner volume of the lubricant sump 383 and the lubricant holding portion (excess oil region) 384 is extended, and thereby it is intended to avoid troubles of flowing-out or oozing-out of the dynamic pressure lubricant 21.

The grooves for generating the dynamic pressure of the spindle motor having such dynamic pressure fluid bearing can be formed by plastic processing method such as etching, shot blasting, shot peening, or ball rolling. For example, as disclosed in Japanese Patent Publication No. JP7-164251, using a downsized rolling die device, an inexpensive technology for processing grooves for generating dynamic pressure in the rotary shaft is proposed, in which the portion not forming dynamic pressure generating grooves is preliminarily formed by cutting process or the like, and then herringbone grooves for generating dynamic pressure are formed by rolling in the rotary shaft.

However, in the conventional configuration of the information recording and reproducing apparatus having the spindle motor or the disk board 385 mounted on the flange 381a of the rotor hub 381 of the spindle motor, the rotor hub 381 is fixed to the rotary shaft 382, and further the disk board 385 is held in the flange 381a of the rotor hub 381, and therefore it is not only hard to mount the flange 381a on the rotary shaft 382 by precisely crossing the disk mounting face of the flange 381a or the recording face of the disk board 385 orthogonally to the rotation center axis 1 of the rotary shaft 382, but also hard to match the center of the flange 381a or the disk board 385 precisely with the rotation center axis 1.

Due to such deviation in angle formed between the disk mounting face of the flange 381a or the recording face of the disk board 385 and the axial center of the rotary shaft 382, when the disk board 385 is rotated, the recording face rotates with a certain inclination, and the position of the recording face of the disk board 385 fluctuates, that is, a phenomenon of surface deflection occurs. Also due to deviation in position of the center of the flange 381a or disk board 385 from the rotation center axis, when the disk board 385 is rotated, the position fluctuates in a direction parallel to this surface, that is, an axial center deflection occurs.

Yet, if the temperature is raised owing to the environments of use of the information recording and reproducing apparatus or temperature rise inside the apparatus, the oil viscosity of the dynamic pressure lubricant 21 drops, and the bearing rigidity of the radial bearing declines, and therefore at the time of recording or reproducing of the apparatus, the surface deflection of the disk board increases.

In actual use, the surface deflection and axial center deflection appear in a combined form, and the recording density of the disk board 385 must be determined by including a tolerance in consideration of such fluctuations, and hence there was a limit in enhancing the recording density.

To suppress the surface deflection and axial center deflection of the disk board 385 during rotation, it is required to enhance the processing precision and assembling precision of these constituent members, and it means that increase in the apparatus cost is inevitable. It further requires a tightening part for fixing the disk board 385 to the flange 381a of the rotor hub 381, which also causes to increase the cost.

To maintain a high precision of rotation of the disk, it is required to extend the shaft diameter and shaft length of the rotary shaft for composing the radial bearing and thrust bearing, and the space occupied by the rotary shaft increases, and it is hard to reduce in size and thickness. Further, a space for tightening the disk board 385 to the flange 381a of the rotor hub 381 is required in the upper part of the disk board 385, which makes it hard to reduce in thickness, too.

It is also necessary to enhance the moment axial rigidity to the disturbance moment applied on the rotating element 380, and the following four methods are generally known as the means for enhancing the moment axial rigidity.

(1) To enhance the bearing rigidity to the side pressure in the radial bearing.

(2) To widen the gap L between the first and second radial dynamic pressure generating grooves 382b, 382c of the radial bearing.

(3) To suppress lift in the thrust bearing by increasing the magnetic attraction applied to the thrust bearing.

(4) To raise the oil viscosity.

These methods, however, have own problems to be solved as discussed below.

(1) To enhance the bearing rigidity to the side pressure in the radial bearing, the gap in the radial bearing is narrowed, or the widths $L_1$ and $L_2$ in the axial direction of the first and second radial dynamic pressure generating grooves 382b, 382c are increased. But to narrow the gap of the radial bearing, it is required to process the radial bearing parts at very high precision, and there is a limit in processing precision of parts. Therefore, the gap in the radial bearing cannot be narrowed. Or if the widths $L_1$ and $L_2$ in the axial direction are increased, the spindle motor cannot be designed in a reduced thickness.

(2) To design a thin spindle motor, it is not allowed to widen the gap L of the first and second radial dynamic pressure generating grooves 382b, 382c of the radial bearing.

(3) Since the facing area of the thrust bearing is small, the thrust proof load is small, and metal contact may occur when the oil viscosity is lowered at high temperature, in particular.

(4) When the oil viscosity is raised, the bearing loss increases extremely in low temperature region.

In the conventional configuration of the spindle motor in the information recording and reproducing apparatus having a lubricant sump of a wedge ring form in the bearing sleeve shown in FIG. 38, it is hard to observe the oil distribution state of the dynamic pressure lubricant, and it is possible that an excessive oil may be supplied from the bearing sleeve open side end as the dynamic pressure lubricant 21 flows over the lubricant sump 383 as shown in FIG. 39. In particular, oil feed amount control is more difficult in a smaller information recording and reproducing apparatus. As indicated by arrow in FIG. 40, an excessive lubricant 401 oozes out from the bearing sleeve 7, or oil drops of the excessive lubricant 401 oozing out are provided with a centrifugal force by rotation of the rotary disk, and splash out of the motor to stick to the rotary disk surface, and the recorded data may be damaged, and hence there was a problem in reliability.

Dynamic pressure generating grooves may be processed, as mentioned above, by etching, shot blasting, shot peening, or ball rolling, but if the entire sleeve is made of a hard material, the grooves for generating dynamic pressure must be formed by etching or shot blasting process, and the processing cost is high. On the other hand, when the entire sleeve is made of a soft material, the grooves for generating dynamic pressure can be processed easily, and ball rolling or other plastic processing of low processing cost may be easily applied. However, when deburring the inner circumference or correcting the coaxiality of inside diameter and outside diameter in the finishing process after ball rolling, the outer circumference may be ruined, and the inner circumference cannot be processed on the basis of the outside diameter, and hence the coaxiality of inside and outside diameters cannot be enhanced. Or when forming the grooves for generating dynamic pressure in the inner circumference of the bearing sleeve to compose the radial bearing, a bearing sleeve having dynamic pressure generating grooves formed at high precision is required, and the cost becomes higher.

In particular, when the rotary shaft is not a simple columnar form, but is integrated with a rotor hub for fixing the disk board, a special holding tool is needed for forming and processing the grooves for generating dynamic pressure in the rotary shaft, and the processing device becomes larger and complicated, and the processing cost is raised.

SUMMARY OF THE INVENTION

It is hence an object of the invention to present a spindle motor reduced in size and thickness by forming a rotary disk integrally composing a disk board and rotary shaft of spindle motor, and substantially decreased in the surface deflection and axial center deflection of the disk during rotation of spindle motor. Further, by using this spindle motor, it is also an object to present an information recording and reproducing apparatus enhanced in the recording density, and further lowered in the cost by curtailing the tightening parts of the disk.

It is other object to present a spindle motor of high reliability free from leak or spatter of dynamic pressure lubricant to outside of the disk driving motor due to fluctuations of feed rate of dynamic pressure lubricant, impact, or thermal expansion of the dynamic pressure lubricant itself by temperature rise, and an information recording and reproducing apparatus having such spindle motor.

It is also an object to present a manufacturing method of a spindle motor used in an information recording and reproducing apparatus capable of realizing a low cost by integrally forming dynamic pressure generating grooves on the outer circumference of rotary shaft of a rotary disk. That is, the spindle motor of the invention is a spindle motor used in an apparatus for recording and reproducing information in an information recording layer, by rotating and driving a disk unit having an information recording layer on its principal plane, which comprises a rotary disk composed of a disk unit and a rotary shaft, a rotating element composed of a rotor yoke and a rotary magnet affixed to the rotor yoke, a fixed side bearing closed at one end composed of a bearing sleeve and a thrust support plate, a stator composed of an iron core and a coil, and thrust attracting means for attracting the rotating element to the fixed side bearing side, having either a configuration composed of a radial bearing forming dynamic pressure generating grooves in either the outer circumference of the rotary shaft or the inner circumference of the bearing sleeve composing the fixed side bearing, and a thrust bearing forming dynamic pressure generating grooves in either the open side end face of bearing sleeve or the lower side of the rotary disk, or a configuration composed of a first thrust bearing forming first dynamic pressure generating grooves in either the open end side end face of bearing sleeve or the lower side of the rotary disk, and a second thrust bearing forming second dynamic pressure generating grooves in either the upper side of the thrust support plate or the lower end face of the rotary shaft, in which the rotary disk has an integrated structure of disk unit and rotary shaft, there is a lubricant sump in the inner circumference of the annular wall of the rotor yoke, and further the inner circumference of the annular wall of the rotor yoke is tapered, becoming wider toward the lubricant sump.

In this configuration, since the thrust bearing is formed at a position becoming larger in the direction of diameter with respect to the center of rotation, the bearing rigidity is very high as the thrust bearing, and the axial length of the radial bearing can be shortened. Besides, while suppressing the radial bearing dimension, the moment rigidity withstanding the disturbance moment applied on the rotating element can be assured, and the thickness can be reduced substantially. Moreover, by generating a magnetic attracting force by the thrust attracting means, the bearing rigidity of the thrust bearing is not lowered in high temperature region, and a stable disk surface deflection of high precision is obtained. By integrally forming the disk unit and rotary shaft, or forming to as to be integral, the squareness of the principal plane of the disk unit in which the information signal is recorded to the center of rotation is very high in precision. Therefore, surface deflection due to insufficient squareness can be notably decreased, and vibration outside of plane can be suppressed. At the same time, deflection in the direction of diameter with respect to the center of rotation can be also suppressed, and it is also possible to suppress the deviation of the center of rotation during actual operation of the disk unit and the center of rotation of servo signal transferred preliminarily to follow up precisely to the nearly concentric plural recording tracks on the information recording plane of the disk unit. The rotary disk partly functions same as the rotating element of the spindle motor, and the rotary shaft and the rotor hub having the flange are not separately needed as in the prior art, and the cost can be lowered and the thickness can be reduced at the same time. In addition, since the lubricant sump and tapered slope region are composed in the inner circumference of the rotor yoke, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor, and a high reliability is assured, so that a spindle motor of very high recording density and ideal for information recording and reproducing apparatus can be realized.

The spindle motor of the invention comprises a rotary disk composed of a disk unit and a rotary shaft, a rotating element composed of a rotor yoke having a lubricant sump in the inner circumference of the annular wall and a rotary magnet affixed to the rotor yoke, a fixed side bearing closed at one end composed of a bearing sleeve and a thrust support plate, a stator composed of an iron core and a coil, and thrust attracting means for attracting the rotating element to the fixed side bearing side, having a configuration composed of a radial bearing forming dynamic pressure generating grooves in either the outer circumference of the rotary shaft or the inner circumference of the bearing sleeve composing the fixed side bearing, and a thrust bearing forming dynamic pressure generating grooves in either the upper side of thrust support plate or the lower end of rotary shaft, in which the rotary disk has an integrated structure of disk unit and rotary shaft, and the inner circumference of the annular wall of the rotor yoke is tapered, becoming wider toward the lubricant sump. Alternatively, it comprises a rotary disk composed of a disk unit, a rotary shaft and an annular wall surrounding the rotary shaft, a rotating element composed of a rotor yoke and a rotary magnet affixed to the rotor yoke, a fixed side bearing closed at one end composed of a bearing sleeve and a thrust support plate, a stator composed of an iron core and a coil, and thrust attracting means for attracting the rotating element to the fixed side bearing side, having a configuration composed of a radial bearing forming dynamic pressure generating grooves in either the outer circumference of the rotary shaft or the inner circumference of the bearing sleeve composing the fixed side bearing, and a thrust bearing forming dynamic pressure generating grooves in either the upper side of thrust support plate or the lower end of rotary shaft, in which the rotary disk has an integrated structure of disk unit and rotary shaft, there is a lubricant sump in the inner circumference of the annular wall of the rotary disk, and the inner circumference of the annular wall is tapered, becoming wider toward the lubricant sump.

In this configuration, since rotary disk is formed to function as part of the rotating element of the spindle motor, unlike the prior art, the rotary shaft and the rotor hub having the flange are not separately required, and the thickness can be reduced at the same time. Moreover, by generating a magnetic attracting force by the thrust attracting means, the bearing rigidity of the thrust bearing is not lowered in high temperature region. By integrally forming the disk unit and rotary shaft, or forming to as to be integral, the squareness of the principal plane of the disk unit in which the information signal is recorded to the center of rotation is very high in precision. Therefore, surface deflection due to insufficient squareness can be notably decreased, and vibration outside of plane can be suppressed. At the same time, deflection in the direction of diameter with respect to the center of rotation can be also suppressed, and it is also possible to suppress the deviation of the center of rotation during actual operation of the disk unit and the center of rotation of servo signal transferred preliminarily to follow up precisely to the nearly concentric plural recording tracks on the information recording plane of the disk unit. In addition, since the lubricant sump and tapered slope region are composed in the inner circumference of the rotor yoke, or the lubricant sump and tapered shape are formed in the inner circumference of the annular wall surrounding the rotary shaft of the rotary disk, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor, and a high reliability is assured, so that a spindle motor of high recording density and ideal for information recording and reproducing apparatus can be realized.

The spindle motor of the invention comprises a rotary disk composed of a disk unit and a rotary cylindrical part, a rotating element composed of a rotor yoke and a rotary magnet affixed to the rotor yoke, a bearing support shaft affixed to a base, a cylindrical member having an annular lubricant sump, a stator composed of an iron core and a coil, and thrust attracting means for attracting the rotating element to the bearing support shaft side, having either a configuration composed of a radial bearing forming dynamic pressure generating grooves in either the outer circumference of the bearing support shaft or the inner circumference of the rotary cylindrical part, and a thrust bearing forming dynamic pressure generating grooves at least in either the open side end face of the rotary cylindrical part or the upper side of the base facing the open side end face of the rotary cylindrical part, or a configuration composed of a first thrust bearing forming first dynamic pressure generating grooves at least in either the open end side end face of rotary cylindrical part or the upper side of the base facing the open side end face of the rotary cylindrical part, and a second thrust bearing forming second dynamic pressure generating grooves in either the lower side of the disk facing the upper end of the bearing support shaft or the upper end face of the bearing support shaft, in which the rotary disk has an integrated structure of disk unit and rotary cylindrical part, and the inner circumferential wall of the cylindrical member is tapered, becoming wider toward the lubricant sump.

In this configuration, since the thrust bearing is formed at a position becoming larger in the direction of diameter with respect to the center of rotation, the bearing rigidity is very high as the thrust bearing, and the axial length of the radial bearing can be shortened. Besides, while suppressing the radial bearing dimension, the moment rigidity withstanding the disturbance moment applied on the rotating element can be assured, and the thickness can be reduced substantially. Moreover, by generating a magnetic attracting force by the thrust attracting means, the bearing rigidity of the thrust bearing is not lowered in high temperature region, and a stable disk surface deflection of high precision is obtained. By integrally forming the disk unit and rotary shaft, or forming to as to be integral, the squareness of the principal plane of the disk unit in which the information signal is recorded to the center of rotation is very high in precision. Therefore, surface deflection due to insufficient squareness can be notably decreased, and vibration outside of plane can be suppressed. At the same time, deflection in the direction of diameter with respect to the center of rotation can be also suppressed, and it is also possible to suppress the deviation of the center of rotation during actual operation of the disk unit and the center of rotation of servo signal transferred preliminarily to follow up precisely to the nearly concentric plural recording tracks on the information recording plane of the disk unit. The rotary disk partly functions same as the rotating element of the spindle motor, and the rotary shaft and the rotor hub having the flange are not separately needed as in the prior art, and the cost can be lowered and the thickness can be reduced at the same time. In addition, since the lubricant sump and taper are composed in the inner circumference of the annular cylindrical member affixed to the base, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor, and a high reliability is assured, so that a spindle motor of very high recording density and ideal for information recording and reproducing apparatus can be realized.

The spindle motor of the invention comprises a rotary disk composed of a disk unit and a rotary cylindrical part, a rotating element composed of a rotor yoke and a rotary magnet affixed to the rotor yoke, a bearing support shaft affixed to a base, a cylindrical member having an annular lubricant sump, a stator composed of an iron core and a coil, and thrust attracting means for attracting the rotating element to the bearing support shaft side, having a configuration composed of a radial bearing forming dynamic pressure generating grooves in either the outer circumference of the bearing support shaft or the inner circumference of the rotary cylindrical part, and a thrust bearing forming dynamic pressure generating grooves in either the lower side of the disk facing the upper end of the bearing support shaft or the upper end face of the bearing support shaft, in which the rotary disk has an integrated structure of disk unit and rotary cylindrical part, and the inner circumferential wall of the cylindrical member is tapered, becoming wider toward the lubricant sump.

In this configuration, since rotary disk is formed to function as part of the rotating element of the spindle motor, unlike the prior art, the rotary shaft and the rotor hub having the flange are not separately required, and the cost can be saved and the thickness can be reduced at the same time. Moreover, by generating a magnetic attracting force by the thrust attracting means, the bearing rigidity of the thrust bearing is not lowered in high temperature region. By integrally forming the disk unit and bearing support shaft, or forming to as to be integral, the squareness of the principal plane of the disk unit in which the information signal is recorded to the center of rotation is very high in precision. Therefore, surface deflection due to insufficient squareness can be notably decreased, and vibration outside of plane can be suppressed. At the same time, deflection in the direction of diameter with respect to the center of rotation can be also suppressed, and it is also possible to suppress the deviation of the center of rotation during actual operation of the disk unit and the center of rotation of servo signal transferred preliminarily to follow up precisely to the nearly concentric plural recording tracks on the information recording plane of the disk unit. In addition, since the lubricant sump and tapered slope region are composed in the inner circumference of the cylindrical member, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor, and a high reliability is assured, so that a spindle motor of high recording density and ideal for information recording and reproducing apparatus can be realized.

The spindle motor of the invention comprises a rotary disk composed of a disk unit and a rotary shaft, a rotating element composed of a rotor yoke and a rotary magnet affixed to the rotor yoke, a fixed side bearing closed at one end composed of a bearing sleeve and a thrust support plate, a stator composed of an iron core and a coil, and thrust attracting means for attracting the rotating element to the fixed side bearing side, having a configuration composed of a radial bearing having dynamic pressure generating grooves formed in a dynamic pressure generating groove forming method comprising a step of forming a first group of dynamic pressure generating grooves by a punch provided in a die on the outer circumference of the rotary shaft, and a step of forming a second group of dynamic pressure generating grooves by a die split line, and a thrust bearing composed of at least one of dynamic pressure generating grooves of the dynamic pressure generating grooves formed at least in either the open side end face of bearing sleeve or the lower side of the rotary disk, and dynamic pressure generating grooves formed at least in the upper side of the thrust support plate or the lower end side of the rotary shaft, in which the rotary disk has an integrated structure of disk unit and rotary shaft. Alternatively, it comprises a rotary disk composed of a disk unit and a rotary cylindrical part, a rotating element composed of a rotor yoke and a rotary magnet affixed to the rotor yoke, a bearing support shaft affixed to a base, a cylindrical member having an annular lubricant sump, a stator composed of an iron core and a coil, and thrust attracting means for attracting the rotating element to the bearing support shaft side, having a configuration composed of a radial bearing having dynamic pressure generating grooves formed in a dynamic pressure generating groove forming method comprising a step of forming a first group of dynamic pressure generating grooves by a punch provided in a die on the outer circumference of the bearing support shaft, and a step of forming a second group of dynamic pressure generating grooves by a die split line, and a thrust bearing composed of at least one of dynamic pressure generating grooves of the dynamic pressure generating grooves formed at least in either the open side end face of rotary cylindrical part or the upper side of the base facing the opening side end face of the rotary cylindrical part, and dynamic pressure generating grooves formed at least in the lower side of the disk facing the upper end face of the bearing support shaft or the upper end face of the bearing support shaft, in which the rotary disk has an integrated structure of disk unit and rotary cylindrical part.

In this configuration, dynamic pressure generating grooves as a radial bearing can be formed precisely and inexpensively in the rotary shaft of the rotary disk or outer circumference of the bearing support shaft, and therefore an inexpensive spindle of high precision of rotation can be fabricated. The rotary disk partly functions same as the rotating element of the spindle motor, and the rotary shaft and the rotor hub having the flange are not separately needed as in the prior art, and the cost can be lowered and the thickness can be reduced at the same time. By generating a magnetic attracting force by the thrust attracting means, the bearing rigidity of the thrust bearing is not lowered in high temperature region, and a stable disk surface deflection of high precision is obtained. By integrally forming the disk unit and bearing support shaft, or forming to as to be integral, the squareness of the principal plane of the disk unit in which the information signal is recorded to the center of rotation is very high in precision. Therefore, surface deflection due to insufficient squareness can be notably decreased, and vibration outside of plane can be suppressed. At the same time, deflection in the direction of diameter with respect to the center of rotation can be also suppressed, and it is also possible to suppress the deviation of the center of rotation during actual operation of the disk unit and the center of rotation of servo signal transferred preliminarily to follow up precisely to the nearly concentric plural recording tracks on the information recording plane of the disk unit, so that a spindle motor ideal for information recording and reproducing apparatus capable of recording at high density can be realized.

The spindle motor of the invention comprises a rotary disk composed of a disk unit and an annular protuberance, a rotating element composed of a rotor yoke and a rotary magnet affixed to the rotor yoke, a fixed side bearing affixed to a base and disposed in an annular profile opposite to the protuberance, a stator composed of an iron core and a coil, and thrust attracting means for attracting the rotating element to the fixed side bearing side, having a configuration composed of a radial bearing having dynamic pressure generating grooves formed either in the concave outside inner circumference of the fixed side bearing facing the outer circumference of the protuberance of the rotary disk or the outer circumference of the protuberance of the rotary disk or inner circumference of the protuberance of the rotary disk or concave inside inner circumference of the fixed side bearing facing the inner circumference of the protuberance of the rotary disk, and a thrust bearing having dynamic pressure generating grooves formed at least in either the lower end face of the protuberance of the rotary disk or the concave upper flat plane of the fixed side bearing facing the lower end face of the protuberance of the rotary disk, in which the protuberance has a structure integrally formed in the disk unit, and a drop-out preventive cover is provided to cover the tiny gap in the outer periphery of the principal plane of the disk unit.

In this configuration, the rotary shaft of the motor and the rotor hub in the prior art can be omitted, and the number of parts can be curtailed, and in the vacated space, moreover, a rotary magnet affixed to the rotor and a stator facing the rotary magnet can be disposed, so that the structure is suited to small and thin design. Moreover, a thrust bearing is formed near the peripheral edge of the rotary disk, and the thrust bearing rigidity can be significantly increased, and further since the radial bearing is composed on the outer circumference of the rotary disk, the bearing diameter is wide, the radial bearing rigidity is raised, and hence the radial bearing length can be further shortened, so that the thickness can be reduced further. Since the disk unit and protuberance are integrally formed, the squareness of the principal plane of the disk unit in which the information signal is recorded to the center of rotation is very high in precision. Therefore, surface deflection due to insufficient squareness can be notably decreased, and vibration outside of plane can be suppressed. At the same time, deflection in the direction of diameter with respect to the center of rotation can be also suppressed, and it is also possible to suppress the deviation of the center of rotation during actual operation of the disk unit and the center of rotation of servo signal transferred preliminarily to follow up precisely to the nearly concentric plural recording tracks on the information recording plane of the disk unit, and further since the drop-out preventive cover is affixed on the upper side of the base unit with an adhesive or the like, and part of it covers the tiny gap in the outer periphery of the principal plane of the rotary disk, and therefore the rotary disk is not dislocated from the fixed side bearing even in the event of a strong impact of falling or the like, thereby presenting an excellent spindle motor ideal for information recording and reproducing apparatus capable of recording at high density.

The manufacturing method of dynamic pressure generating grooves for composing the spindle motor of the invention comprises a step of forming a rotary disk by integrally forming dynamic pressure generating grooves on the outer circumference of a rotary shaft, by crossing a disk unit and a rotary shaft, orthogonally between the central axis of the rotary shaft and the principal plane of the disk unit, which comprises a step of forming a first group of dynamic pressure generating grooves by a punch provided in a die, and a step of forming a second group of dynamic pressure generating grooves by a die split line. It also comprises a step of forming dynamic pressure generating grooves on the outer circumference of a bearing support shaft affixed to a base, which comprises a step of forming a first group of dynamic pressure generating grooves by a punch provided in a die on the outer circumference of the bearing support shaft, and a step of forming a second group of dynamic pressure generating grooves by a die split line.

In this configuration, not requiring any particular holding tool on the outer circumference of the rotary shaft or bearing support shaft of the rotary disk, or without using large and complicated processing device, dynamic pressure generating grooves as a radial bearing can be formed precisely at low cost.

The information recording and reproducing apparatus of the invention comprises a spindle motor comprising a rotary disk composed of a disk unit and a rotary shaft, a rotating element composed of a rotor yoke and a rotary magnet, a fixed side bearing composed of a bearing sleeve and a thrust support plate, a stator composed of an iron core and a coil, and thrust attracting means for attracting the rotating element to the fixed side bearing side, having either a configuration composed of a radial bearing forming dynamic pressure generating grooves in either the outer circumference of the rotary shaft or the inner circumference of the bearing sleeve composing the fixed side bearing, and a thrust bearing forming dynamic pressure generating grooves in either the open side end face of bearing sleeve or the lower side of the rotary disk, or a configuration composed of a first thrust bearing forming first dynamic pressure generating grooves in either the open end side end face of bearing sleeve or the lower side of the rotary disk, and a second thrust bearing forming second dynamic pressure generating grooves in either the upper side of the thrust support plate or the lower end face of the rotary shaft, an information converting element for recording and reproducing in the information recording medium layer formed in the disk unit, and oscillating means for positioning the information converting element at a specified position, in which the rotary disk composing the spindle motor has an integrated structure of disk unit and rotary shaft.

In this configuration, the bearing rigidity as the thrust bearing is very high, and the axial length of the radial bearing can be shortened, and the rotary shaft and the rotor hub having the flange are not separately needed as in the prior art, and the thickness can be reduced, and also having the spindle motor suppressed in the surface deflection and axial center deflection of the principal plane forming the information recording medium layer, stable recording and reproducing at high density is realized. Unlike the prior art, the member for clamping the disk board is not needed at the flange of the rotor hub of the spindle motor, and the cost is saved and the thickness is reduced at the same time.

The information recording and reproducing apparatus of the invention comprises a spindle motor comprising a rotary disk composed of a disk unit and a rotary shaft, a rotating element composed of a rotor yoke having a lubricant sump in the inner circumference of the annular wall and a rotary magnet, a fixed side bearing composed of a bearing sleeve and a thrust support plate, a stator composed of an iron core and a coil, and thrust attracting means for attracting the rotating element to the fixed side bearing side, having a configuration composed of a radial bearing forming dynamic pressure generating grooves in either the outer circumference of the rotary shaft or the inner circumference of the bearing sleeve, and a thrust bearing forming dynamic pressure generating grooves in either the upper side of thrust support plate or the lower end of rotary shaft, an information converting element for recording and reproducing in the information recording medium layer formed in the disk unit, and oscillating means for positioning the information converting element at a specified position, in which the rotary disk composing the spindle motor has an integrated structure of disk unit and rotary shaft, and the inner circumference of the annular wall of the rotor yoke of the spindle motor is tapered, becoming wider toward the lubricant sump.

In this configuration, the bearing rigidity as the thrust bearing is very high, and the axial length of the radial bearing can be shortened, and the rotary shaft and the rotor hub having the flange are not separately needed as in the prior art, and the thickness can be reduced, and also having the spindle motor suppressed in the surface deflection and axial center deflection of the principal plane forming the information recording medium layer, stable recording and reproducing at high density is realized. Unlike the prior art, the member for clamping the disk board is not needed at the flange of the rotor hub of the spindle motor, and the cost is saved and the thickness is reduced at the same time. In addition, since the lubricant sump and tapered slope region are composed in the inner circumference of the rotor yoke, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor to contaminate the information recording medium layer on the principal plane or ruin the recorded data, so that a high reliability is assured.

The information recording and reproducing apparatus of the invention comprises a spindle motor comprising a rotary disk composed of a disk unit, a rotary shaft and an annular wall surrounding the rotary shaft, a rotating element composed of a rotor yoke and a rotary magnet, a fixed side bearing composed of a bearing sleeve and a thrust support plate, a stator composed of an iron core and a coil, and thrust attracting means for attracting the rotating element to the fixed side bearing side, having a configuration composed of a radial bearing forming dynamic pressure generating grooves in either the outer circumference of the rotary shaft or the inner circumference of the bearing sleeve composing the fixed side bearing, and a thrust bearing forming dynamic pressure generating grooves in either the upper side of thrust support plate or the lower end of rotary shaft, an information converting element for recording and reproducing in the information recording medium layer formed in the disk unit, and oscillating means for positioning the information converting element at a specified position, in which the rotary disk composing the spindle motor has an integrated structure of disk unit and rotary shaft, and the inner circumference of the annular wall surrounding the rotary shaft of the spindle motor is tapered, becoming wider toward the lubricant sump.

In this configuration, the bearing rigidity as the thrust bearing is very high, and the axial length of the radial bearing can be shortened, and the rotary shaft and the rotor hub having the flange are not separately needed as in the prior art, and the thickness can be reduced, and also having the spindle motor suppressed in the surface deflection and axial center deflection of the principal plane forming the information recording medium layer, stable recording and reproducing at high density is realized. Unlike the prior art, the member for clamping the disk board is not needed at the flange of the rotor hub of the spindle motor, and the cost is saved and the thickness is reduced at the same time. In addition, since the lubricant sump and tapered slope region are composed in the inner circumference of the annular wall, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor to contaminate the information recording medium layer on the principal plane or ruin the recorded data, so that a high reliability is assured.

The information recording and reproducing apparatus of the invention comprises a spindle motor comprising a rotary disk composed of a disk unit and a rotary cylindrical part, a rotating element composed of a rotor yoke and a rotary magnet, a bearing support shaft affixed to a base, a cylindrical member having an annular lubricant sump, a stator composed of an iron core and a coil, and thrust attracting means for attracting the rotating element to the bearing support shaft side, having either a configuration composed of a radial bearing forming dynamic pressure generating grooves in either the outer circumference of the bearing support shaft or the inner circumference of the rotary cylindrical part, and a thrust bearing forming dynamic pressure generating grooves at least in either the open side end face of the rotary cylindrical part or the upper side of the base facing the open side end face of the rotary cylindrical part, or a configuration composed of a first thrust bearing forming first dynamic pressure generating grooves at least in either the open end side end face of rotary cylindrical part or the upper side of the base facing the open side end face of the rotary cylindrical part, and a second thrust bearing forming second dynamic pressure generating grooves in either the lower side of the disk facing the upper end of the bearing support shaft or the upper end face of the bearing support shaft, an information converting element for recording and reproducing in the information recording medium layer formed in the disk unit, and oscillating means for positioning the information converting element at a specified position, in which the rotary disk of the spindle motor has an integrated structure of disk unit and rotary cylindrical part, and the inner peripheral wall of the cylindrical member of the spindle motor is tapered, becoming wider toward the lubricant sump.

In this configuration, the bearing rigidity as the thrust bearing is very high, and the axial length of the radial bearing can be shortened, and the rotary shaft and the rotor hub having the flange are not separately needed as in the prior art, and the thickness can be reduced, and also having the spindle motor suppressed in the surface deflection and axial center deflection of the principal plane forming the information recording medium layer, stable recording and reproducing at high density is realized. Unlike the prior art, the member for clamping the disk board is not needed at the flange of the rotor hub of the spindle motor, and the cost is saved and the thickness is reduced at the same time. In addition, since the lubricant sump and tapered slope region are composed in the inner circumference of the cylindrical member, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor to contaminate the information recording medium layer on the principal plane or ruin the recorded data, so that a high reliability is assured.

The information recording and reproducing apparatus of the invention comprises a spindle motor comprising a rotary disk composed of a disk unit and a rotary cylindrical part, a rotating element composed of a rotor yoke and a rotary magnet, a bearing support shaft affixed to a base, a cylindrical member having an annular lubricant sump, a stator composed of an iron core and a coil, and thrust attracting means for attracting the rotating element to the bearing support shaft side, having a configuration composed of a radial bearing forming dynamic pressure generating grooves in either the outer circumference of the bearing support shaft or the inner circumference of the rotary cylindrical part, and a thrust bearing forming dynamic pressure generating grooves in either the lower side of the disk facing the upper end of the bearing support shaft or the upper end of the bearing support shaft, an information converting element for recording and reproducing in the information recording medium layer formed in the disk unit, and oscillating means for positioning the information converting element at a specified position, in which the rotary disk of the spindle motor has an integrated structure of disk unit and rotary cylindrical part, and the inner circumference of the annular wall surrounding the rotary shaft of the spindle motor is tapered, becoming wider toward the lubricant sump.

In this configuration, the rotary shaft and the rotor hub having the flange are not separately needed as in the prior art, and the thickness can be reduced, and also having the spindle motor suppressed in the surface deflection and axial center deflection of the principal plane forming the information recording medium layer, stable recording and reproducing at high density is realized. Unlike the prior art, the member for clamping the disk board is not needed at the flange of the rotor hub of the spindle motor, and the cost is saved and the thickness is reduced at the same time. In addition, since the lubricant sump and tapered slope region are composed in the inner circumference of the cylindrical member, if the oil feed rate of the dynamic pressure lubricant fluctuates, if the dynamic pressure lubricant is forced out by impact, or if the dynamic pressure lubricant is expanded by temperature rise, the dynamic pressure lubricant does not scatter outside of the motor to contaminate the information recording medium layer on the principal plane or ruin the recorded data, so that a high reliability is assured.

The information recording and reproducing apparatus of the invention comprises a spindle motor comprising a rotary disk composed of a disk unit and a rotary shaft, a rotating element composed of a rotor yoke and a rotary magnet, a fixed side bearing composed of a bearing sleeve and a thrust support plate, a stator composed of an iron core and a coil, and thrust attracting means for attracting the rotating element to the fixed side bearing side, having a configuration composed of a radial bearing having dynamic pressure generating grooves formed in a dynamic pressure generating groove forming method comprising a step of forming a first group of dynamic pressure generating grooves by a punch provided in a die on the outer circumference of the rotary shaft, and a step of forming a second group of dynamic pressure generating grooves by a die split line, and a thrust bearing composed of at least one of dynamic pressure generating grooves of the dynamic pressure generating grooves formed at least in either the open side end face of bearing sleeve or the lower side of the rotary disk, and dynamic pressure generating grooves formed at least in the upper side of the thrust support plate or the lower end side of the rotary shaft, an information converting element for recording and reproducing in the information recording medium layer formed in the disk unit, and oscillating means for positioning the information converting element at a specified position, in which the rotary disk composing the spindle motor has an integrated structure of disk unit and rotary shaft.

In this configuration, a thin and inexpensive spindle motor of high precision of rotation is mounted, and unlike the prior art, the member for clamping the disk board is not needed at the flange of the rotor hub of the spindle motor, and the cost is saved and the thickness is reduced at the same time, so that an information recording and reproducing apparatus of stable and high density recording is realized.

The information recording and reproducing apparatus of the invention comprises a spindle motor comprising a rotary disk composed of a disk unit and a rotary cylindrical part, a rotating element composed of a rotor yoke and a rotary magnet, a bearing support shaft affixed to a base, a cylindrical member having an annular lubricant sump, a stator composed of an iron core and a coil, and thrust attracting means for attracting the rotating element to the bearing support shaft side, having a configuration composed of a radial bearing having dynamic pressure generating grooves formed in a dynamic pressure generating groove forming method comprising a step of forming a first group of dynamic pressure generating grooves by a punch provided in a die on the outer circumference of the bearing support shaft, and a step of forming a second group of dynamic pressure generating grooves by a die split line, and a thrust bearing composed of at least one of dynamic pressure generating grooves of the dynamic pressure generating grooves formed at least in either the open side end face of rotary cylindrical part or the upper side of the base facing the opening side end face of the rotary cylindrical part, and dynamic pressure generating grooves formed at least in the lower side of the disk facing the upper end face of the bearing support shaft or the upper end face of the bearing support shaft, an information converting element for recording and reproducing in the information recording medium layer formed in the disk unit, and oscillating means for positioning the information converting element at a specified position, in which the rotary disk of the spindle motor has an integrated structure of disk unit and rotary cylindrical part.

In this configuration, a thin and inexpensive spindle motor of high precision of rotation is mounted, and unlike the prior art, the member for clamping the disk board is not needed at the flange of the rotor hub of the spindle motor, and the cost is saved and the thickness is reduced at the same time, so that an information recording and reproducing apparatus of stable and high density recording is realized.

The information recording and reproducing apparatus of the invention comprises a spindle motor comprising a rotary disk composed of a disk unit and an annular protuberance, a rotating element composed of a rotor yoke and a rotary magnet, a fixed side bearing affixed to a base and disposed in an annular profile opposite to the protuberance, a stator composed of an iron core and a coil, and thrust attracting means for attracting the rotating element to the fixed side bearing side, having a configuration composed of a radial bearing having dynamic pressure generating grooves formed either in the concave outside inner circumference of the fixed side bearing or the outer circumference of the protuberance of the rotary disk or inner circumference of the protuberance of the rotary disk or concave inside inner circumference of the fixed side bearing facing the inner circumference of the protuberance of the rotary disk, and a thrust bearing having dynamic pressure generating grooves formed at least in either the lower end face of the protuberance of the rotary disk or the concave upper flat plane of the fixed side bearing, an information converting element for recording and reproducing in the information recording medium layer formed in the disk unit, and oscillating means for positioning the information converting element at a specified position, in which the rotary disk of the spindle motor has an integrated structure of disk unit and annular protuberance.

In this configuration, the number of parts is curtailed and the cost is saved, and at the same time the size and thickness are reduced by saving space, and the thickness is further reduced by shortening the axial length of the radial bearing owing to very excellent thrust bearing rigidity and radial bearing rigidity, and also having the spindle motor suppressed in the surface deflection and axial center deflection of the principal plane forming the information recording medium layer, stable recording and reproducing at high density is realized. Unlike the prior art, the member for clamping the disk board is not needed at the flange of the rotor hub of the spindle motor, and the cost is saved and the thickness is reduced at the same time.

DETAILED DESCRIPTION OF THE INVENTION

Description of the Preferred Embodiments

Figure 1A:
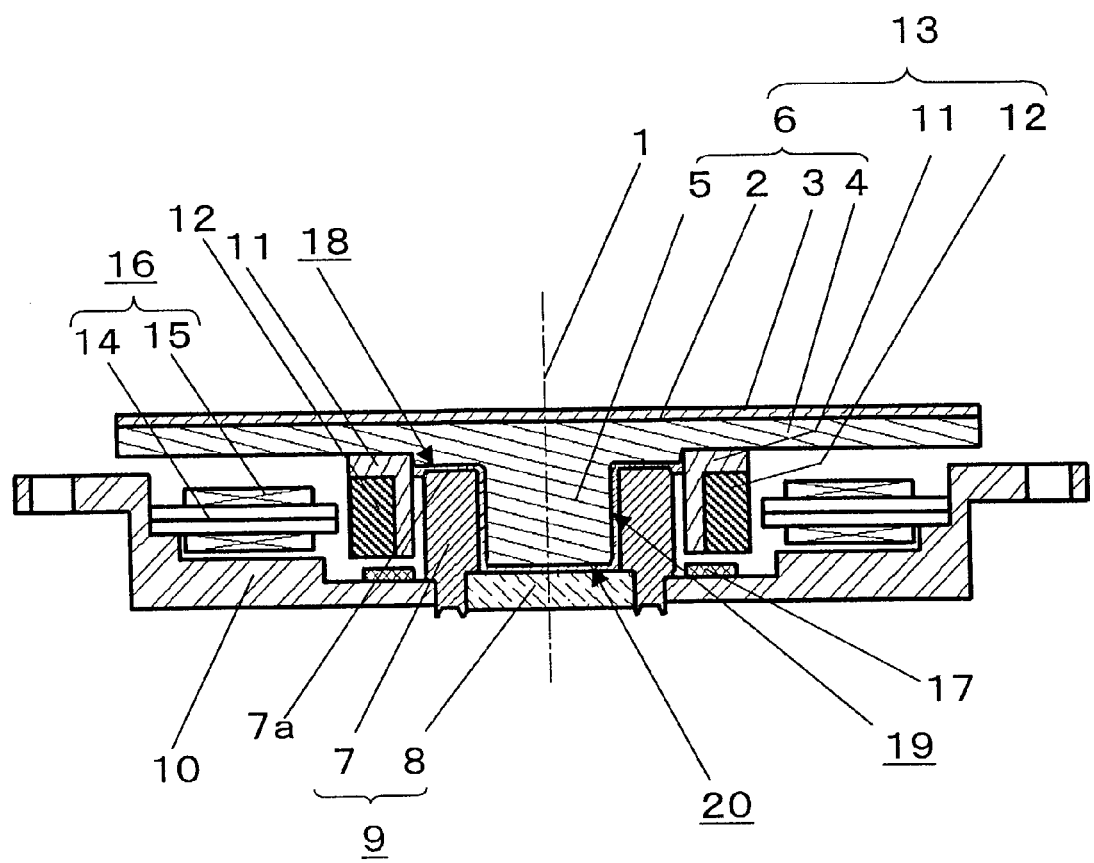
FIG. 1A is a sectional view showing principal parts of a spindle motor in a first exemplary embodiment of the invention.

Preferred embodiment of the invention are described below by referring to the drawings.

First Exemplary Embodiment

Figure 2:
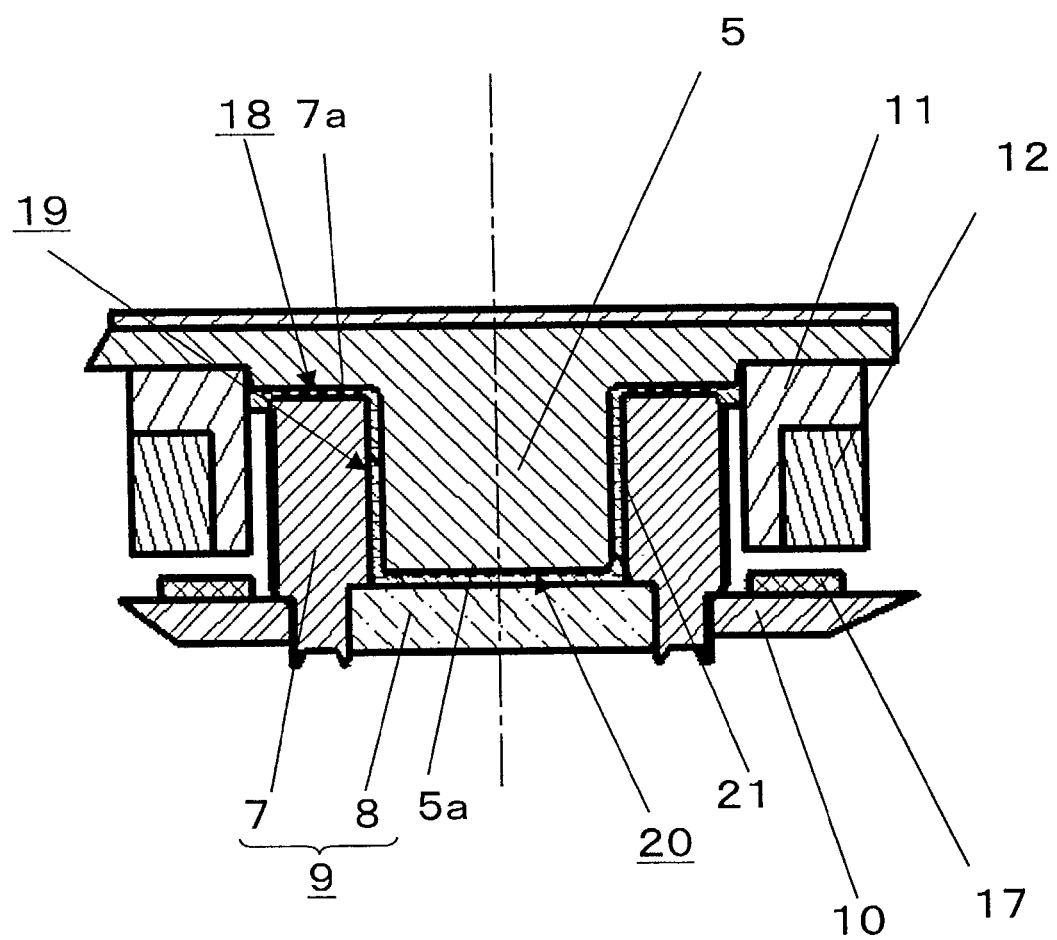
FIG. 2 is a partial magnified view showing the bearing portion of the spindle motor in the first exemplary embodiment of the invention.
Figure 3A:
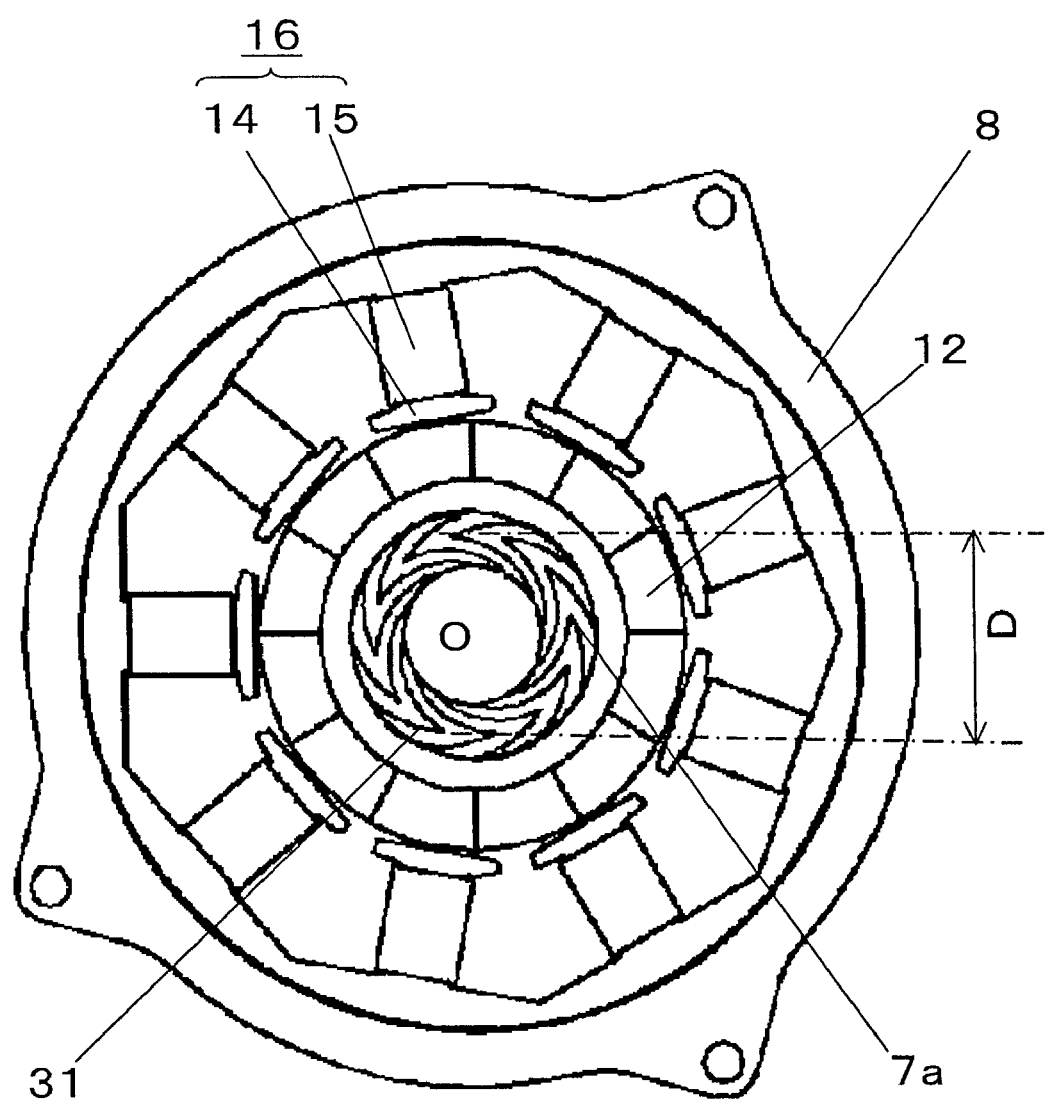
FIG. 3A is a top plan view of the portion excluding the rotating element of the spindle motor in the first exemplary embodiment of the invention.

FIG. 1A and FIG. 2 are schematic views of principal parts of a spindle motor showing a first exemplary embodiment of the invention, and specifically FIG. 1A is a schematic sectional view along the section of principal parts of the spindle motor, FIG. 2 is a partially magnified view of the bearing portion in FIG. 1A, and FIG. 3A is a schematic plan view as seen from the top of the portion excluding the rotary disk and rotor yoke in FIG. 1A.

Figure 1B:
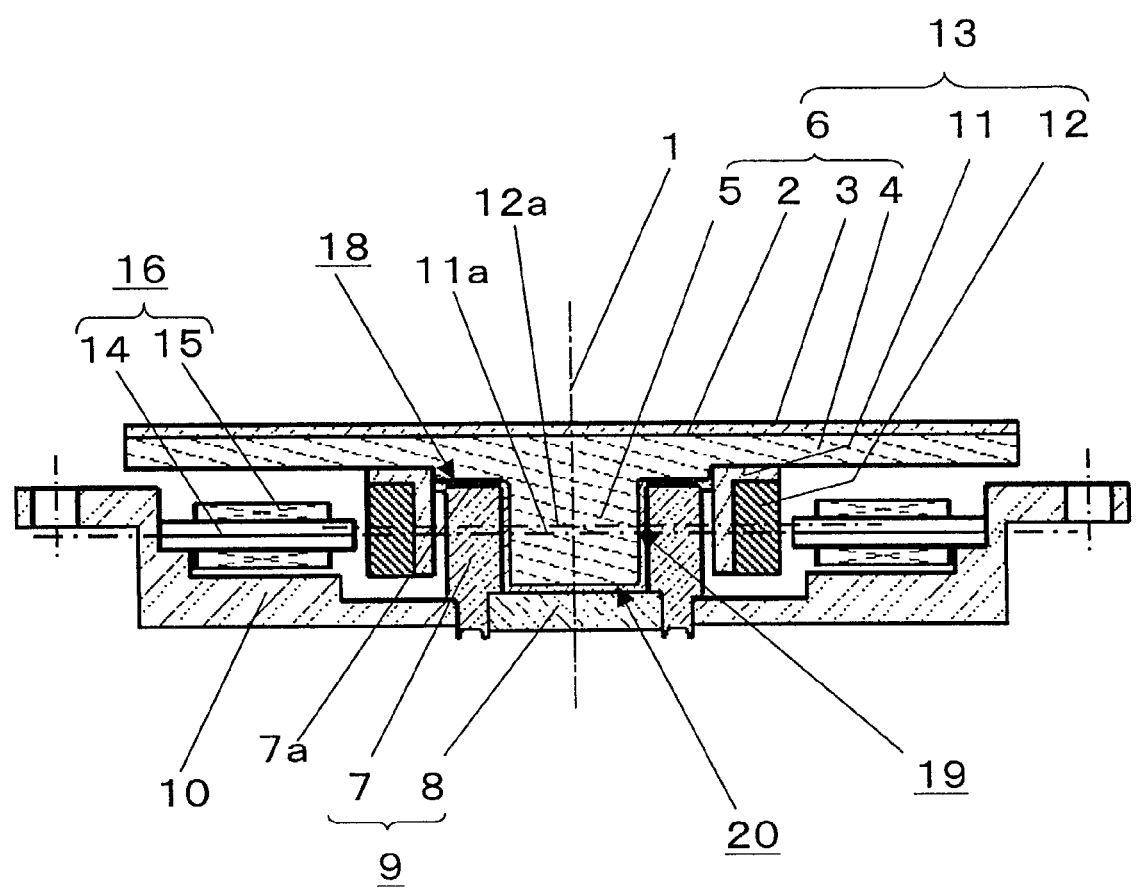
FIG. 1B is a sectional view explaining other example of thrust attracting means in the spindle motor in the first exemplary embodiment of the invention.

FIG. 1A shows a rotary disk 6 integrally forming a disk unit 4 forming an information recording medium layer 3 on a principal plane 2 vertical to the axial direction of the center of rotation 1, and a solid columnar rotary shaft 5 on the opposite side of the principal plane 2. The disk unit 4 and rotary shaft 5 may be made of individually fabricated members, which may be integrated to form the rotary disk 6 by insert forming, adhesion by using an adhesive, thermal fusion or other method. A cylindrical bearing sleeve 7 having an internal circumference forming a tiny gap against the outer circumference of the rotary shaft 5 of the rotary disk 6 is formed with one end sealed by a thrust support plate 8, and thereby a fixed side bearing 9 is composed. This fixed side bearing 9 is affixed to a base 10, and as shown in the partially magnified view in FIG. 2, the rotary shaft 5 of the rotary disk 6 is inserted into the recess of a bearing 9 formed of the bearing sleeve 7 and thrust support plate 8, and at least the tiny gap between the rotary disk 6 and fixed side bearing 9 is packed with a dynamic pressure lubricant 21 such as ester compound synthesized oil. Further, a rotor yoke 11 is affixed the opposite side of the principal plane 2 in the disk unit 4 of the rotary disk 6, that is, at the rotary shaft 5 side, and a ring-shaped rotary magnet 12 magnetized in plural poles is affixed to the rotor yoke 11 by adhesion or other method. A rotating element 13 is composed of the rotary disk 6, rotor yoke 11, and rotary magnet 12. On the other hand, a stator 16 having a coil 15 wound around plural magnetic poles of an iron core 14 is affixed to the base 10 by press-fitting, adhesion or other method, and the rotary magnet 12 and the iron core 14 winding the coil 15 are disposed oppositely to each other. As thrust attracting means for attracting the rotating element 13 magnetically to the fixed side bearing 9 side, a thrust attracting plate 17 is affixed to the base 10 so as to be opposite to the lower end face in the axial direction of the rotary magnet 12. The thrust attracting means is not limited to the thrust attracting plate, but, for example, the position in the axial direction of the central line 14a of the thickness in the axial direction of center of rotation of the iron core 14 of the stator 16 opposite against a radial gap may be disposed at the lower side of the position in the axial direction of the central line 12a of the width in the axial diction of center of rotation of the rotary magnet 12 of the rotating element 13 as shown in FIG. 1B. The configuration for allowing deviation in the axial direction between the central line 14a of the iron core 14 and the central line 12a of the rotary magnet 12 may be combined with the provision of the thrust attracting plate.

At the opening side end face 7a of the bearing sleeve 7 opposite to the lower side of the rotary disk 6, dynamic pressure generating groove 31 as shown in FIG. 3A are provided, and a thrust bearing 18 is formed. On the outer circumference of the rotary shaft 5 of the rotary disk 6 opposite to the inner circumference of the bearing sleeve 7, dynamic pressure generating grooves (not shown) are provided, and a radial bearing 19 is formed. By supplying a current into the coil 15, as known well, the rotary magnet 12 rotates, that is, the rotary disk 6 rotates, and by rotation of the rotary shaft 5, a dynamic pressure is generated in the dynamic pressure lubricant 21, and the bearing sleeve 7 and rotary disk 6 receive a dynamic pressure in the radial direction and axial direction, so that the rotary disk 6 is rotated smoothly around the center of rotation 1.

The following three elements may be considered as the rigidity of the bearing to withstand disturbance vibration.

1) Radial rigidity against external force applied in the direction orthogonal to the rotation center axis.

2) Axial rigidity against external force applied in the direction parallel to the rotation center axis.

3) Proof moment rigidity against moment torque applied in the direction orthogonal to the rotation center axis.

In the recording and reproducing apparatus handling disk-shaped memory medium such as hard disk, 3) proof moment rigidity is most important as compared with 1) radial rigidity or 2) axial rigidity. Herein, the proof moment rigidity is the rigidity against the disturbance moment acting to incline and deviate the axial center of the rotary shaft 5 from the center of rotation 1, and if this proof moment rigidity is low, by the vibration applied from outside, the in-surface vibration and out-surface vibration of the disk-shaped recording medium are induced, and accurate recording or reproducing by the head becomes difficult. The proof moment rigidity Kmr is determined by the rigidity of the radial bearing and thrust bearing at two positions. That is, the proof moment rigidity Km is expressed in formula (1).

$$Km = Kmr + Kmt \tag{1}$$

Figure 3B:
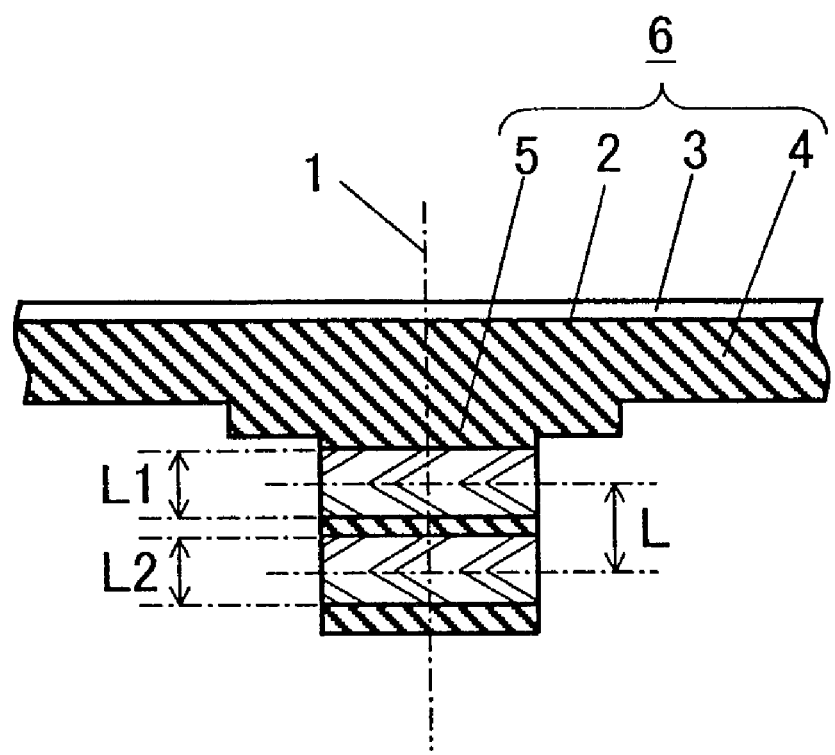
FIG. 3B is a sectional view of a rotary disk of the spindle motor in the first exemplary embodiment of the invention.

On the other hand, the proof moment rigidity Kmr by radial bearing is expressed in formula (2), in terms of radial rigidity $Kr_1$ of length $L_1$ portion, radial rigidity $Kr_2$ of length $L_2$ portion, and bearing span L as shown in FIG. 3B.

$$Kmr = L^2 \cdot Kr_1 \cdot Kr_2 / (Kr_1 + Kr_2) \tag{2}$$

The proof moment rigidity Kmt by thrust bearing is expressed in formula (3), in terms of average diameter D of the dynamic pressure generating grooves of the thrust bearing shown in FIG. 3A.

$$Kmt \propto D^3 \tag{3}$$

As clear from these formulas, the proof moment rigidity Km is higher as the bearing span L is longer and the average diameter of the thrust bearing is larger. Accordingly, in the motor of thin type, the bearing span L is restricted, and it is hard to increase the proof moment rigidity Kmr by the radial bearing. Therefore, by increasing the average diameter D of the thrust bearing by the lowered portion of the numerical value of the proof moment rigidity Kmr by radial bearing, it can be compensated by increasing the proof moment rigidity Kmt by thrust bearing.

Herein, by forming dynamic pressure generating grooves 31 in the opening side end face 7a of the bearing sleeve 7, it is relatively easy to increase the surface area for forming the dynamic pressure generating grooves 31, and further the position of forming the dynamic pressure generating grooves 31 is longer in distance in the radial direction from the center of rotation than in the prior art, and the axial rigidity and proof moment rigidity as the thrust bearing are higher, so that a thrust bearing of stable operation is realized.

Figure 4:
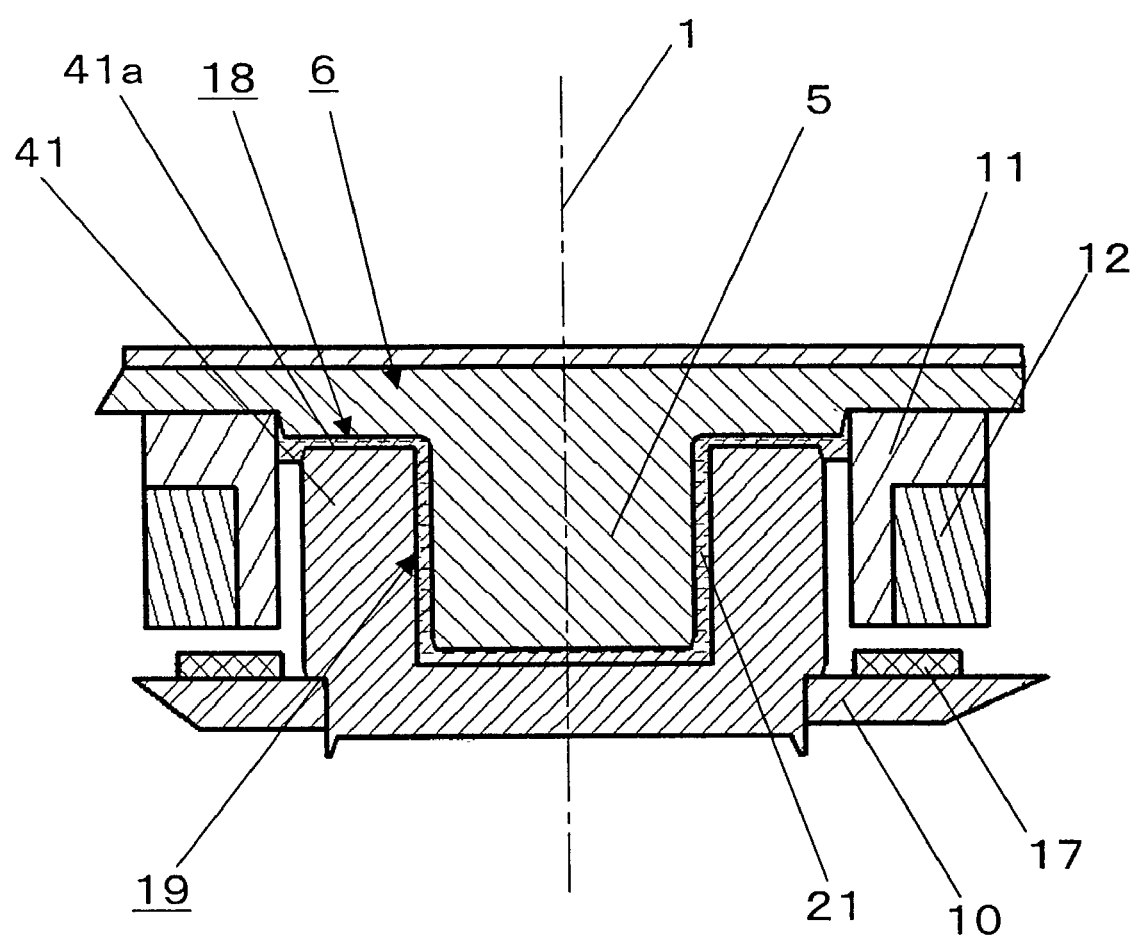
FIG. 4 is a sectional view showing other example of fixed side bearing of the spindle motor in the first exemplary embodiment of the invention.

Incidentally, instead of forming the fixed side bearing 9 by the cylindrical bearing sleeve 7 and thrust support plate 8, as shown in FIG. 4, it may be also formed as a ring-shaped integral fixed side bearing 41 in a tub shape sealed at one end (with a nearly U-shaped section). Since dynamic pressure generating grooves (not shown) are formed in the opening side end face 41*a* of the fixed side bearing 41 as the thrust bearing 18, it is relatively easy to fabricate the tub-shaped fixed side bearing 41 having dynamic pressure generating grooves in an integral body. Besides, since the thrust support plate 8 is not individually required, it is effective to save the cost.

Figure 5:
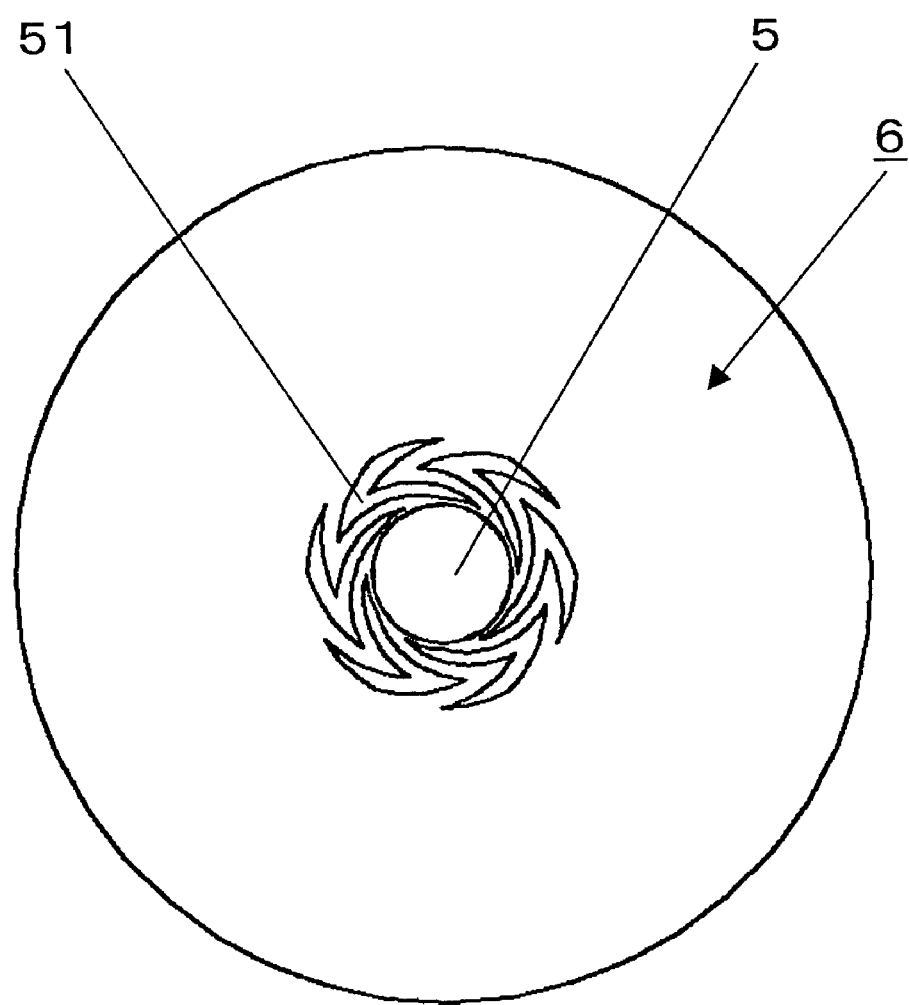
FIG. 5 is a plan view showing dynamic pressure generating grooves formed in the spindle motor in the first exemplary embodiment of the invention.

Instead of forming the dynamic pressure generating grooves 31 in the opening side end face 7*a* of the bearing sleeve 7 facing the lower side of the rotary disk 6 in the first exemplary embodiment (FIG. 1A, FIG. 2, FIG. 3A), the same effects are obtained by forming dynamic pressure generating grooves 51 at the lower side of the rotary disk 6 facing the opening side end face 7*a* of the bearing sleeve 7 as shown in FIG. 5 (a schematic plan view as seen from the opposite side of the principal plane of the rotary disk in FIG. 1A). The dynamic pressure generating grooves 51 are formed in the same shape as the dynamic pressure generating grooves 31 formed in the opening side end face 7*a* of the bearing sleeve 7. The dynamic pressure generating grooves for forming the radial bearing may be formed in the inner circumference of the bearing sleeve 7, instead of the outer circumference of the rotary shaft 5 facing the inner circumference of the bearing sleeve 7 as stated above.

Figure 6:
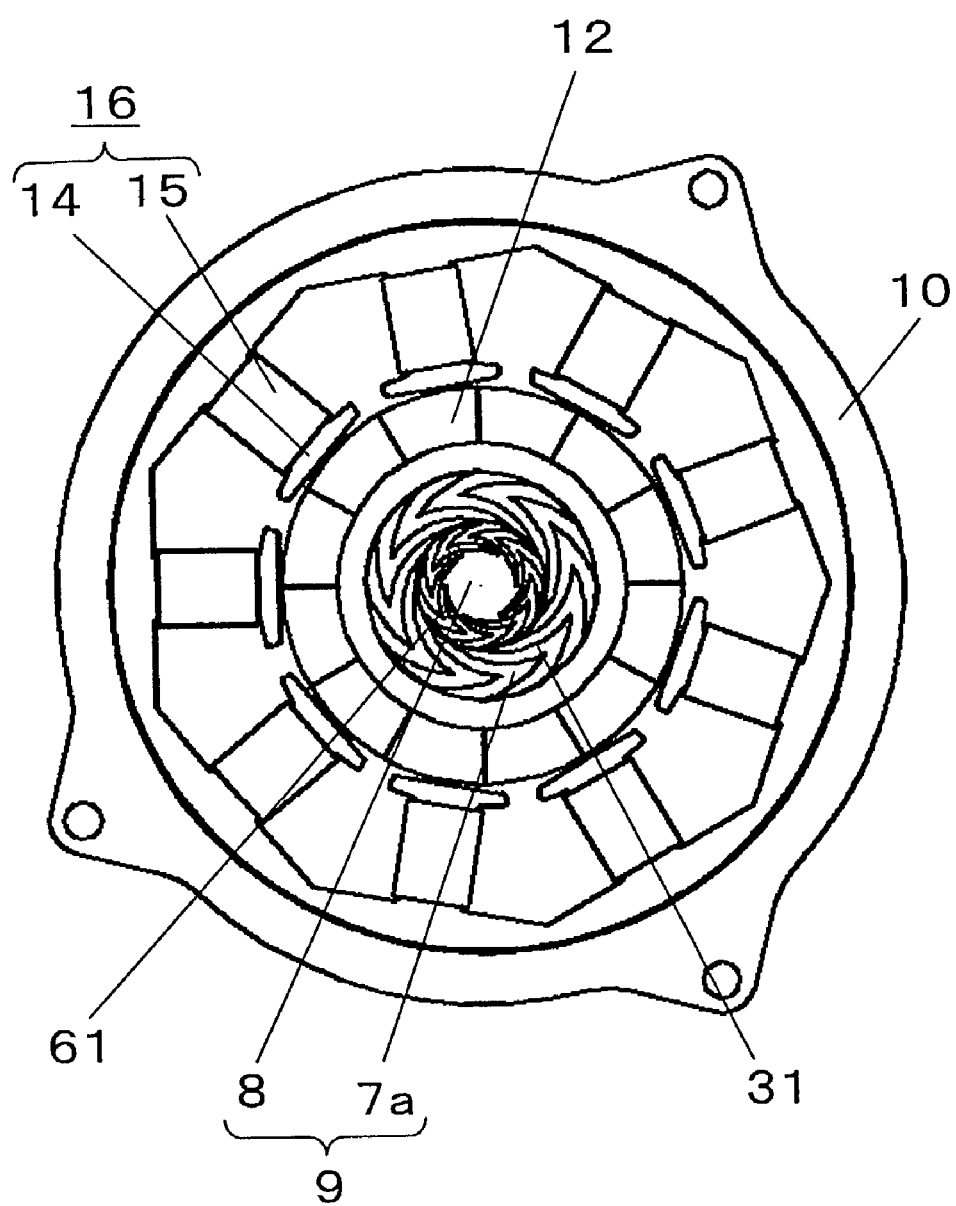
FIG. 6 is a top plan view of the portion excluding the rotary disk and rotor yoke in other example of the spindle motor in the first exemplary embodiment of the invention.

Other example of the first exemplary embodiment is explained schematically by referring to FIG. 1A, FIG. 2, and FIG. 6. FIG. 6 is a schematic plan view of other example of the first exemplary embodiment as seen from the portion excluding the rotary disk and rotor yoke in FIG. 1A. The dynamic pressure generating grooves 31 formed in the opening side end face 7*a* of the bearing sleeve 7 facing the lower side of the rotary disk 6 in the first exemplary embodiment are supposed to be first dynamic pressure generating grooves 31, and the thrust bearing formed by the first dynamic pressure generating grooves 31 is supposed to be a first thrust bearing 18. Further, as shown in FIG. 6, second dynamic pressure generating grooves 61 are formed on the upper side of the thrust support plate 8 facing the lower end face 5*a* of the rotary shaft 5 of the rotary disk 6, and a second thrust bearing 20 (see FIG. 1A) is composed. Same as in the first exemplary embodiment, on the outer circumference of the rotary shaft 5 of the rotary disk 6 facing the inner circumference of the bearing sleeve 7, third dynamic pressure generating grooves (not shown) are provided, and a radial bearing 19 is formed. By supplying an electric current to the coil 14, as known well, the rotary magnet 12 rotates, that is, the rotary disk 6 rotates. By rotation of the rotary disk 6, a dynamic pressure is generated in the dynamic pressure lubricant 21, and a dynamic pressure in the radial direction and axial direction is applied to the radial bearing 19, first thrust bearing 18 and second thrust bearing 20 formed in the bearing sleeve 7 and rotary disk 6, respectively, and the rotary disk 6 rotates smoothly around the center of rotation 1.

Figure 7:
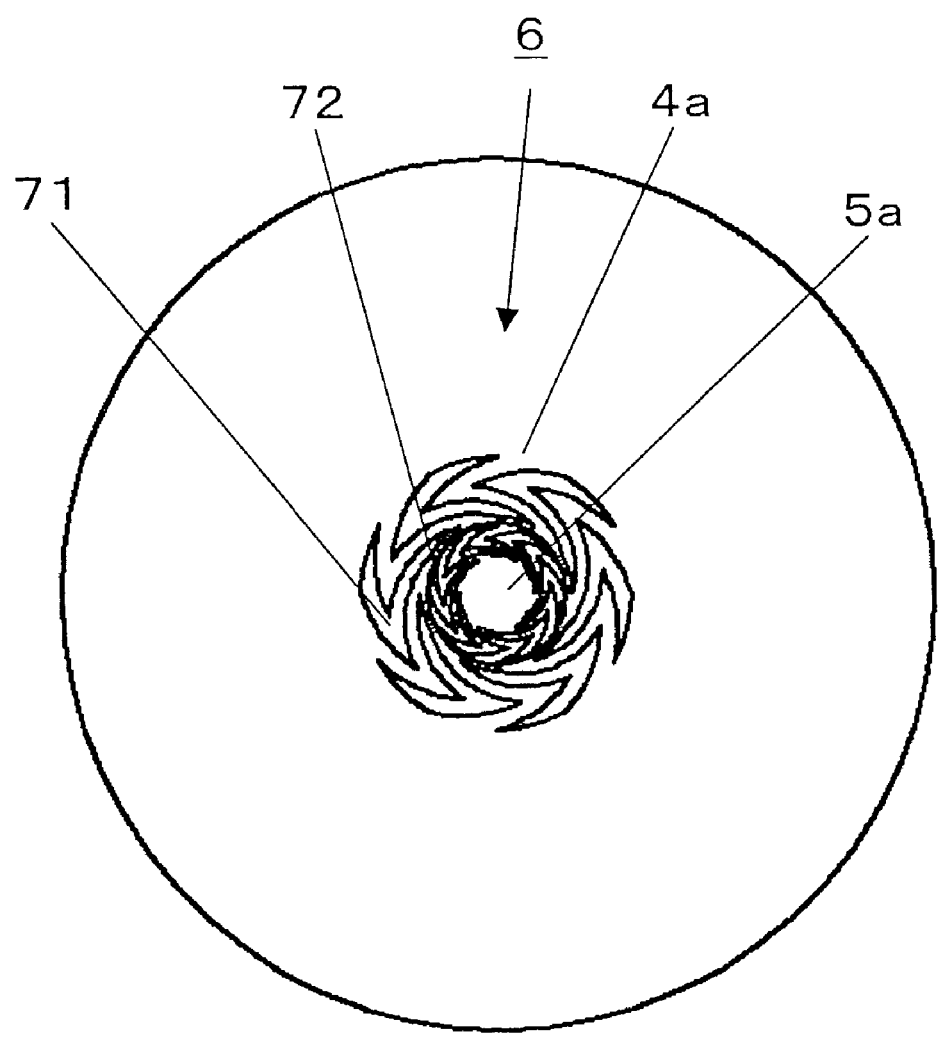
FIG. 7 is a plan view showing other example of dynamic pressure generating grooves formed in other example of the spindle motor in the first exemplary embodiment of the invention.

The dynamic pressure generating grooves comprise the first dynamic pressure generating grooves 31 at the opening side end face 7*a* of the bearing sleeve 7 in the first exemplary embodiment (FIG. 1A, FIG. 2, FIG. 3A), thereby forming the first thrust bearing 18, and comprise the second dynamic pressure generating grooves 61 on the upper side of the thrust support plate 8 facing the lower end 5*a* of the rotary shaft 5 of the rotary disk 6, without forming the second thrust bearing 20, but instead, as shown in FIG. 7 (schematic plan view of the rotary disk 6 as seen from the opposite side of the principal plane in FIG. 1A), the same effects are obtained by forming first dynamic pressure generating grooves 71 at the lower side 4*a* of the rotary disk 6 facing the opening side end face 7*a* of the bearing sleeve 7, and forming second dynamic pressure generating grooves 72 at the lower end 5*a* of the rotary shaft 5 of the rotary disk 6 facing the upper side of the thrust support plate 8. The individual dynamic pressure generating grooves are formed in the same shape as the first dynamic pressure generating grooves 31 formed in the opening side end face 7*a* of the bearing sleeve 7, and the second dynamic pressure generating grooves 61 formed at the thrust surface at the upper side of the thrust support plate 8 facing the lower end 5*a* of the rotary shaft 5. In such configuration, when fabricating the rotary disk 6 by integrally forming the disk unit 4 and rotary shaft 5 by using, for example, a die, the first dynamic pressure generating grooves 31 and second dynamic pressure generating grooves 61 can be formed simultaneously, and the manufacturing cost of the first and second dynamic pressure generating grooves can be substantially saved.

The first dynamic pressure generating grooves 31 are formed in the opening side end face 7*a* of the bearing sleeve 7, and the second dynamic pressure generating grooves 72 are formed at the lower end face 5*a* of the rotary shaft 5 in one combination, and in other combination, for example, the first dynamic pressure generating grooves 71 may be formed in the lower side of the rotary disk 6 facing the opening side end face 7*a* of the bearing sleeve 7, and the second dynamic pressure generating grooves 61 may be formed in the upper side of the thrust support plate 8 facing the lower end face 5*a* of the rotary shaft 5 of the rotary disk 6. Further, the third dynamic pressure generating grooves may be formed in the inner circumference of the bearing sleeve 7, instead of the outer circumference of the rotary shaft 5 facing the inner circumference of the bearing sleeve 7 as stated above.

In this way, by forming the first thrust bearing and second thrust bearing, the thrust rigidity is higher, and the length of the radial bearing in the axial direction can be shortened, so that a further reduction of thickness is possible.

Moreover, by generating a magnetic attracting force in the axial direction between the rotary magnet 12 and thrust attracting plate 17, or between the iron core 14 and rotary magnet 12, by employing the thrust attracting means, such as the thrust attracting plate 17 disposed at the lower end face of the rotary magnet 12 facing in the axial direction (axial direction of center of rotation), or the layout in which central line 14*a* of the thickness in the rotation center axial direction of the iron core 14 of the stator 16 maybe at the lower side of the central line 12*a* of the width in the rotation center axial direction of the rotary magnet 12 of the rotating element 13, the lifting extent of the thrust bearing as the fluid bearing is determined. The lifting extent is smaller when the oil viscosity is lower, and the bearing rigidity of the thrust bearing can be enhanced. Therefore, in high temperature condition when the oil viscosity declines, the bearing rigidity of the thrust bearing is not lowered relatively as compared with the case of low temperature condition, but it is rather higher in high temperature condition. As a result, the bearing rigidity of the thrust bearing is not lowered in high temperature region, and stable recording or reproducing may be realized.

Besides, by installing thrust attracting means such as thrust attracting plate 17 facing the lower end of the rotary magnet 12, and by filling the gap formed between the recess of the fixed side bearing 9 and rotary shaft 5 of the rotary disk 6 with the dynamic pressure lubricant 21, regardless of any change in position of the information recording and reproducing apparatus mounting the spindle motor, the rotary shaft 5 of the rotary disk 6 receives the magnetic force of the thrust attracting means and is not dislocated from the recess of the fixed side bearing 9. Owing to the viscosity or surface tension of the dynamic pressure lubricant 21 itself, the dynamic pressure lubricant 21 does not flow out, and the dynamic pressure lubricant 21 is not lost. Further, even during rotation of the rotary disk 6, smooth rotation in balanced state is achieved by the generated dynamic pressure of the dynamic pressure lubricant 21, own weight of the rotary disk 6, and magnetic force by the thrust attracting means.

Figure 38:
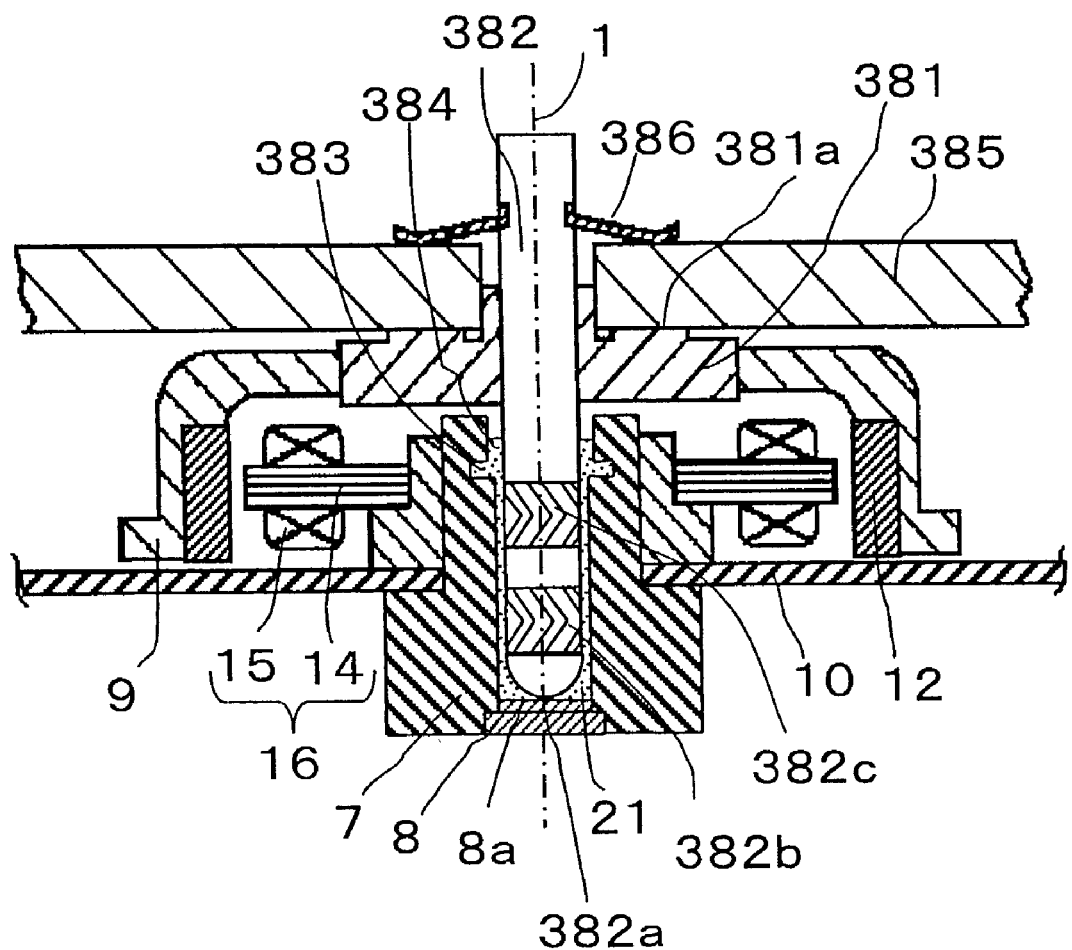
FIG. 38 is a sectional view showing principal parts of an information recording and reproducing apparatus having a conventional spindle motor.
Figure 39:
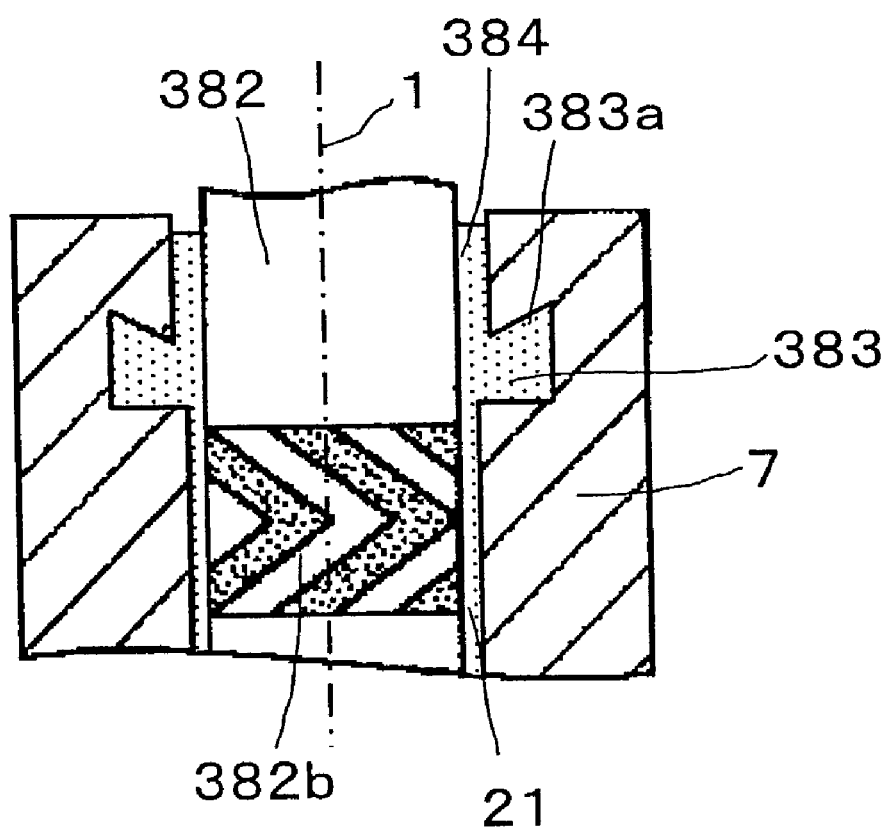
FIG. 39 is a partially magnified view of a radial bearing of the conventional spindle motor.
Figure 40:
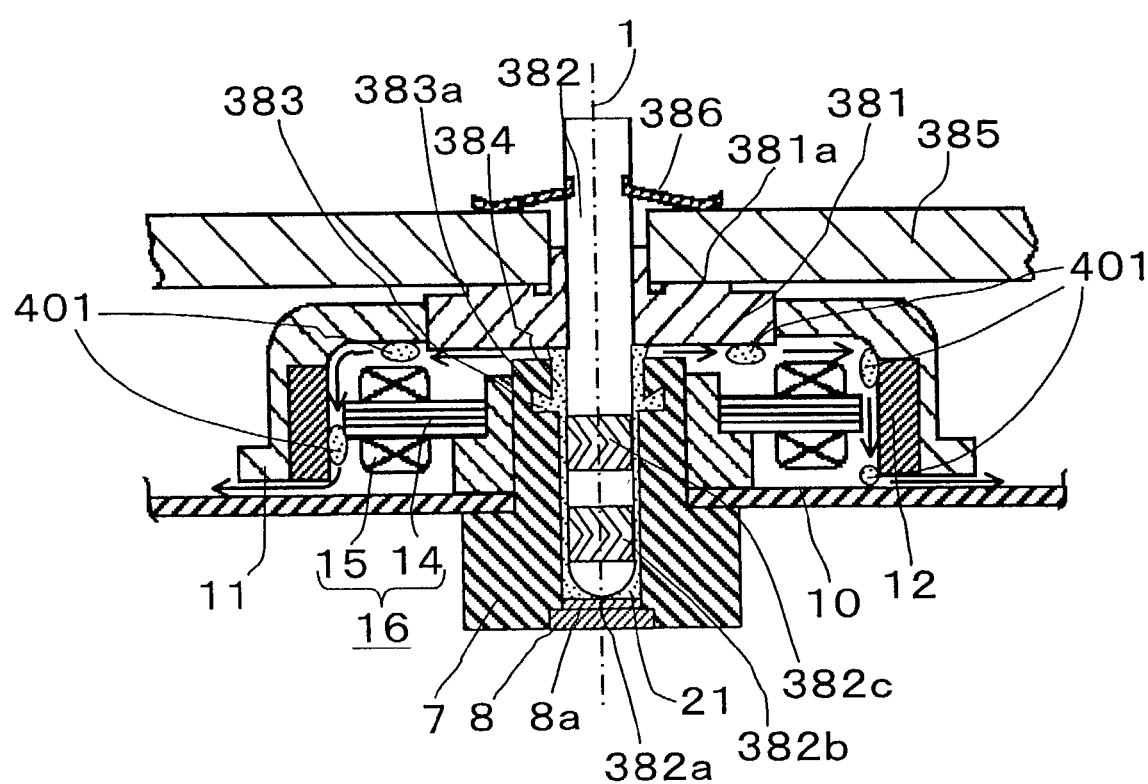
FIG. 40 is a sectional view for explaining oozing-out of dynamic pressure lubricant in the conventional spindle motor.

In this configuration of integral forming of the disk unit 4 having the information recording medium layer and the rotary shaft 5 on the principal plane, the plural parts of the rotary shaft, rotor hub and disk board in the prior art are assembled into a single part, and the member for tightening the disk board is not needed, and the cost is saved, and moreover the squareness of the principal plane 2 of the disk unit 4 for recording the information signal to the center of rotation 1 is very high in precision as compared with the prior art (see FIG. 38) in which the disk board 385 is coupled to the flange 381a of the rotor hub 381 of the spindle motor for driving the disk board 385 by means of a tightening member, and surface deflection due to poor squareness can be significantly decreased. At the same time, the vibration outside of plane can be suppressed. Further, between the rotary disk and the opening side end face of the bearing sleeve, and the thrust support plate, by disposing a first thrust bearing and a second thrust bearing, respectively, the thrust bearing rigidity is notably enhanced, and a high thrust rigidity is obtained if the motor is reduced in size, and a disk surface deflection of higher precision will be realized.

Figure 8:
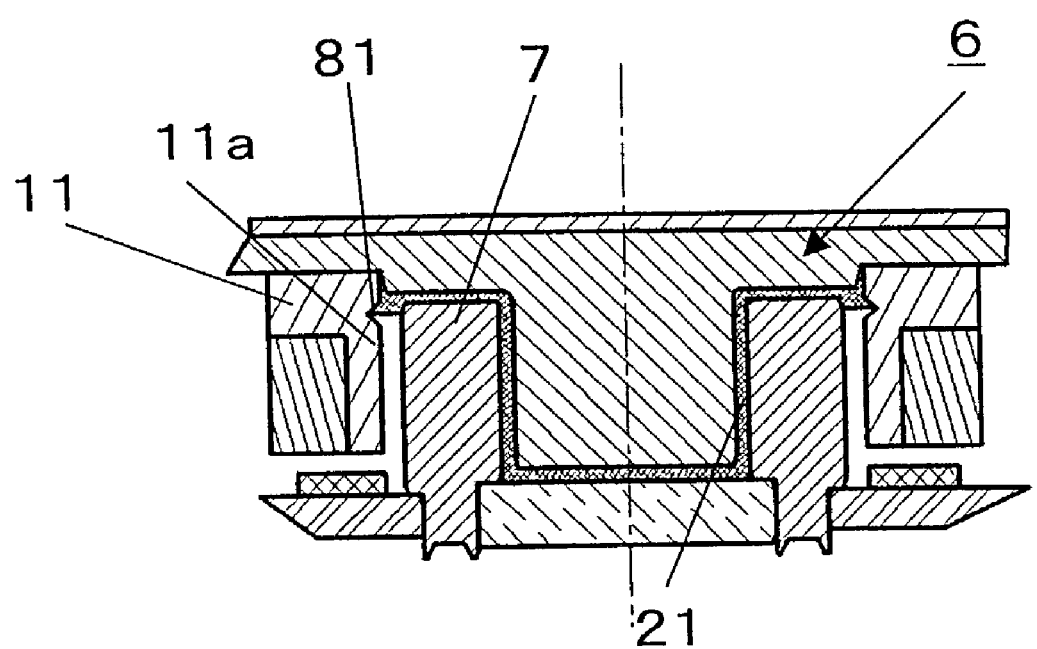
FIG. 8 is a partially magnified view showing other example of bearing portion of the spindle motor in the first exemplary embodiment of the invention.
Figure 9:
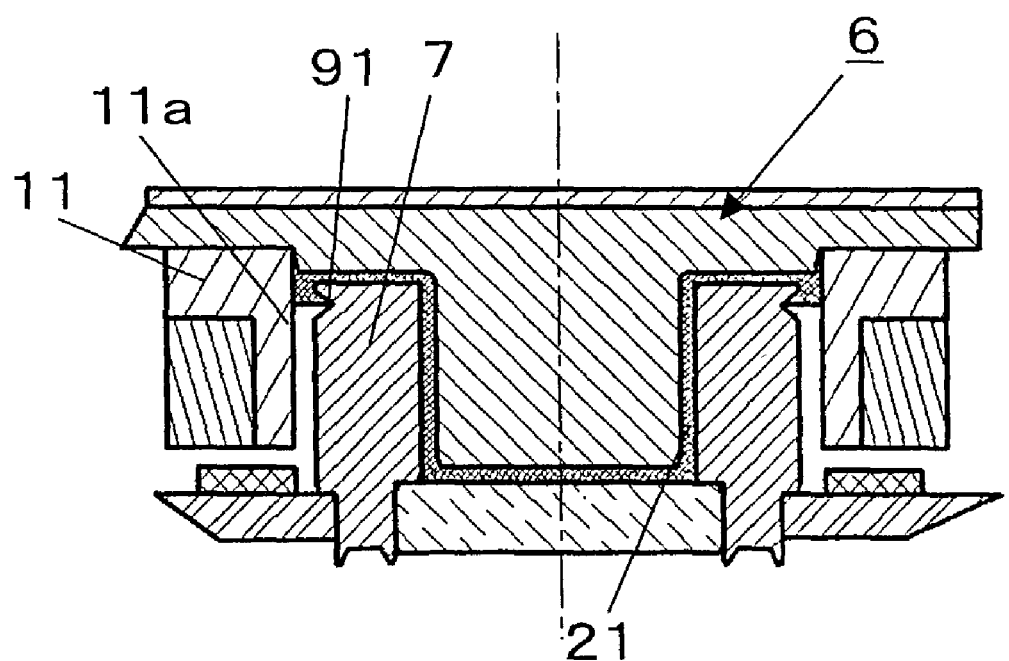
FIG. 9 is a partially magnified view showing other example of bearing portion of the spindle motor in the first exemplary embodiment of the invention.
Figure 10:
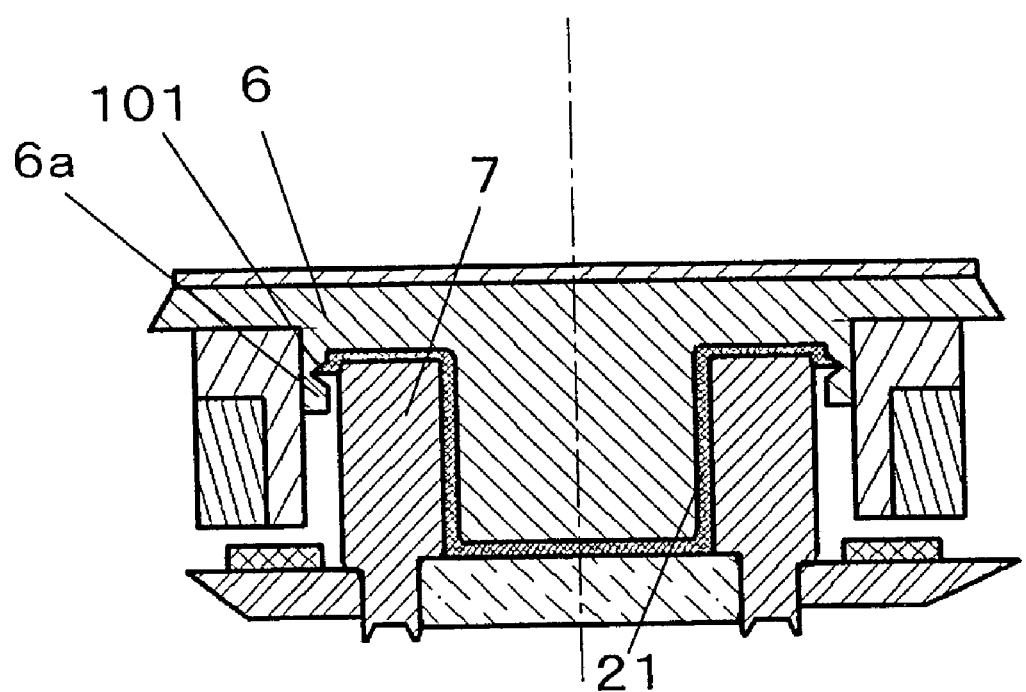
FIG. 10 is a partially magnified view showing other example of bearing portion of the spindle motor in the first exemplary embodiment of the invention.

Also as shown in FIG. 8, by forming a lubricant sump 81 of ring groove in the annular wall 11a of the rotor yoke 11 facing the outer circumference of the bearing sleeve 7, or, as shown in FIG. 9, by forming a lubricant sump 91 of ring groove on the outer circumference of the bearing sleeve 7 facing the annular wall 11a of the rotor yoke 11, or, as shown in FIG. 10, by forming an annular wall 6a of ring protuberance having a lubricant sump 101 of ring groove in the lower side of the rotary disk 6 so as to have a tiny gap in the outer circumference of the bearing sleeve 7, the dynamic pressure lubricant 21 may be made hard to flow out along the outer circumference of the bearing sleeve. In the diagrams, the lubricant sump 81, 91 or 101 is shown in a triangular sectional shape, but the shape is not specified and may include circular and other shape.

Figure 11:
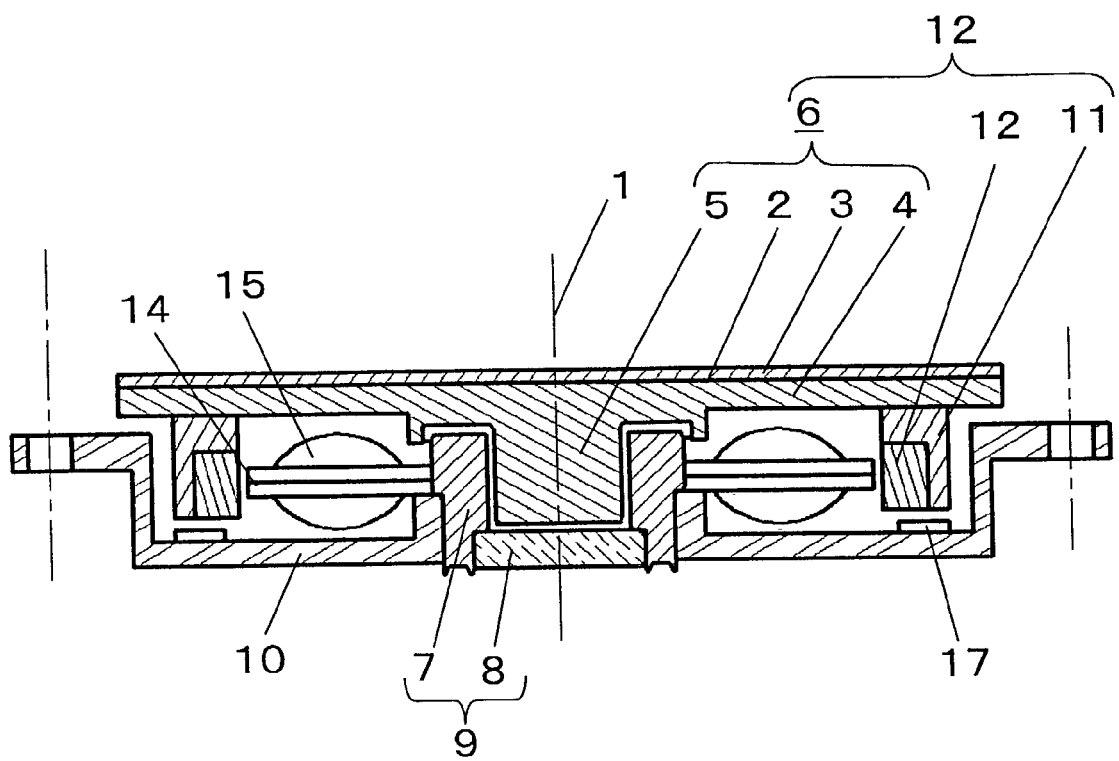
FIG. 11 is a sectional view showing principal parts of an outer rotor type motor in the first exemplary embodiment of the invention.

In the first exemplary embodiment, the structure of the so-called inner rotor type is explained, that is, the rotary magnet 12 affixed to the rotor yoke 11 is disposed oppositely to the iron core 14, in the inside (the center of rotation 1 side) of the iron core 14 on which the coil 15 is wound, but, as shown in FIG. 11, it may be designed in the so-called outer rotor type, that is, the rotary magnet 12 affixed to the rotor yoke 11 is disposed oppositely to the outer circumference side of the iron core 14 on which the coil 15 is wound. In FIG. 11, the elements corresponding to the constituent elements in FIG. 1A are identified with same reference numerals as in FIG. 1A. In FIG. 11, the iron core 14 on which the coil 15 is wound is affixed to the bearing sleeve 7 by press-fitting or adhering method, and the fixed side bearing 9 is composed of the bearing sleeve 7 and thrust support plate 8, and the rotary magnet 12 affixed to the rotor yoke 11 is affixed to the rotary disk 6 by adhering or other method, and the iron core 14 and rotary magnet 12 are disposed oppositely to each other. The other points are same as in the inner rotor type in FIG. 1A, and detailed description is omitted. Meanwhile, the iron core 14 may be affixed to the base 10 by adhering or other method.

Figure 12:
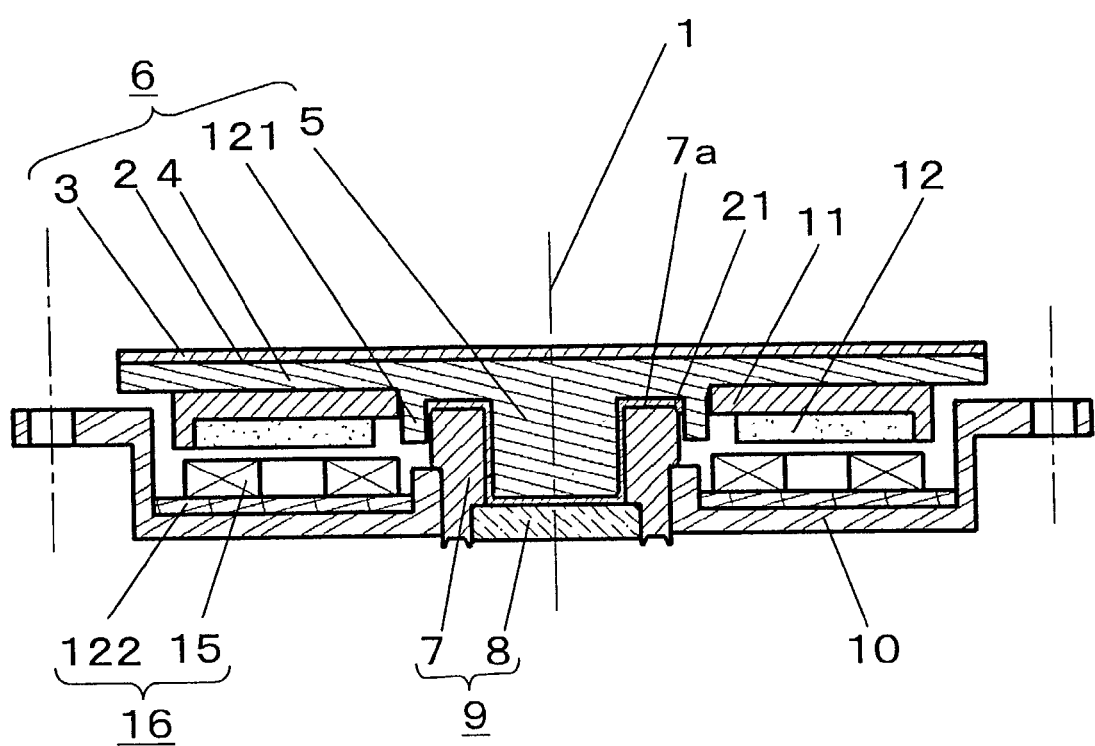
FIG. 12 is a sectional view showing principal parts of an axial gap type motor in the first exemplary embodiment of the invention.

The first exemplary embodiment relates to the so-called radial gap type motor, but the motor may be also formed in the so-called axial gap type as shown in FIG. 12. FIG. 12 is a schematic sectional view showing an example of principal parts of the spindle motor having a configuration of axial gap type motor. Herein, the elements corresponding to the constituent elements in FIG. 1A are identified with same reference numerals as in FIG. 1A. In FIG. 12, an information recording medium layer 3 is formed in the principal plane 2 vertical to the axial direction of the center of rotation 1, and on the opposite side of the principal plane 2, there is a rotary disk 6 integrally forming a disk unit 4 having an annular wall 121 as a ring protuberance, and a rotary shaft 5 at the opposite side of the principal plane 2, and a fixed side bearing 9 closed at one end is formed of a bearing sleeve 7 of ring shape having an inner circumference forming a tiny gap against the outer circumference of the rotary shaft 5 of the rotary disk 6 and a thrust support plate 8 facing the lower end face of the rotary shaft 5 of the rotary disk 6, and this fixed side bearing 9 is affixed to the base 10. It is same as in the axial gap type motor that the tiny gap between the rotary disk 6 and fixed sided bearing 9 is packed with the dynamic pressure lubricant 21. The different points are as follows: as shown in FIG. 12, at the opposite side of the principal plane 2 in the disk unit 4 of the rotary disk 6, that is, at the side of the rotary shaft 5, the rotor yoke 11 is affixed by adhering or other method, and the rotary magnet 12 in rink shape magnetized in plural poles is similarly affixed to the rotor yoke 11 by adhering or other method, and on the other hand, for example, a stator 16 having a plurality of coils 15 in nearly triangular shape wound on a printed wiring board 122 is affixed to the base 10, and the rotary magnet 12 and coil 15 are disposed oppositely to each other so as to have a gap in the axial direction.

In each type of the first exemplary embodiment (inner rotor type and outer rotor type in the radial gap type, and axial gap type), the assembly of inserting the rotary shaft into the bearing sleeve and filling with dynamic pressure lubricant is explained. A specified amount of dynamic pressure lubricant is weighed, and a part is dropped into the recess of the fixed side bearing, and the fixed side bearing is put into a vacuum chamber in this state, and is evacuated. After holding the evacuated state for a specified time, the evacuated state is once released to return to an atmospheric pressure. As a result, the air staying in the fixed side bearing at time of assembling is removed, and the inside is replaced with the dynamic pressure lubricant from which air bubbles are removed similarly. Further, the rest of the specified amount of the dynamic pressure lubricant is dropped into the fixed side bearing, and the rotary shaft of the rotary disk is inserted into the fixed side bearing in a vacuum state, and this state is held for a specified time. Later, by returning to an atmospheric pressure, the dynamic pressure lubricant sufficiently permeates into the gap formed between the rotary disk and fixed side bearing, and air bubbles are removed from the dynamic pressure lubricant filling the gap, and also overflow of the dynamic pressure lubricant at the time of assembling can be prevented. Moreover, since air bubbles are removed from the dynamic pressure lubricant, it is free from expansion of air bubbles due to temperature rise during operation, so that a further stable bearing performance is exhibited.

Figure 13:
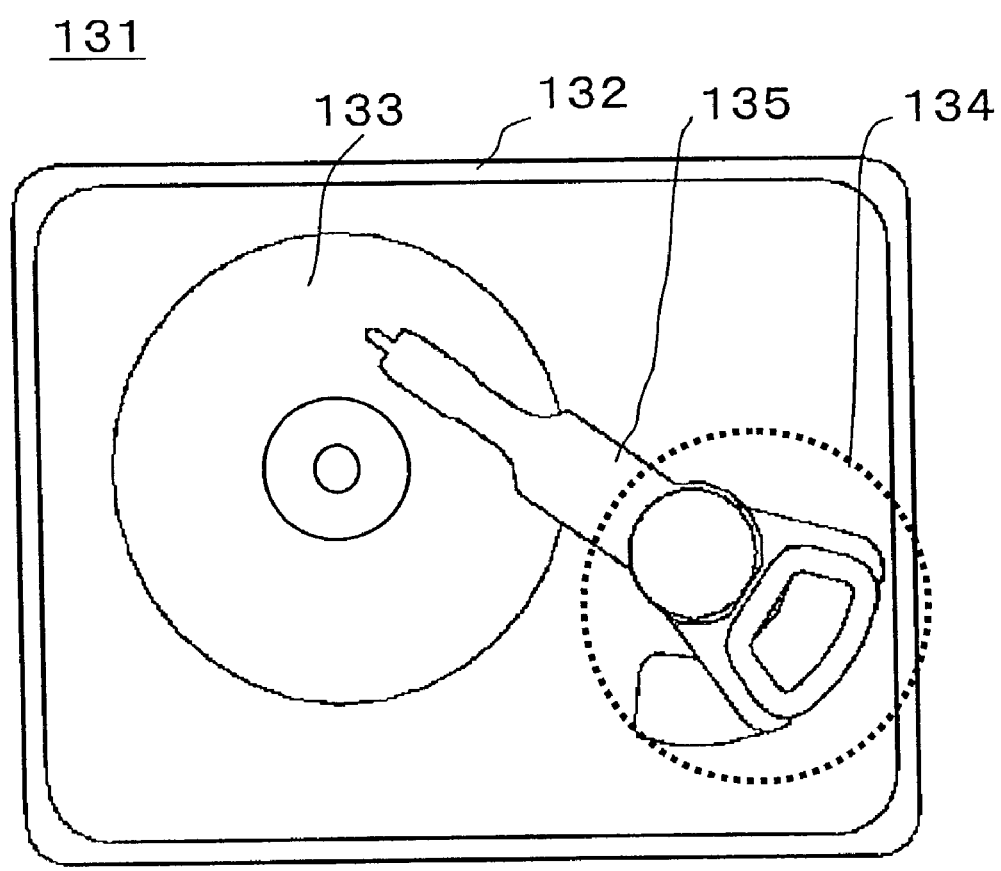
FIG. 13 is a top plan view of principal parts, with the cover removed, of an information recording and reproducing apparatus using the spindle motor in the first exemplary embodiment of the invention.

FIG. 13 is a top view, with the cover removed, showing a schematic plan view of an information recording and reproducing apparatus incorporating this spindle motor.

In a housing case 132 of an information recording and reproducing apparatus 131, a spindle motor 133 for rotating a rotary disk having an information recording medium layer formed on its upper surface and a magnetic head actuator 134 are fixed, and the housing of the information recording and reproducing apparatus 131 is enclosed by a cover (not shown), and entry of foreign matter from outside and disturbance of air stream are prevented. In the oscillating means composed of the magnetic head actuator 134 and magnetic head arm 135, other end of the magnetic head arm 135 is rotatably supported by an arm bearing (not shown), and by operation of the magnetic head actuator 134, the magnetic head arm 135 having a magnetic head slider (not shown) oscillates, and positions the magnetic head slider at a specified track position on the information recording medium layer. Recording of information in the information recording medium layer or reproduction of information therefrom is executed in a known method by using a magnetic head (not shown) which is an information converting element mounted on the magnetic head slider.

As the information converting means, instead of using the magnetic head, an optical pickup using an objective lens for focusing the light may be also used in a known method.

In the information recording and reproducing apparatus having such configuration, the principal plane of the disk unit forming the information recording medium layer has a very high precision of rotation, and the spindle motor is reduced in thickness, and therefore high density recording is realized in a very thin type, and moreover the tightening member for fixing the disk board used in the prior art is not needed, and the cost can be lowered.

Thus, according to the first exemplary embodiment of the invention, by integrating the disk unit having the information recording medium layer on the principal plane and the rotary shaft, or by forming to as to be integral, the squareness of the principal plane of the disk unit in which the information signal is recorded to the center of rotation is very high in precision. Therefore, surface deflection due to poor squareness can be substantially decreased, and the vibration outside of plane can be suppressed, and the recording density can be enhanced. At the same time, deflection in the radial direction with respect to the center of rotation can be suppressed, and deviation between the center of rotation of servo signal transferred preliminarily to follow up accurately to the concentric plural recording tracks on the information signal recording surface of the disk unit and the center of rotation during actual operation of the disk unit can be also suppressed, and a high recording density is realized. Further, since length error of the rotary shaft has no effect on the height error of the rotary disk, the dimensional tolerance in manufacture of parts may be relatively alleviated, which may contribute to a substantial reduction of cost.

Further, by composing the thrust bearing by forming dynamic pressure generating grooves in either the opening side end face of the bearing sleeve of the fixed side bearing or lower side of the rotary disk facing the opening side end face, the thrust bearing is formed at a position becoming larger in the radial direction with respect to the center of rotation. Therefore, the bearing rigidity as the thrust bearing is higher, and a disk surface deflection of very high precision is realized, and a high recording density is realized. Moreover, while suppressing the radial bearing dimension, a proof moment rigidity to the disturbance moment applied to the rotating element can be assured, so that the thickness of the spindle motor can be reduced substantially.

Or, by composing a first thrust bearing by forming first dynamic pressure generating grooves in either the opening side end face of the bearing sleeve of the fixed side bearing or the lower side of the rotary disk facing the opening side end face, and composing a second thrust bearing by forming second dynamic pressure generating grooves either at the upper side of the thrust support plate of the fixed side bearing or at the lower end of the rotary shaft of the rotary disk facing the upper side of the thrust support plate, the thrust rigidity as the thrust bearing is further enhanced, and a high thrust bearing rigidity is obtained if the motor is reduced in size, and disk surface deflection and axial center deflection of higher precision can be realized, so that a high recording density is realized.

By generating a magnetic attracting force in the axial direction between the rotary magnet and thrust attraction plate, or between the iron core of the stator and the rotary magnet of the rotating element, the bearing rigidity of the thrust bearing is not lowered in high temperature region, and a stable disk surface deflection of high precision is obtained, and stable recording and reproducing at high precision can be realized.

By using the rotary disk functioning as part of the rotating element of the spindle motor, unlike the prior art, the member for clamping the disk to the flange of the rotor hub of the spindle motor and the rotor hub itself are not needed, and the cost is lowered and the thickness is reduced at the same time.

Mounting the spindle motor having such configuration, an excellent information recording and reproducing apparatus having a very high recording density and reduced in size and thickness is realized.

Second Exemplary Embodiment

Figure 14:
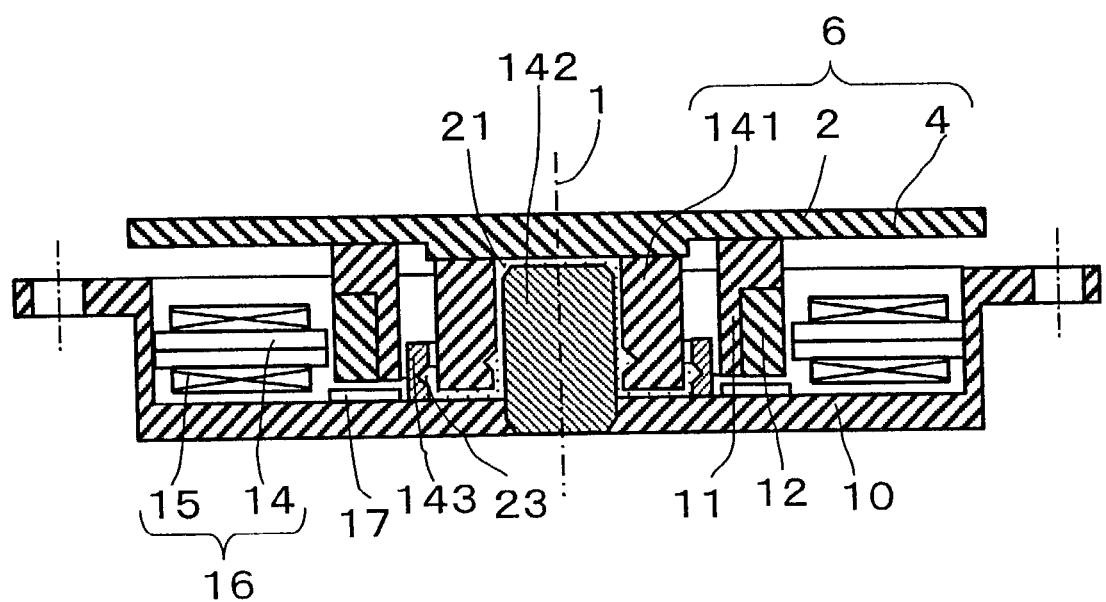
FIG. 14 is a sectional view showing principal parts of a spindle motor in a second exemplary embodiment of the invention.

FIG. 14 is a sectional view explaining principal parts of a spindle motor in a second exemplary embodiment of the invention. In FIG. 14, elements corresponding to the constituent elements in the first exemplary embodiment are identified with same reference numerals as in FIG. 1A. The spindle motor in the second exemplary embodiment differs from the first exemplary embodiment in that the rotary disk is an integrated structure of disk unit and cylindrical rotary cylindrical part, and rotates about the central shaft of the bearing support shaft affixed to the base as the center of rotation.

In FIG. 14, a rotary disk 6 is composed by integrally forming a disk unit 4 having an information recording medium layer (not shown) on a principal plane 2 vertical to the center of rotation 1, and a rotary cylindrical part 141 which is a cylindrical rotary shaft at the opposite side of the principal plane 2. A rotor yoke 11 is affixed to the forming side of the rotary cylindrical part 141 at the opposite side of the principal plane 2 of the disk unit 4, and an annular rotary magnet 12 magnetized in plural poles is fixed to the rotor yoke 11 by adhering or other method. The rotary disk 6, rotor yoke 11, and rotary magnet 12 are combined to compose a rotating element 13. One end of a bearing support shaft 142 which is a fixed side bearing is affixed to the base 10, and at the other end, further, a stator 16 having a coil 15 wound in an iron core 14 is affixed to the base 10 by press-fitting or other method. In order to form a tiny gap between the inner circumference of the rotary cylindrical part 141 integrally formed in the rotary disk 6, and the outer circumference of the bearing support shaft 142, the bearing support shaft 142 is inserted into the opening of the rotary cylindrical part 141, and the rotary magnet 12 is disposed so as to face the stator 16 composed of the iron core 14 having the coil 15. Further, a cylindrical member 143 is affixed to the base 10 so as to be positioned between the rotary cylindrical part 141 and the rotor yoke 11 fixing the rotary magnet 12, and at the inner circumference of the cylindrical member 143, there is a lubricant sump 144 having annular grooves cut near the base 10, formed oppositely to the outer circumference of the rotary cylindrical part 141. The cylindrical member 143 may be formed integrally with the base 10. Either in the opening side end face of the rotary cylindrical part 141 of the rotary disk 6 or the upper side of the base 10 facing the opening side end face, dynamic pressure generating grooves (not shown) are formed same as the dynamic pressure generating grooves 51 in FIG. 5 in the first exemplary embodiment or the dynamic pressure generating grooves 31 in FIG. 3A, and a thrust bearing is composed. Further, either in the outer circumference of the bearing support shaft 142 or the inner circumference of the rotary cylindrical part 141 facing the outer circumference of the bearing support shaft 142, dynamic pressure generating grooves (not shown) are formed, and a radial bearing is composed. The gap between the bearing support shaft 142 and rotary cylindrical part 141, and at least the gap between the opening side end face of the rotary cylindrical part 141 and the base 10 facing it are packed with a dynamic pressure lubricant 21 such as ester compound synthesized oil. By using thrust attracting means, such as a thrust attraction plate 17 affixed to the base 10 so as to be opposite to the axial direction lower end of the rotary magnet 12, the rotating element 13 is magnetically attracted to the bearing support shaft 142 side, and thereby a spindle motor is composed. The thrust attracting means is same as in the first exemplary embodiment, and its explanation is omitted herein.

The operation of the spindle motor in the second exemplary embodiment having such configuration is same as in the first exemplary embodiment, and its detailed description is omitted, but, specifically, by supplying a current to the coil 15, the rotary cylindrical part 141 formed integrally with the rotary disk 6 is put in rotation. By rotation of the rotary cylindrical part 141, a dynamic pressure is generated by the action of the packed dynamic pressure lubricant 21 with the radial dynamic pressure generating grooves formed either in the outer circumference of the bearing support shaft 142 or the inner circumference of the rotary cylindrical part 141 facing the outer circumference of the bearing support shaft 142, and the thrust dynamic pressure generating grooves formed either in the opening side end face of the rotary cylindrical part 141 or the side of the base 10 facing this opening side end face. The bearing support shaft 142 receives a dynamic pressure in the radial direction and thrust direction, so that the rotary disk 6 rotates smoothly in a contact-free state about the bearing support shaft 142 on the rotation center axis 1 as the center of rotation.

Therefore, in the rotary disk 6 of the spindle motor having the fluid bearing structure, since the rotary cylindrical part 141 and disk unit 4 are formed integrally, the plural constituent parts in the prior art comprising the rotary shaft, rotor hub and circular disk board are assembled into a single part, and the number of parts is curtailed and the cost of parts is saved, and it is possible to avoid accumulation of errors due to precision of plural parts and precision of processing or press-fitting height errors and others in the assembling process of press-fitting the rotor hub into the rotary shaft for fixing the circular disk board, and disk surface deflection and axial center deflection in rotation can be decreased substantially. Further, by composing a thrust bearing by forming dynamic pressure generating grooves either in the opening side end face of the rotary cylindrical part 141 or the upper side of the base 10 facing this opening side end face, it is relatively easy to widen the surface area for forming the dynamic pressure generating grooves, and same as in the first exemplary embodiment, the lowered portion of the numerical value of the proof moment rigidity Kmr by the radial bearing can be compensated by increasing the proof moment rigidity Kmt by the thrust bearing by increasing the average radius D of the thrust bearing, so that the numerical value can be maintained high as the proof moment rigidity Km. Moreover, the position for forming the dynamic pressure generating grooves is longer in the distance in the radial direction from the center of rotation than in the prior art, and the axial rigidity and proof moment rigidity as the thrust bearing are enhanced, so that a thrust bearing of stable operation can be formed.

Other example of spindle motor in the second exemplary embodiment of the invention is described by referring to FIG. 14. Herein, the points different from the second exemplary embodiment of the invention are explained below.

Figure 15:
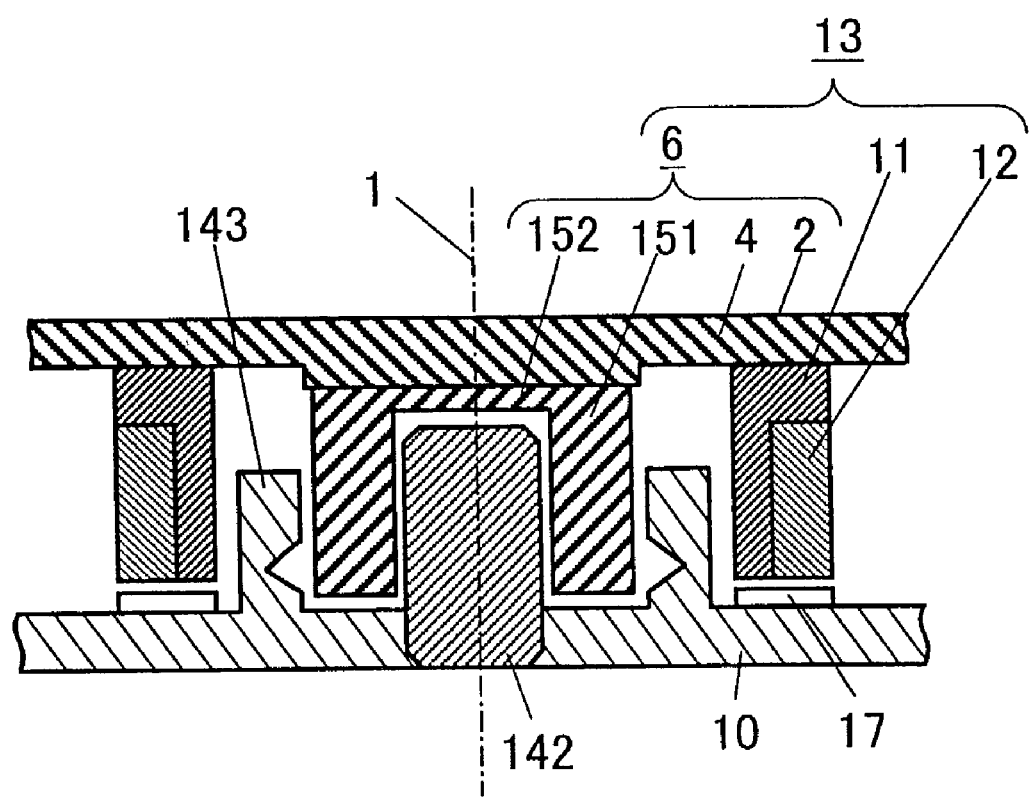
FIG. 15 is a sectional view showing other example of rotary cylindrical part in the spindle motor in the second exemplary embodiment of the invention.

In FIG. 14, a first thrust bearing is composed by forming first dynamic pressure generating grooves (not shown) either in the opening side end face of the rotary cylindrical part 141 of the rotary disk 6 or the upper side of the base 10 facing this opening side end face. Further, a second thrust bearing is composed by forming second dynamic pressure generating grooves (not shown) either in the opposite side to the principal plane 2 of the disk unit 4 facing the upper end face of the bearing support shaft 142 (hereinafter called the lower side of the disk unit 4 or rotary disk 6) or the upper end face of the bearing support shaft 142. The first dynamic pressure generating grooves and second dynamic pressure generating grooves are same dynamic pressure generating grooves as the first dynamic pressure generating grooves 71 in FIG. 7 or first dynamic pressure generating grooves 31 in FIG. 6, and second dynamic pressure generating grooves 72 in FIG. 7 or second dynamic pressure generating grooves 61 in FIG. 6 in the first exemplary embodiment. A radial bearing is composed by forming the first dynamic pressure generating grooves and second dynamic pressure generating grooves, and further third dynamic pressure generating grooves (not shown) either in the outer circumference of the bearing support shaft 142 or inner circumference of the rotary cylindrical part 141 facing the outer circumference of the bearing support shaft 142. The other configuration is same as in the second exemplary embodiment of the invention mentioned above, and specific description is omitted. The rotary cylindrical part 141 is not limited to cylindrical shape, and it may be replaced, for example, by a rotary cylindrical part 151 of reverse tub shape (reverse U shape) sealed at the upper end as shown in FIG. 15. By using the rotary cylindrical part 151 sealed at the upper end, the first dynamic pressure generating grooves and second dynamic pressure generating grooves can be formed in the opening side end face of the rotary cylindrical part 151 and inside of the bottom end face 152 of the recess in reverse tub shape, respectively.

In this way, by forming the first thrust bearing and second thrust bearing, the bearing rigidity as the thrust bearing is further enhanced, and the thrust bearing of stabler operation is formed, and the disk surface deflection and its axial center deflection during rotation can be more notably decreased. If the motor is reduced in size, a very high thrust rigidity is obtained, and a disk surface deflection of high precision can be maintained.

The plural parts in the prior art comprising the rotary shaft, rotor hub and disk board are assembled into one part, and the member for tightening the disk board is not needed, and the cost is saved. Besides, the disk unit 4 and rotary cylindrical part 141 are integrally formed, and the rotary disk 6 is formed, and therefore the surface deflection and axial center deflection of the principal plane 2 of the information recording medium layer formed on the disk unit 4 during rotation can be notably decreased, and the vibration outside of plane can be suppressed, so that the same effects as in the second exemplary embodiment of the invention are obtained.

As the spindle motor of the information recording and reproducing apparatus in the second exemplary embodiment, the so-called inner rotor type motor is explained, that is, the rotary magnet is disposed oppositely to the inner circumference of the stator, but the invention is not limited to this type alone, and the same effects are obtained in the configuration of so-called outer rotor type motor, that is, the rotary magnet is disposed oppositely to the outer circumference of the stator.

Figure 16:
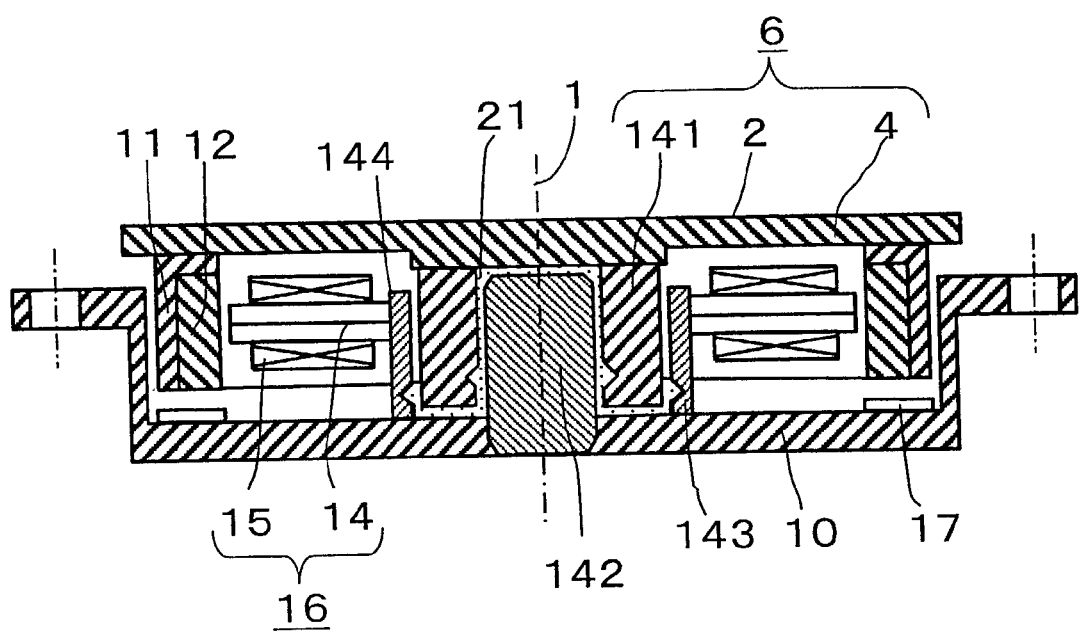
FIG. 16 is a sectional view showing principal parts of an outer rotor type motor in the second exemplary embodiment of the invention.

As a different example of the second exemplary embodiment of the invention, the outer rotor type motor is schematically explained below by referring to FIG. 16. FIG. 16 is a schematic sectional view of principal parts of spindle motor of outer rotor type. In FIG. 16, elements corresponding to the constituent elements in FIG. 14 are identified with same reference numerals as in FIG. 14.

In FIG. 16, a stator 16 having a coil 15 wound on a iron core 14 is affixed to a cylindrical member 143 disposed in the base 10. On the other hand, to be opposite to the outer circumference of the iron core 14 of the stator 16, and rotary magnet 12 magnetized in plural poles is affixed to the forming side of the rotary cylindrical part 141, near the outer circumference of the disk unit 4 of the rotary disk 6 through a rotor yoke 11. This point is different from the second exemplary embodiment shown in FIG. 14. The other configuration is same as in the second exemplary embodiment and other example of the second exemplary embodiment shown in FIG. 14, and specific description is omitted.

Figure 17:
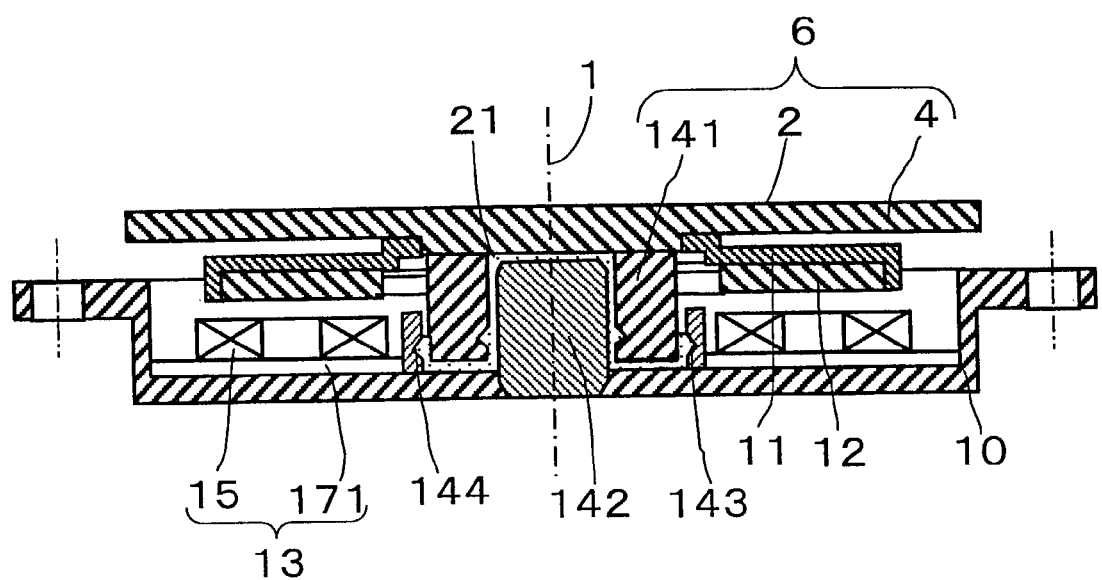
FIG. 17 is a sectional view showing principal parts of an axial gap type motor in the second exemplary embodiment of the invention.

Further, as shown in FIG. 17, the motor may be composed in a so-called axial gap type, that is, the rotary magnet 12 and coil 15 are disposed so as to be opposite to each other in the axial direction along the center of rotation 1. FIG. 17 is a schematic sectional view of principal parts of axial gap type spindle motor. In FIG. 17, elements corresponding to the constituent elements in FIG. 14 are identified with same reference numerals as in FIG. 14.

In FIG. 17, at the opposite side of the principal plane 2 in the disk unit 4 of the rotary disk 6, that is, at the side of the rotary cylindrical part 141, the rotor yoke 11 is affixed by adhering or other method, and a ring-shaped rotary magnet 12 magnetized in plural poles is similarly affixed by the rotor yoke 11 by adhering or other method. On the other hand, for example, a stator 16 having a plurality of triangular coils 15 wound on a printed wiring board 171 is affixed to the base 10, and the rotary magnet 12 and the coil 15 are disposed oppositely to each other so as to have a gap in the axial direction, and the other configuration is same as in FIG. 14, and detailed description is omitted. The effects of forming the spindle motor in this configuration are same as in the second exemplary embodiment, and specific description is omitted.

In the various spindle motors of the second exemplary embodiment (radial gap type inner rotor motor, radial gap type outer rotor motor, and axial gap type motor), the assembly of inserting the bearing support shaft into the opening of the rotary cylindrical part is same as in the first exemplary embodiment, and is explained briefly below. In the recess formed by a part of the lower side of the disk unit 4 and the inner circumference of the rotary cylindrical part 141, by turning upside down the rotary disk 6 composed of the rotary cylindrical part 141 integrated with the disk unit 4, a part of a specified weighed amount of dynamic pressure lubricant is dropped, and in this state, the rotary disk 6 turned upside down is put into a vacuum chamber, and is evacuated. After holding the evacuated state for a specified time, the evacuated state is once released to return to an atmospheric pressure. As a result, the air staying in the inverted rotary disk 6 is removed, and the inside is replaced with the dynamic pressure lubricant from which air bubbles are removed similarly. Further, the rest of the specified amount of the dynamic pressure lubricant is dropped on the inverted rotary disk 6, and the bearing support shaft 142 fixed to the base 10 is inserted into the recess of the inverted rotary disk 6 in vacuum state, and this state is held for a specified time. Later, by returning to an atmospheric pressure, the dynamic pressure lubricant sufficiently permeates into the gap formed between the rotary disk and the bearing support shaft as fixed side bearing, and air bubbles are removed from the dynamic pressure lubricant filling the gap. Also overflow of the dynamic pressure lubricant at the time of assembling can be prevented, and it is free from expansion of air bubbles due to temperature rise during operation, so that a further stable bearing performance is exhibited.

Using the spindle motor having the configuration explained in the second exemplary embodiment, an information converting element such as an optical pickup having a magnetic head mounted on a slider or an objective lens for focusing the light, and oscillating means for positioning the information converting element at a specified position of the information recording medium layer, by recording and reproducing on the information recording medium layer on the rotary disk by a known method, an information recording and reproducing apparatus realizing a high recording density in reduced size and thickness is composed same as in the first exemplary embodiment.

Thus, according to the second exemplary embodiment, same effects as in the first exemplary embodiment are obtained. That is, by integrally forming the disk unit having the information recording medium layer and the rotary cylindrical part on the principal plane, the squareness of the principal plane of the disk unit to the center of rotation is very high in precision. Therefore, the surface deflection due to poor squareness can be significantly decreased, and the vibration outside of plane can be suppressed, and the axial center deflection to the center of rotation can be also suppressed.

By composing the thrust bearing by forming dynamic pressure generating grooves either in the opening side end face of the rotary cylindrical part or the upper side of the base facing this opening side end face, the bearing rigidity as the thrust bearing is high, and a disk surface deflection of a very high precision is realized. Besides, while suppressing the radial bearing dimension, the proof moment rigidity to the disturbance moment applied to the rotating element can be assured, and the thickness can be reduced substantially.

Further by composing the second thrust bearing, the bearing rigidity as the thrust bearing is heightened more, and if the motor is reduced in size, a high thrust bearing rigidity is obtained, and the disk surface deflection and axial direction of higher precision can be realized.

The effects by the magnetic attracting force by the thrust attracting means and various cost reduction effects are same as in the first exemplary embodiment.

By mounting the spindle motor having such configuration, an information recording and reproducing apparatus of higher recording density, smaller size, and smaller thickness is realized same as in the first exemplary embodiment.

Third Exemplary Embodiment

Figure 18:
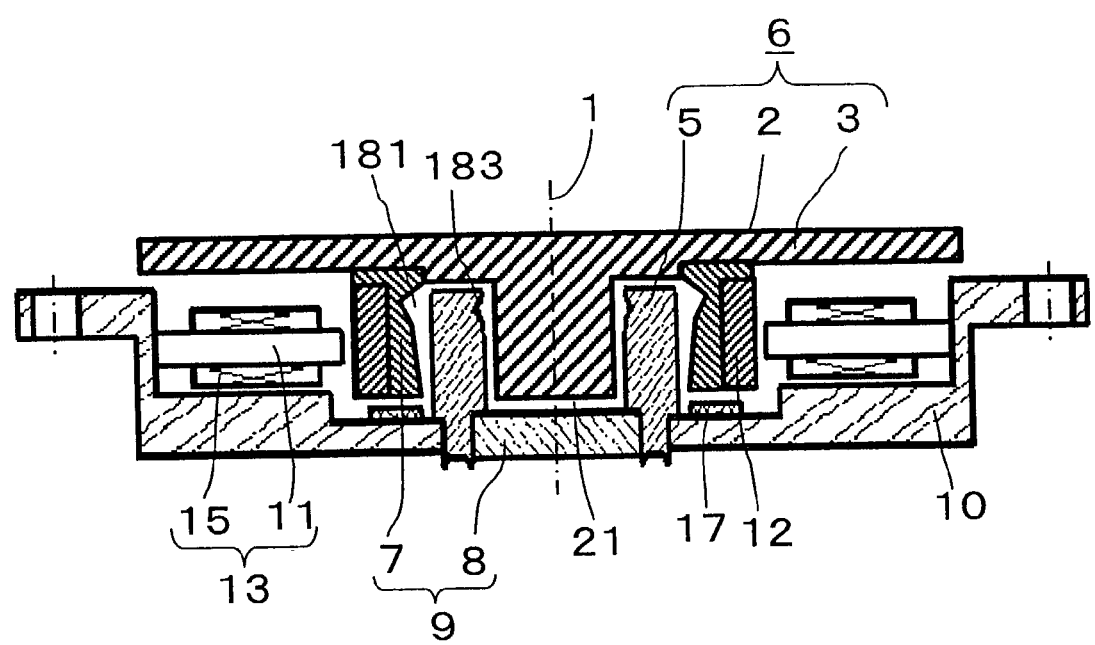
FIG. 18 is a sectional view showing principal parts of a spindle motor in a third exemplary embodiment of the invention.
Figure 19A:
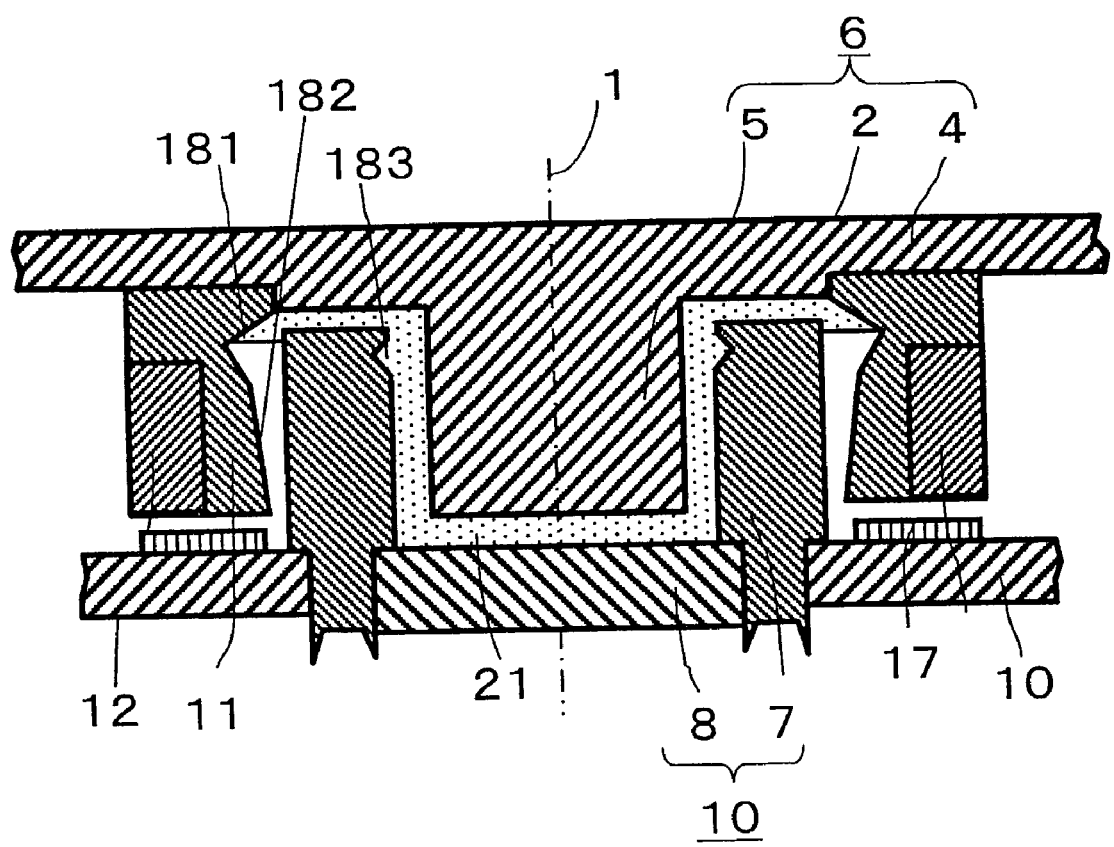
FIG. 19A is a partially magnified view showing near the bearing of the spindle motor in the third exemplary embodiment of the invention.

FIG. 18 and FIG. 19A are diagrams explaining the configuration of principal parts of a spindle motor showing a third exemplary embodiment of the invention, and specifically FIG. 18 is a schematic sectional view showing the configuration of principal parts of the spindle motor, and FIG. 19A is a partially magnified view near the central part of the spindle motor. In FIG. 18 and FIG. 19A, elements corresponding to the constituent elements in FIG. 1A are identified with same reference numerals as in FIG. 1A.

In FIG. 18, a first lubricant sump 181 is formed in a rotor yoke 11, by cutting annular grooves with a triangular section near the disk unit 4, at the inner circumferential side close to the bearing sleeve 7 as shown in FIG. 19A. Further, a taper 182 widening in the diameter as going closer to the disk unit 4 is formed from the vicinity of the rotor yoke 11 toward the grooves for forming the first lubricant sump 181. In the upper part of the opening side of the inner circumference of the bearing sleeve 7 facing the rotary shaft 5, an annular second lubricant sump 183 of a triangular section is formed.

A thrust bearing is composed by forming dynamic pressure generating grooves (not shown) either in the upper side of the thrust support plate 8 as the thrust surface facing the lower end face of the rotary shaft 5 of the rotary disk 6 or the lower end face of the rotary shaft 5 of the rotary disk 6. A radial bearing is composed by forming dynamic pressure generating grooves (not shown) either in the outer circumference of the rotary shaft 5 of the rotary disk 6 or the inner circumference of the bearing sleeve 7 facing the outer circumference of the rotary shaft 5 of the rotary disk 6. The rotary shaft 5 of the rotary disk 6 is inserted into the recess of the fixed side bearing 9 composed of the bearing sleeve 7 and thrust support plate 8, and the tiny gap formed between the rotary shaft 5 and fixed side bearing 9 is packed with dynamic pressure lubricant 21 such as ester compound synthetic oil to fill in up to the peak of the triangular shape of the second lubricant sump 183, thereby composing a spindle motor. The other constitution is same as in the first exemplary embodiment, and specific explanation is omitted herein.

The operation of the spindle motor in the third exemplary embodiment of the invention having such configuration is same as in the first exemplary embodiment, that is, an electric current is supplied to the coil 15 to magnetize the iron core 14, and the rotary magnet 12, that is, the rotary shaft 5 is put in rotation. By rotation of the rotary shaft 5, a dynamic pressure is generated by the action of the packed dynamic pressure lubricant 21 with the radial dynamic pressure generating grooves and the thrust dynamic pressure generating grooves. The rotary shaft 5 receives a dynamic pressure in the radial direction and thrust direction, and the rotary disk 6 and fixed side bearing 9 rotate smoothly in a contact-free state freely about the rotation center axis 1, with the rotary disk 6 being supported by the fixed side bearing 9.

Therefore, in the rotary disk 6 of the spindle motor having the fluid bearing structure, since the rotary shaft 5 and disk unit 4 are formed integrally, the plural constituent parts in the prior art comprising the rotary shaft, rotor hub and circular disk board are assembled into a single part, and the number of parts is curtailed and the cost of parts is saved, and it is possible to avoid accumulation of errors due to precision of plural parts and precision of processing or press-fitting height errors and others in the assembling process of press-fitting the rotor hub into the rotary shaft for fixing the circular disk board, and disk surface deflection and axial center deflection in rotation can be decreased substantially.

Figure 19B:
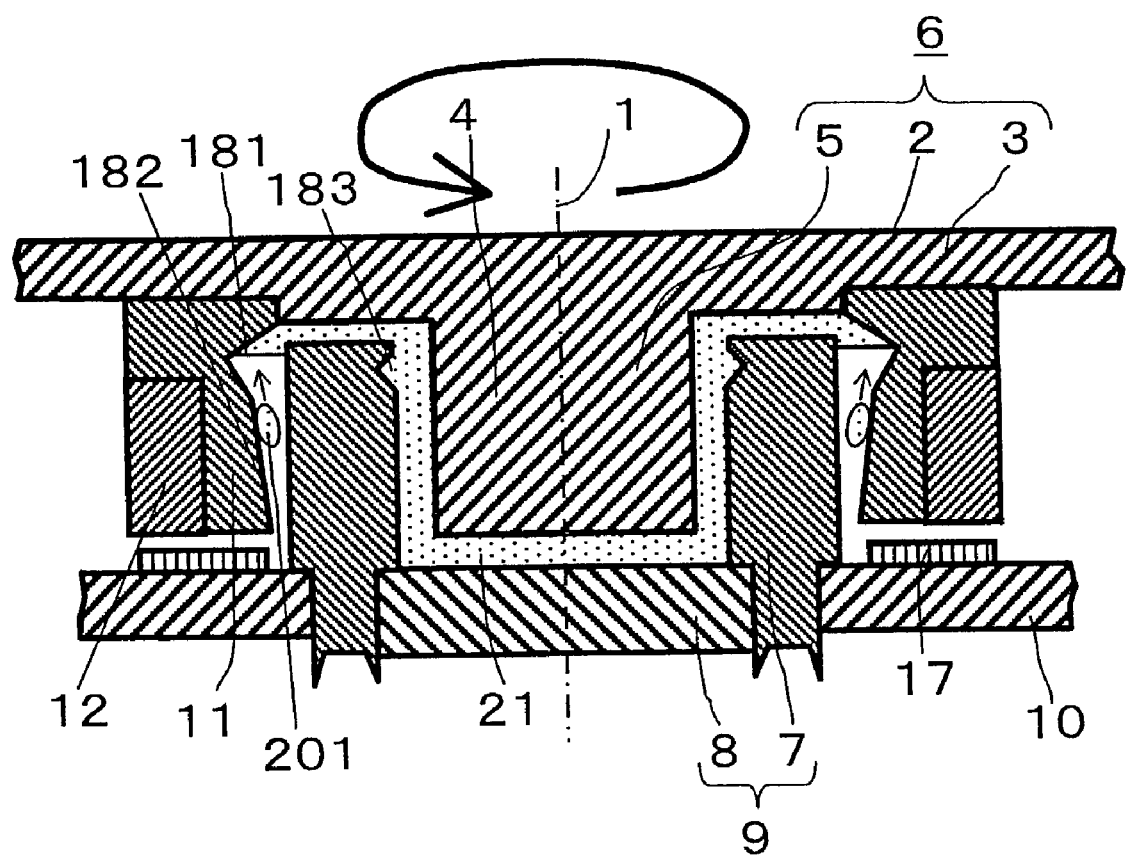
FIG. 19B is a partially magnified view near the bearing showing motion of dynamic pressure lubricant in the spindle motor in the third exemplary embodiment of the invention.

In the spindle motor of the third exemplary embodiment of which configuration is shown in FIG. 18 and FIG. 19A, the action of the dynamic pressure lubricant during rotation of the rotary disk 6 is explained by referring to the partially magnified view shown in FIG. 19B. When feeding the dynamic pressure lubricant 21 into the tiny gap between outer circumference of the rotary shaft 5 and inner circumference of the bearing sleeve 7, suppose the dynamic pressure lubricant 21 is supplied excessively to reach the gap, flowing over a second lubricant sump 182 in the inner circumference of the bearing sleeve 7 to the vicinity of a first lubricant sump 181 formed in the inner circumference of the rotor yoke 11. The excess dynamic pressure lubricant 201 forced out by impact or the like is held in the first lubricant sump 181 formed in the inner circumference of the rotor yoke 11 or in a taper 182, and by rotation of the rotor yoke 11 affixed to the rotary disk 6, a centrifugal force acts on the excess dynamic pressure lubricant 201, and the excess lubricant 201 moves as indicated by arrow in FIG. 19B along the taper 182 formed in the inner circumference of the rotor yoke 11, and returns to the first lubricant sump 181. Besides, when the dynamic pressure lubricant 21 filling in the tiny gap formed between the outer circumference of the rotary shaft 5 and the inner circumference of the bearing sleeve 7, up to the peak position of the triangle of the second lubricant sump 183, is expanded thermally by temperature rise, or when an impact is applied while being thermally expanded by temperature rise, exactly the same, the dynamic pressure lubricant returns to the first lubricant sump 181. The minimum gap between the inner circumference of the rotor yoke 11 and outer circumference of the bearing sleeve 7 is about tens of microns, and if the rotation is stopped in high temperature state, the dynamic pressure lubricant will not leak out through this tiny gap. When the motor is put again into rotation, a centrifugal force acts on the dynamic pressure lubricant, and the dynamic pressure lubricant moves to the area of a larger diameter along the taper near the first lubricant sump, so that the dynamic pressure lubricant will not leak out at all.

Therefore, the excess dynamic pressure lubricant 201 will not splash outside of the motor to reach and stain the rotary disk, so that it is free from contamination of information recording medium layer or loss of recorded data.

In the third exemplary embodiment, a thrust bearing as a fluid bearing is composed by forming dynamic pressure generating grooves (not shown) at least either in the upper side of the thrust support plate 8 facing the lower end face of the rotary shaft 4 of the rotary disk 6 or the lower end face of the rotary shaft 4 of the rotary disk 6, but the thrust bearing may be also composed same as in the first exemplary embodiment. The specific explanation is omitted, but the thrust bearing is briefly described below by referring to FIG. 18.

A thrust bearing is composed by forming dynamic pressure generating grooves (not shown) either in the opening side end face facing the lower side of the rotary disk 6 of the bearing sleeve 7 in which the rotary shaft 5 is inserted, or the lower side of the rotary disk 6 facing the opening side end face of the bearing sleeve 7. In this case, too, a first lubricant sump 181 is formed in the rotor yoke 11, and a second lubricant sump 183 is formed in the bearing sleeve 7, which is same as in the third exemplary embodiment and specific description is omitted.

Alternatively, a first thrust bearing may be composed by forming first dynamic pressure generating grooves (not shown) either in the opening side end face facing the lower side of the rotary disk 6 of the bearing sleeve 7 in which the rotary shaft 5 is inserted or the lower end of the rotary disk 6 facing the opening side end face of the bearing sleeve 7, and a second thrust bearing may be composed by forming second dynamic pressure generating grooves (not shown) either in the upper side of the thrust support plate 8 facing the lower end face of the rotary shaft 5 of the rotary disk 6 or the lower end of the rotary shaft 5 of the rotary disk 6. In this case, too, it is same as in the third exemplary embodiment that a first lubricant sump 181 is formed in the rotor yoke 11, and a second lubricant sump 183 is formed in the bearing sleeve 7, and specific description is omitted.

In these two configurations, in the gap of the outer circumference and lower end of the rotary shaft 5 of the rotary disk 6, the lower side of the rotary disk 6 and inner circumference of the rotor yoke 11, and the inner circumference of the bearing sleeve 7 of the fixed side bearing 9 and upper side of the thrust support plate 8, the dynamic pressure lubricant 21 is packed to fill up to the peak of the triangle of the first lubricant sump 181 formed in the inner circumference of the rotor yoke 11. Needless to say, the second lubricant sump 183 formed in the inner circumference of the bearing sleeve 7 is not particularly necessary.

The lowered portion of the numerical value of the proof moment rigidity Kmr by the radial bearing can be compensated by increasing the proof moment rigidity Kmt by the thrust bearing by increasing the average radius D of the thrust bearing, so that the numerical value can be maintained high as the proof moment rigidity Km, and the axial rigidity and proof moment rigidity as the thrust bearing are enhanced, which is same as in the first exemplary embodiment and specific description is omitted.

Therefore, by forming the thrust bearing in these two configurations, the thrust bearing rigidity is very high, and the axial length of the radial bearing can be shortened, and the thickness of the spindle motor can be reduced, and these effects are same as in the first exemplary embodiment. Further, same as in the third exemplary embodiment, the excess dynamic pressure lubricant 201 will not splash outside of the motor to reach and stain the rotary disk, so that it is free from contamination of information recording medium layer or loss of recorded data.

Figure 20:
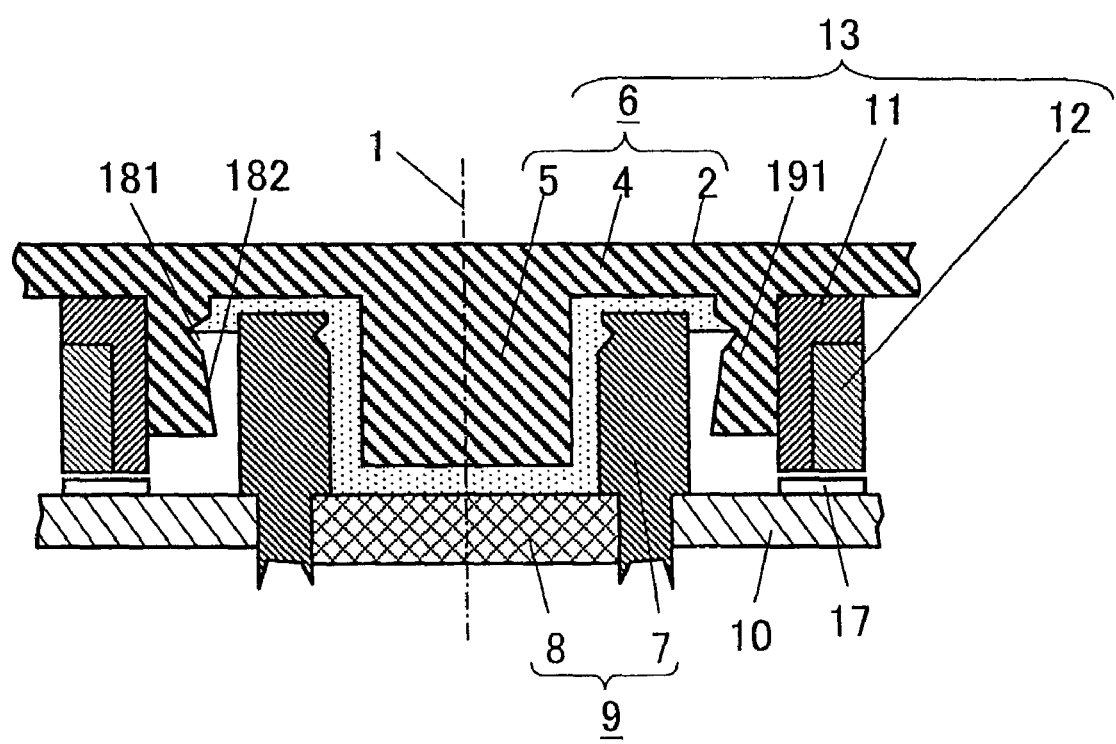
FIG. 20 is a partially magnified view showing near the bearing for explaining other example of lubricant sump in the spindle motor in the third exemplary embodiment of the invention.

Instead of forming the first lubricant sump 181 and taper 182 in the rotor yoke 11 as in the rotor yoke 11 in the third exemplary embodiment, as shown in FIG. 20, an annular wall 191 similar to the annular wall 6a of a ring protuberance in FIG. 10 in the first exemplary embodiment is formed integrally at the lower side of the disk unit 4 so as to surround the outer circumference of the rotary shaft 5. The disk unit 4 and annular wall 191 may be made of separately fabricated members, which may be integrally formed by insert forming, adhesion by adhesive, thermal fusion, or other method. In the inner circumference of the annular wall 191, a taper 182 is formed, which expands in the inside diameter gradually from the first lubricant sump 181 and the vicinity of the opening side lower end of the annular wall toward the first lubricant sump, while the rotor yoke 11 is affixed to the outer circumference of the annular wall 191. The rotor yoke 11 may be affixed to the lower side of the disk unit 4, instead of the outer circumference of the annular wall 191. At this time, needless to say, the rotor yoke 11 may have a gap between the outer circumference of the annular wall 191 and the inner circumference of the rotor yoke 11. The first lubricant sump 181 and taper 182 formed in the inner circumference of the annular wall 191 function same as the first lubricant sump 181 and taper 182 formed in the rotor yoke 11 of the third exemplary embodiment, and specific description is omitted.

Figure 21:
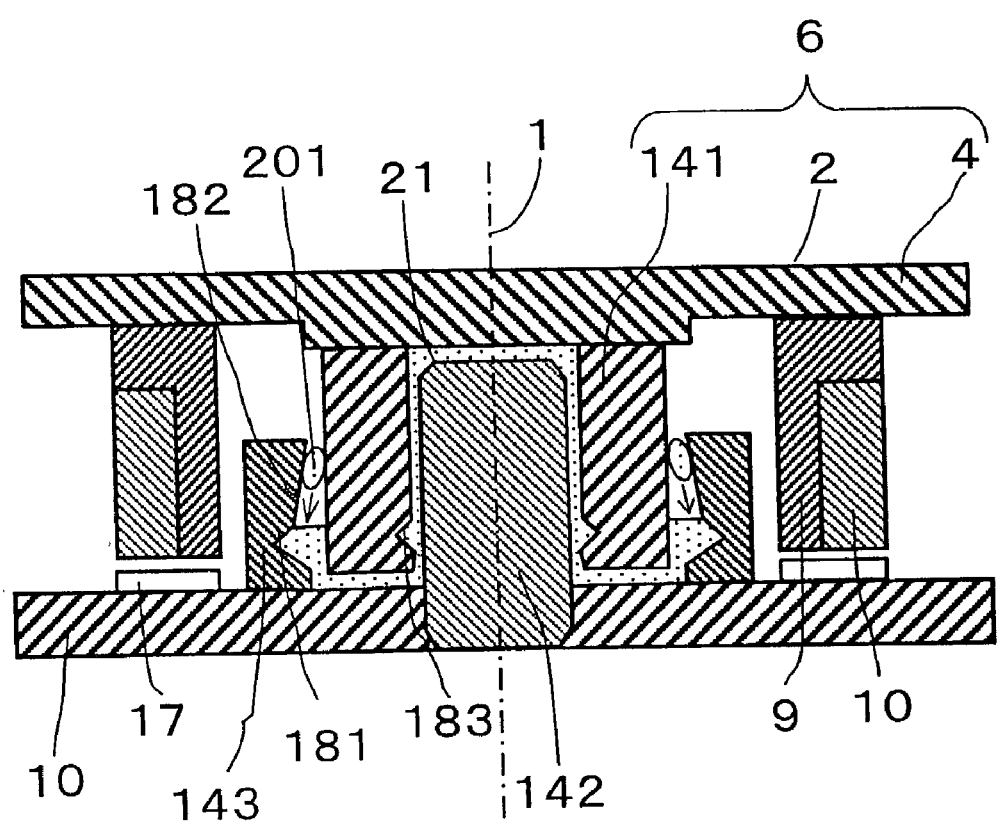
FIG. 21 is a partially magnified view showing near the bearing in other example of the spindle motor in the third exemplary embodiment of the invention.

The spindle motor may be also composed same as in the second exemplary embodiment shown in FIG. 14, that is, the rotary disk integrally formed with the rotary cylindrical part or formed so as to be integral may be designed to rotate about the bearing support shaft affixed to the base. The principal configuration is same as in the second exemplary embodiment, and specific description is omitted, but different points from the second exemplary embodiment are explained by referring to FIG. 21. FIG. 21 is a partially magnified sectional view near the central part of the spindle motor. In FIG. 21, elements corresponding to the constituent elements in FIG. 14 in the second exemplary embodiment are identified with same reference numerals as in FIG. 14.

In FIG. 21, a cylindrical member 143 is integrally formed in the base 10 so as to be positioned between the rotary cylindrical part 141 and the rotor yoke 11 fixing the rotary magnet 12 magnetized in plural poles. The base 10 and cylindrical member 143 may be made of separately fabricated members, which be formed integrally by insert forming, adhesion by adhesive, thermal fusion or other method. In the inner circumference of this cylindrical member 143, oppositely to the outer circumference of the rotary cylindrical part 141, an annular groove of triangular section is cut near the base 10, and a first lubricant sump 181 is formed. Further, from the vicinity of the opening of the circular member 143 toward the groove forming the first lubricant sump 181, a taper 182 is formed to expand in the inside diameter toward the base 10. In the lower part of the opening side of the inner circumference of the rotary cylindrical part 141 of the rotary disk 6 facing the bearing support shaft 142, an annular second lubricant sump 183 having a triangular section is formed. A thrust bearing is composed by forming dynamic pressure generating grooves (not shown) either in the side opposite to the principal plane 2 of the disk unit 4 in the rotary cylindrical part 141 facing the upper end face of the bearing support shaft 142 or the upper end face of the bearing support shaft 142. A tiny gap of the rotary cylindrical part 141 and the bearing support shaft 142 inserted in the rotary cylindrical part 141 is packed with a dynamic pressure lubricant 21 such as an ester compound synthetic oil to fill up to the peak of the triangle of the second lubricant sump 183, thereby composing a spindle motor.

The operation of the spindle motor having such configuration is same as in the third exemplary embodiment, that is, the rotary cylindrical part 141 of the rotary disk 6 rotated as an electric current is supplied to the coil 15 generates a dynamic pressure by the action of the packed dynamic pressure lubricant 21 with the radial dynamic pressure generating grooves and the thrust dynamic pressure generating grooves. The rotary cylindrical part 141 and bearing support shaft 142 receive a dynamic pressure in the radial direction and thrust direction, and the rotary disk 6 rotates smoothly in a contact-free state freely about the rotation center axis 1, while the outer circumference of the bearing support shaft 142 and the inner circumference of the rotary cylindrical part 141 are being supported.

The action of the dynamic pressure lubricant during rotation of the rotary disk 6 is same as in the third exemplary embodiment. That is, if the dynamic pressure lubricant 21 is supplied excessively to reach the gap, flowing over a second lubricant sump 183 in the inner circumference of the rotary cylindrical part 141 to the vicinity of a first lubricant sump 181 formed in the inner circumference of the cylindrical member 143 affixed to the base 10, or if thermally expanded due to temperature rise, or if an impact is applied in a thermally expanded state due to temperature rise, the dynamic pressure lubricant 21 is held in the first lubricant sump 181 or taper 182, and by rotation of the rotary cylindrical part 141, a centrifugal force acts on the dynamic pressure lubricant 21, and the dynamic pressure lubricant 201 indicated by arrow in FIG. 21 moves along the taper 182, and returns to the first lubricant sump 181. Therefore, same as in the third exemplary embodiment, the dynamic lubricant 201 will not splash outside of the motor to reach and stain the rotary disk, so that it is free from contamination of information recording medium layer or loss of recorded data.

Instead of composing the thrust bearing, same as the configuration of the rotary shaft 5 rotating in a contact-free state on the inner circumference of the bearing sleeve 7 in the third exemplary embodiment, by forming dynamic pressure generating grooves (not shown) either in the lower side of the disk unit 4 in the rotary cylindrical part 141 facing the upper end face of the bearing support shaft 142 or the upper end face of the bearing support shaft 142, the thrust bearing may be composed by forming dynamic pressure generating grooves (not shown) either in the opening side end face of the rotary cylindrical part 141 or the upper side of the base 10 facing the opening side end face of the rotary cylindrical part 141. Of course, a first thrust bearing may be composed by forming first dynamic pressure generating grooves (not shown) either in the opening side end face of the rotary cylindrical part 141 or the upper side of the base 10 facing the opening side end face of the rotary cylindrical part 141, and a second thrust bearing may be composed by forming second dynamic pressure generating grooves (not shown) either in the lower side of the disk unit 4 in the rotary cylindrical part 141 facing the upper end face of the bearing support shaft 142 or the upper end face of the bearing support shaft 142. In these two configurations, the second lubricant sump 183 formed in the inner circumference of the bearing sleeve 7 is not always required. The effects in these configurations are same as in the configuration of the rotary shaft rotating in a contact-free state in the inner circumference of the bearing sleeve in the first exemplary embodiment, second exemplary embodiment, or third exemplary embodiment, and the explanation is omitted.

Same as in the first exemplary embodiment and second exemplary embodiment, the motor may be composed as radial gap type outer rotor motor or axial gap type motor.

Figure 22:
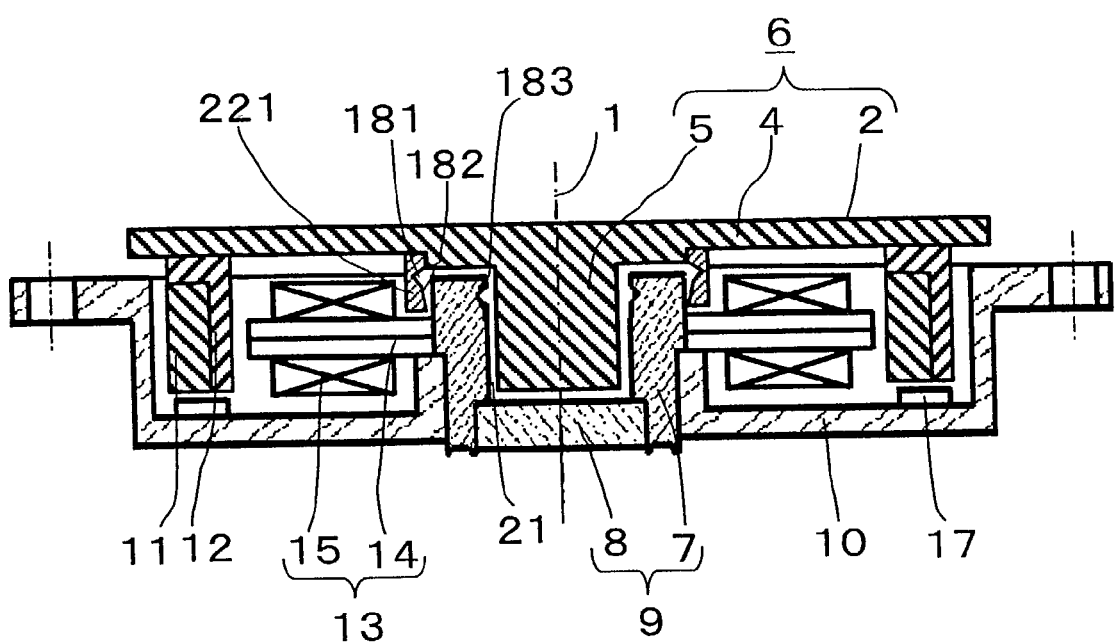
FIG. 22 is a sectional view showing principal parts of an outer rotor type motor in the third exemplary embodiment of the invention.
Figure 23:
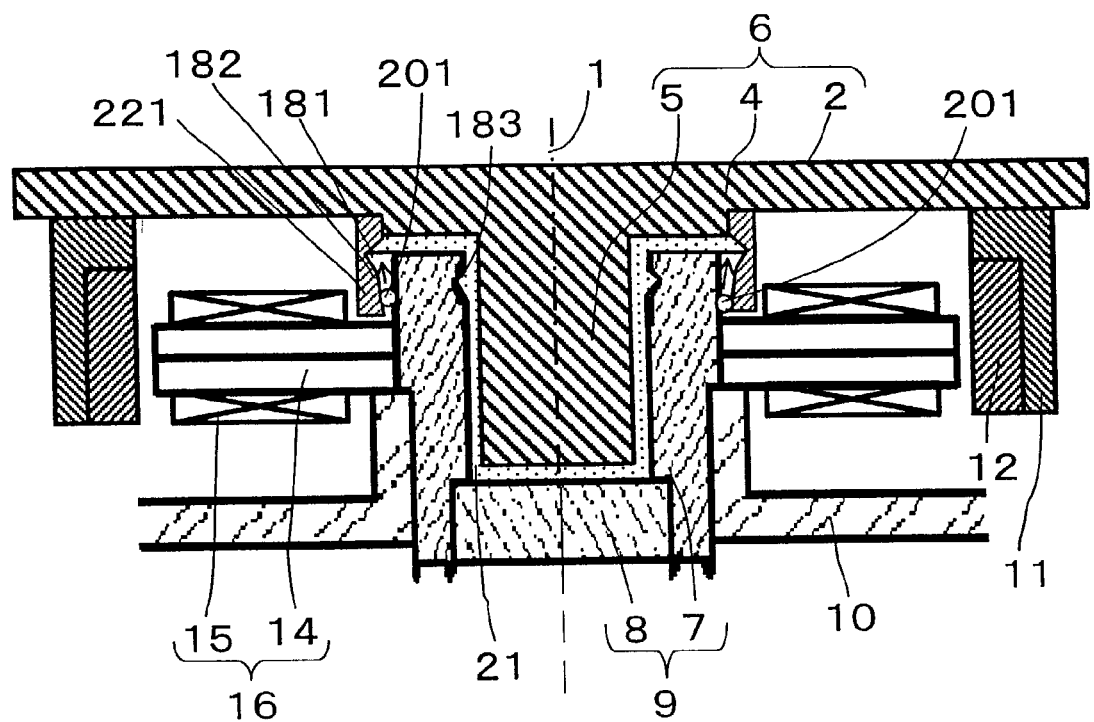
FIG. 23 is a partially magnified view near the bearing showing motion of dynamic pressure lubricant in the outer rotor type motor in the third exemplary embodiment of the invention.

Concerning the radial gap type outer rotor motor, different structural points from the third exemplary embodiment are schematically described by referring to FIG. 22 and FIG. 23. FIG. 22 is a schematic sectional view of principal parts of outer rotor type spindle motor, and FIG. 23 is a partially magnified sectional view for explaining the action of the dynamic pressure lubricant. In FIG. 22 and FIG. 23, elements corresponding to the constituent elements in FIG. 18 are identified with same reference numerals as in FIG. 18.

In FIG. 22, a rotor yoke 11 is affixed to a position near the outer side end portion of a disk unit 4 of a rotary disk 6, and a rotary magnet 12 is fixed to the rotor yoke 11 by adhesion or other method. At the lower side of the disk unit 4, a cylindrical member 221 of ring shape is affixed. In this cylindrical member 221, an annular groove of triangular section is cut near the disk unit 4 at the inner circumference side, and a first lubricant sump 181 is formed. From near the opening portion of the cylindrical member 211 toward the groove forming the first lubricant sump 181, a tapered slope 182 is formed to increase in inside diameter as approaching the disk unit 4. A rotating member 13 is composed of the rotary disk 6, rotor yoke 11, rotary magnet 12, and cylindrical member 221. The cylindrical member 221 may be formed integrally together with a protuberance projecting in an annular form at the lower side of the disk unit 4.

The rotary magnet 12 magnetized in plural poles is disposed so as to be opposite to the outer circumference of the stator 16, and a thrust attraction plate 17 is affixed to the base 10 so as to face the lower end face in the axial direction of the rotary magnet 12, or the positional relation of the iron core 14 of the stator 16 and the rotary magnet 12 is configured same as in the first exemplary embodiment, and by the thrust attracting means of such configuration, the rotating member 13 is magnetically attracted to the fixed side bearing 9 side, thereby composing a spindle motor.

In such configuration, a dynamic pressure lubricant 21 is packed to fill in the gap formed by the rotary shaft 5, lower side of disk unit 4 and cylindrical member 221, bearing sleeve 7 and thrust support plate 8. A thrust bearing is composed by forming dynamic pressure generating grooves (not shown) at least either in the upper side of the thrust support plate 8 facing the lower end face of the rotary shaft 5 of the rotary disk 6 or the lower end face of the rotary shaft 5 of the rotary disk 6, or a thrust bearing is composed by forming dynamic pressure generating grooves (not shown) at least either in opening side end face of the bearing sleeve 7 or the lower side of the rotary disk 6 facing the opening side end face of the bearing sleeve 7, or a first thrust bearing may be composed by forming first dynamic pressure generating grooves (not shown) either in the opening side end face of the bearing sleeve 7 or the lower side of the rotary disk 6 facing the opening side end face of the bearing sleeve 7, and a second thrust bearing may be composed by forming second dynamic pressure generating grooves (not shown) either in the upper side of the thrust support plate 8 facing the lower end of the rotary shaft 5 or the lower end face of the rotary shaft 5, or a radial bearing is composed by forming dynamic pressure generating grooves (not shown) either in the outer circumference of the rotary shaft 5 of the rotary disk 6 or the inner circumference of the bearing sleeve 7 facing the outer circumference of the rotary shaft 5 of the rotary disk 6, and these configurations are same as of the inner rotor type motor in the third exemplary embodiment.

Effects of composing the rotary disk 6 by integrally forming the disk unit 4 and rotary shaft 5, and composing the thrust bearing and radial bearing by fluid bearing are substantial lessening of the surface deflection and axial center deflection of the disk during rotation, reduction of thickness, and others, same as in the first exemplary embodiment and third exemplary embodiment. A centrifugal force acts on the dynamic pressure lubricant 201, and it moves as indicated by arrow in FIG. 23, and returns to the first lubricant sump 181, and therefore the dynamic lubricant 201 will not splash outside of the motor to reach and stain the rotary disk, so that it is free from contamination or ruin of recorded data, same as in the third exemplary embodiment.

Figure 24:
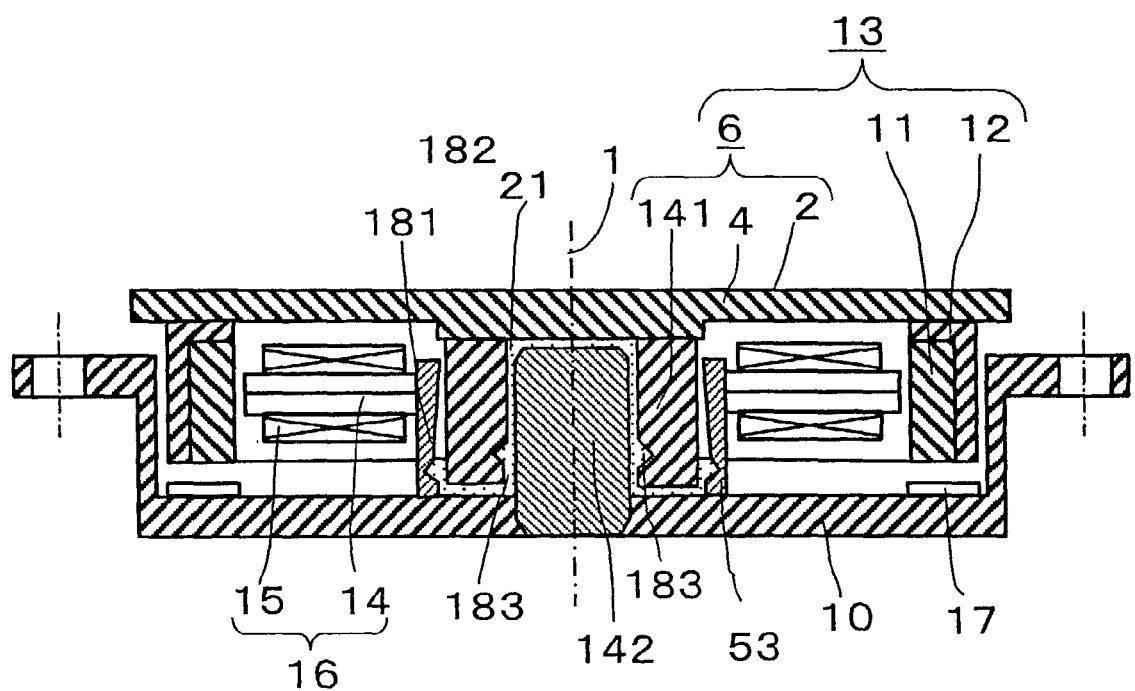
FIG. 24 is a sectional view showing principal parts in other example of the outer rotor type motor in the third exemplary embodiment of the invention.

The spindle motor comprising the rotary disk 6 composed of the disk unit 4 and rotary cylindrical part 141, and the bearing support shaft 142 affixed to the base 10 may be also composed as an outer rotor type motor. The outer rotor type motor in this configuration is explained briefly by referring to FIG. 24, showing only different points from the configuration of the second exemplary embodiment in FIG. 14. FIG. 24 is a schematic sectional view of principal parts of the outer rotor type motor. In FIG. 24, elements corresponding to the constituent elements in FIG. 14 are identified with same reference numerals as in FIG. 14.

In FIG. 24, a rotor yoke 11 is affixed to a position near the outer end portion of a disk unit 4 of a rotary disk 6, and a rotary magnet 12 is fixed to the rotor yoke 11 by adhering or other method. A rotating element 13 is composed of the rotary disk 6 composed of disk unit 4 and rotary cylindrical part 141, rotor yoke 11, and rotary magnet 12.

On the other hand, in a manner to enclose the rotary cylindrical part 141, the bearing support shaft 142 and cylindrical member 143 are affixed to the base 10. Further, the stator 16 having the coil 15 wound on the iron core 14 is affixed by making use of the outer side of the cylindrical member 143. Although not shown, a rib protuberance projecting upward may be provided for affixing the stator 16 to the base 10, so that the stator 16 may be affixed to the side or top of this protuberance. At the inner circumference side of the cylindrical member 143, oppositely to the outer circumference of the rotary cylindrical part 141, an annular groove of a triangular section is cut near the base 10, and a first lubricant sump 181 is formed. Further, from near the opening of the cylindrical member 143 toward the groove forming the first lubricant sump 181, a tapered slope 182 is formed to increase in inside diameter as approaching the base 10. In the lower part of the opening side of the inner circumference of the rotary cylindrical part 141 of the rotary disk 6 facing the bearing support shaft 142, an annular second lubricant sump 183 having a triangular section is formed.

A spindle motor is composed by disposing the rotary magnet 12 magnetized in plural poles so as to be opposite to the outer circumference of the stator 16.

In this configuration, the gap formed by the rotary cylindrical part 141 and disk unit 4, bearing support shaft 142, base 10, and cylindrical member 143 is filled with a dynamic pressure lubricant 21. A thrust bearing is composed by forming dynamic pressure generating grooves (not shown) at least either in the lower side of the disk unit 4 in the rotary cylindrical part 141 facing the upper end face of the bearing support shaft 142 or the upper end face of the bearing support shaft 142, or a thrust bearing is composed by forming dynamic pressure generating grooves (not shown) at least either in opening side end face of the rotary cylindrical part 141 or the upper side of the base 10 facing the opening side end face of the rotary cylindrical part 141, or a first thrust bearing may be composed by forming first dynamic pressure generating grooves (not shown) either in the opening side end face of the rotary cylindrical part 141 or the upper side of the base 10 facing the opening side end face of the rotary cylindrical part 141, and a second thrust bearing may be composed by forming second dynamic pressure generating grooves (not shown) either in the lower side of the disk unit 4 in the rotary cylindrical part 141 facing the upper end face of the bearing support shaft 142 or the upper end of the bearing support shaft 142, or a radial bearing is composed by forming dynamic pressure generating grooves (not shown) either in the outer circumference of the bearing support shaft 142 or the inner circumference of the rotary cylindrical part 141 facing the outer circumference of the bearing support shaft 142, and these configurations are same as of the inner rotor type motor in the third exemplary embodiment.

Effects of composing the rotary disk 6 by integrally forming the disk unit 4 and rotary cylindrical part 142, and composing the thrust bearing and radial bearing by fluid bearing are same as in the second exemplary embodiment and third exemplary embodiment. A centrifugal force acts on the dynamic pressure lubricant 201, and it returns to the first lubricant sump 181, and therefore the dynamic lubricant 201 will not splash outside of the motor to reach and stain the rotary disk, so that it is free from contamination or ruin of recorded data, same as in the third exemplary embodiment.

Figure 25:
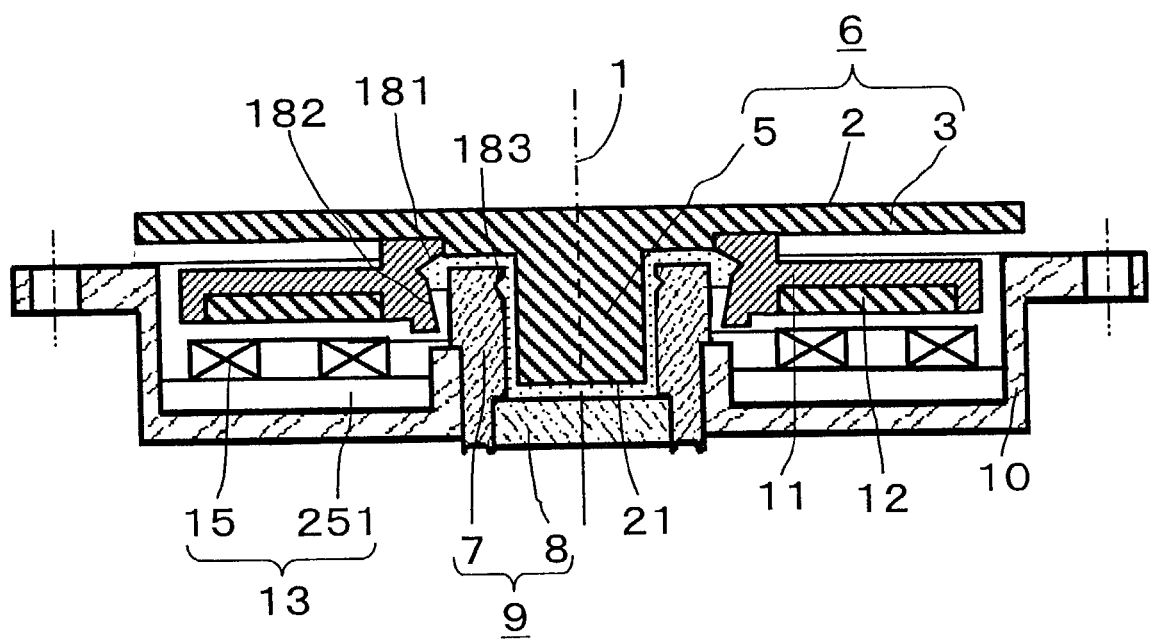
FIG. 25 is a sectional view showing principal parts of an axial gap type motor in the third exemplary embodiment of the invention.

Concerning the axial gap type motor, only different structural points from the radial gap type motor in the third exemplary embodiment are schematically described below. FIG. 25 is a schematic sectional view of principal parts of axial gap type spindle motor. In FIG. 25, elements corresponding to the constituent elements in FIG. 18 are identified with same reference numerals as in FIG. 18.

In FIG. 25, for example, a stator 16 having a plurality of coils 15 of triangular shape wound each on a printed wiring board 251 is affixed to a base 10, and a rotary magnet 12 affixed to a rotor yoke 11 and the coil 15 are disposed oppositely to each other to form a gap in the axial direction. In the inner circumference of the rotor yoke 11 facing the outer circumference of a bearing sleeve 7, an annular groove of a triangular section is cut near the disk unit 4, and a first lubricant sump 181 is formed. Further, from near the opening of the rotor yoke 11 toward the groove for forming the first lubricant sump 181, a taper 182 increasing in inside diameter as approaching the disk 4 is formed. Other configuration is same as the configuration of the radial gap type motor in the third exemplary embodiment, and the action and operation are also the same, and specific description is omitted herein.

Figure 26:
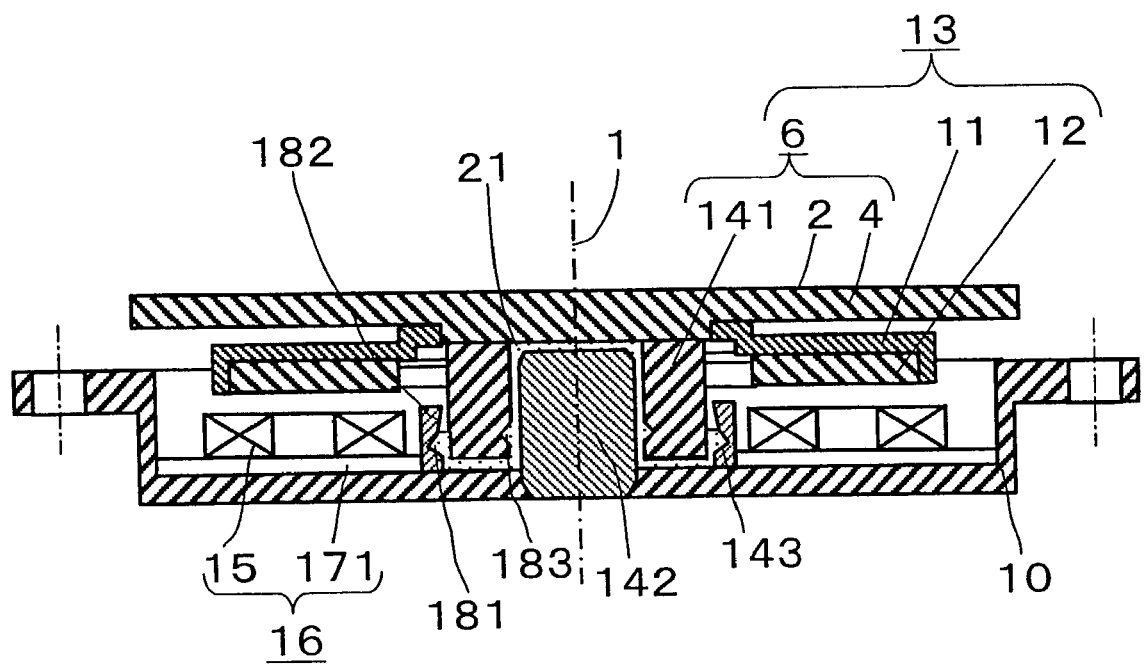
FIG. 26 is a sectional view showing principal parts in other example of the axial gap type motor in the third exemplary embodiment of the invention.

The axial gap type motor comprising the bearing support shaft 142 affixed to the base 10 and the rotary disk 6 having the rotary cylindrical part 141 rotating about it is briefly described below by referring only to different points from the configuration of the radial gap type motor in the third exemplary embodiment. FIG. 26 is a schematic sectional view of principal parts of the axial gap type spindle motor. In FIG. 26, elements corresponding to the constituent elements in FIG. 17 in the second exemplary embodiment are identified with same reference numerals as in FIG. 17.

In FIG. 26, for example, a stator 16 having a plurality of coils 15 of triangular shape wound each on a printed wiring board 171 is affixed to a base 10, and a rotary magnet 12 affixed to a rotor yoke 11 and the coil 15 are disposed oppositely to each other to form a gap in the axial direction. A cylindrical member 143 is affixed to the base 10 so as to be positioned between the rotary cylindrical part 141 and coil 15. In the inner circumference of this cylindrical member 143, oppositely to the outer circumference of the rotary cylindrical part 141, an annular groove of a triangular section is cut near the base 10, and a first lubricant sump 181 is formed. Further, from near the opening of the cylindrical member 143 toward the groove for forming the first lubricant sump 181, a tapered slope 182 increasing in inside diameter as approaching the base 10 is formed. In the lower part of the opening side of the inner circumference of the rotary cylindrical part 141 of the rotary disk 6 facing the bearing support shaft 142, an annular second lubricant sump 183 of a triangular section is formed.

Other configuration is same as the configuration of the radial gap type motor in the third exemplary embodiment, and the action and operation are also the same, and specific description is omitted herein.

In the various spindle motors of the third exemplary embodiment (radial gap type inner rotor motor, radial gap type outer rotor motor, and axial gap type motor), the assembly of inserting the rotary shaft into the bearing sleeve or inserting the bearing support shaft into the rotary cylindrical part is same as in the first exemplary embodiment and second exemplary embodiment, and the explanation is omitted herein.

Using the spindle motor having the same configuration explained in the second exemplary embodiment, an information converting element such as an optical pickup having a magnetic head mounted on a slider or an objective lens for focusing the light, and oscillating means for positioning the information converting element at a specified position of the information recording medium layer, by recording and reproducing on the information recording medium layer on the rotary disk by a known method, an information recording and reproducing apparatus realizing a high recording density in reduced size and thickness is composed same as in the first exemplary embodiment and second exemplary embodiment.

Thus, according to the third exemplary embodiment, same effects as in the first exemplary embodiment and second embodiment are obtained. That is, by integrally forming the disk unit having the information recording medium layer and the rotary cylindrical part on the principal plane, the squareness of the principal plane of the disk unit to the center of rotation is very high in precision. Therefore, the surface deflection due to poor squareness can be significantly decreased, and the vibration outside of plane can be suppressed, and the axial center deflection to the center of rotation can be also suppressed.

The effects of composing the thrust bearing by forming dynamic pressure generating grooves either in the opening side end face of the bearing sleeve remote in the radial direction from the center of rotation or the opening side end face of the rotary cylindrical part, and further the effects of forming the second thrust bearing, effects of magnetic attracting force by the thrust attracting means, and various cost-down effects are same as in the foregoing first exemplary embodiment and second exemplary embodiment.

Further by composing the first lubricant sump and tapered slope region in the inner circumference of the rotor yoke or cylindrical member, if the oil feed rate of the dynamic pressure lubricant fluctuates, if the dynamic pressure lubricant is forced out by impact, or if the dynamic pressure lubricant is thermally expanded by temperature rise, the dynamic pressure lubricant does not scatter outside of the motor, and spindle motor of a high reliability is realized.

By mounting the spindle motor having such configuration, an information recording and reproducing apparatus of higher recording density, smaller size, and smaller thickness is realized.

Fourth Exemplary Embodiment

This is a method of forming and processing dynamic pressure generating grooves of radial dynamic pressure fluid bearing of a spindle motor for information recording and reproducing apparatus having the configuration as described in the foregoing first exemplary embodiment, second exemplary embodiment, and third exemplary embodiment.

Figure 27:
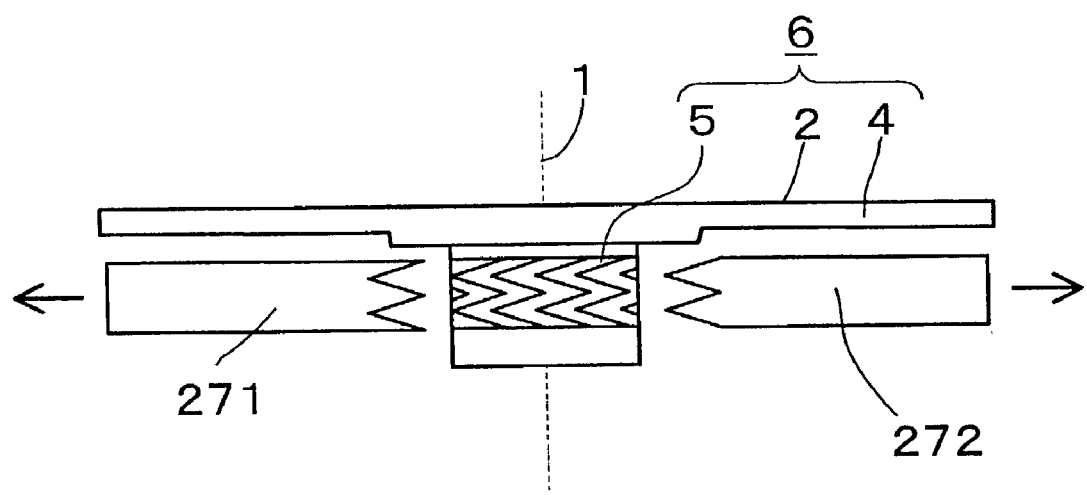
FIG. 27 is a side view of a rotary disk in a fourth exemplary embodiment of the invention.
Figure 28:
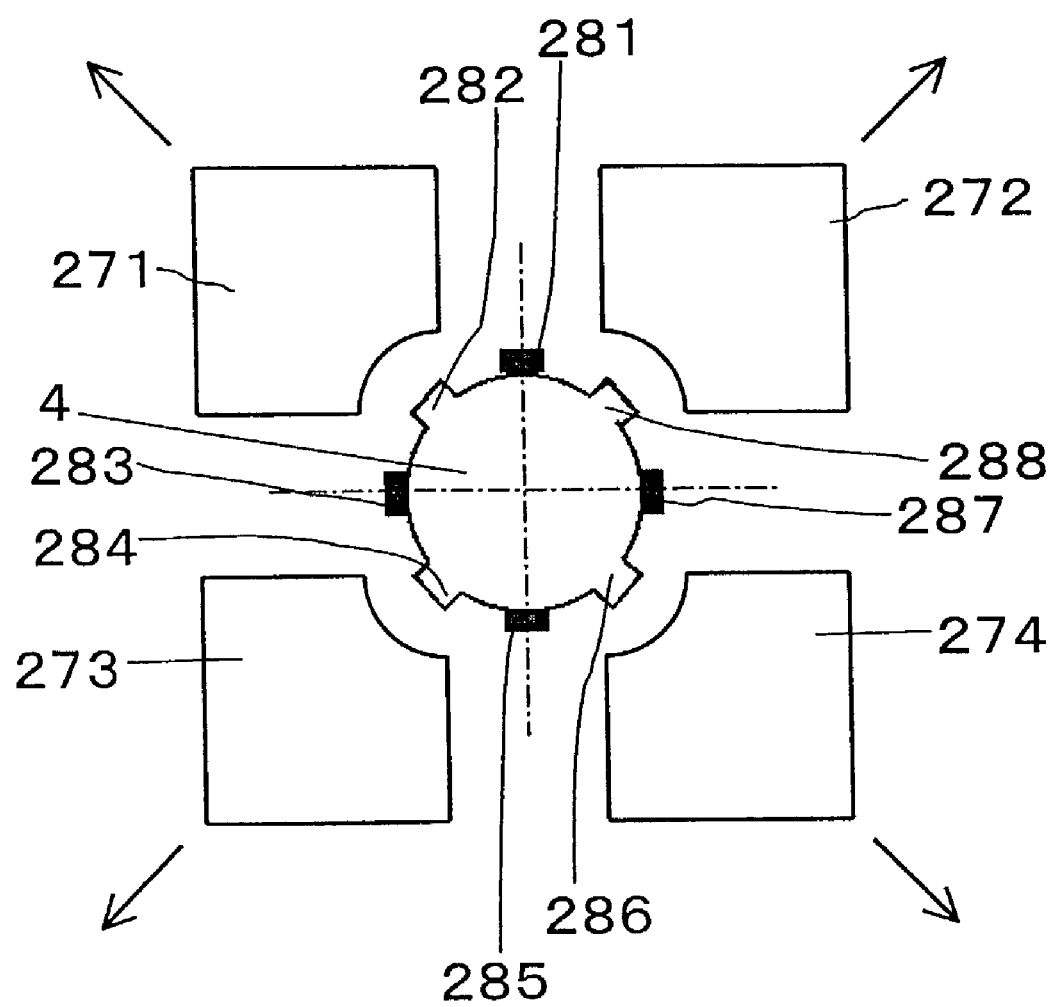
FIG. 28 is a back side plan view of the rotary disk in the fourth exemplary embodiment of the invention.
Figure 29:
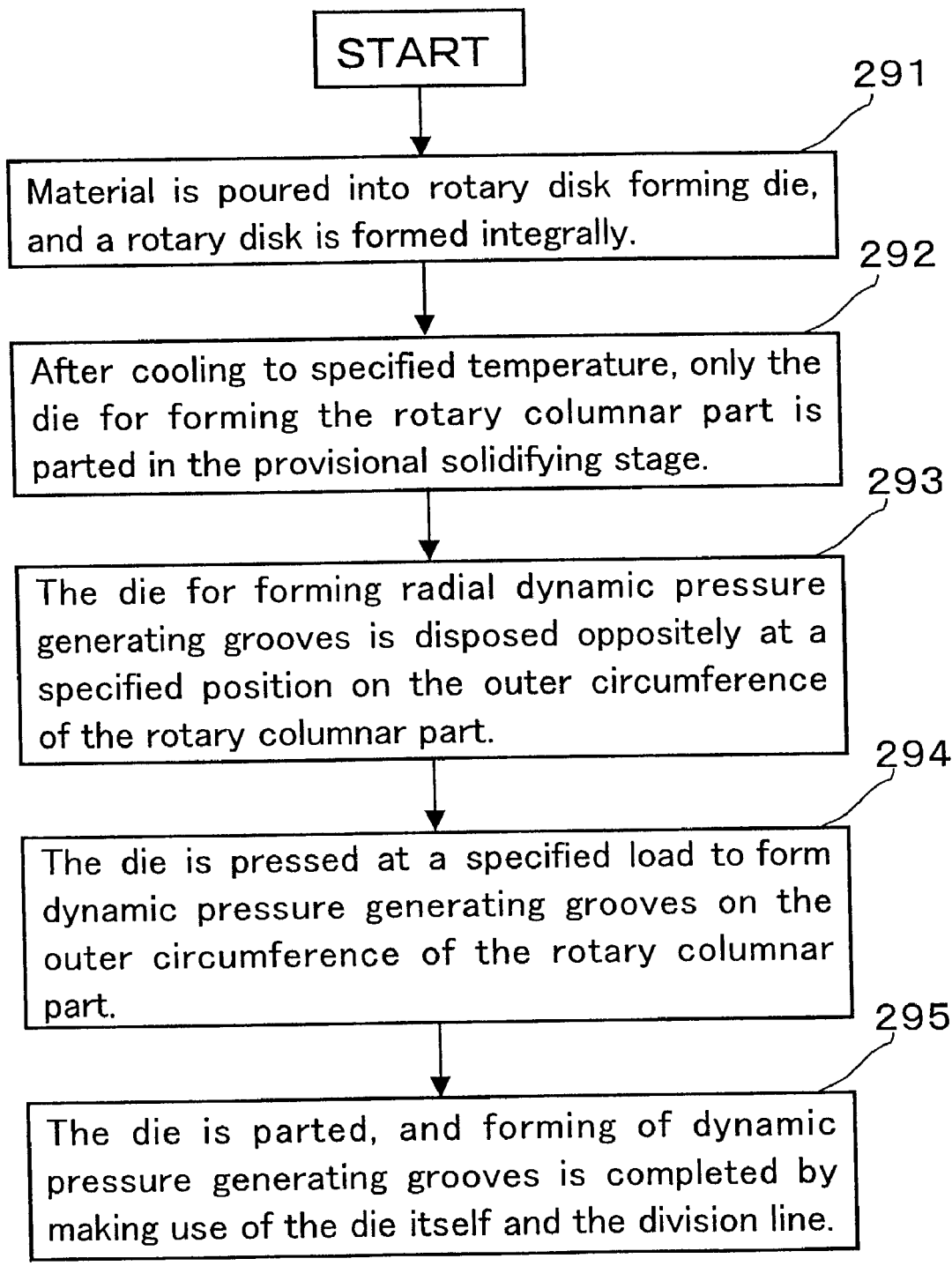
FIG. 29 is a flowchart explaining the processing procedure for forming dynamic pressure generating grooves in the outer circumference of the rotary shaft of the rotary disk in the fourth exemplary embodiment of the invention.

FIG. 27, FIG. 28, and FIG. 29 are diagrams schematically explaining a method of forming and processing dynamic pressure generating grooves of radial bearing for composing a fluid bearing of a spindle motor of information recording and reproducing apparatus in a fourth exemplary embodiment of the invention. This is to explain a method of forming and processing eight dynamic pressure generating grooves in herringbone shape in the outer circumference of the rotary shaft 5 for composing the rotary disk 6 in the first exemplary embodiment and third exemplary embodiment. FIG. 27 is a schematic side view of the rotary disk 6 as seen from its side, and FIG. 28 is a sectional view of the die and rotary shaft 5 along plane A-A vertical to the axial center of the center of rotation 1 in FIG. 27. FIG. 29 is a flowchart explaining the procedure of forming dynamic pressure generating grooves in the outer circumference of the rotary shaft. In FIG. 27 and FIG. 28, elements corresponding to the constituent elements in FIG. 1A in the first exemplary embodiment are identified with same reference numerals as in FIG. 1A.

In FIG. 27 and FIG. 28, radial dynamic pressure generating groove forming dies 271, 272, 273, and 274 are four-division dies for forming and processing dynamic pressure generating grooves 281, 282, 283, 284, 285, 286, 287, and 288 of herringbone shape in the outer circumference of the rotary shaft 5 of the rotary disk 6 composed of integrally formed rotary shaft 5 and disk unit 4. The forming procedure is explained according to the flowchart in FIG. 29. First, at step S291, in the dies (not shown) for forming a rotary disk 6 composed of integrally formed disk unit 4 and rotary shaft 5, a thermoplastic material such as glass, liquid crystal polymer or PPS (polyphenylene sulfide) is poured, and the rotary disk 6 is formed integrally. At step S292, when the forming part is cooled to a specified temperature and the material is solidified to a certain extent, of the forming dies of the rotary disk 6, only the portion (not shown) for forming the rotary shaft 5 in the lower part is parted. At step S293, patterns carved symmetrically to the dynamic pressure generating grooves 282, 284, 286, and 288 of a first group of herringbone shape to be formed on the quarter columnar arc surfaces of the radial dynamic pressure generating groove forming dies 271, 272, 273, and 274 are disposed oppositely to the specified positions on the outer circumference of the rotary shaft 5. At step S294, to form dynamic pressure generating grooves in the outer circumference of the rotary shaft 5, the dies are pressed with a specified load from the diagonal directions. After the dynamic pressure generating grooves are formed, at step S295, the radial dynamic pressure generating groove forming dies 281, 282, 283, and 284 are drawn in the arrow direction in FIG. 27 and FIG. 28, and parted. As a result, by the division line portion of the dies shown in sawtooth shape in FIG. 27, since the radial dynamic pressure generating groove forming dies 271, 272, 273, and 274 are designed and fabricated so that the four die division lines generated at the time of parting may coincide with dynamic pressure generating grooves 281, 283, 285, and 287 of a second group, eight dynamic pressure generating grooves are formed together with the four dynamic pressure generating grooves 282, 284, 286, and 288 of the first group formed from the dies.

Therefore, by this processing method, even in the rotary disk of an integrated structure of disk unit and rotary shaft, no particular holding tool is needed, or without using large or complicated processing apparatus, the grooves for generating dynamic pressures can be formed precisely in the rotary shaft at low cost.

When the rotary disk having dynamic pressure generating grooves as the radial bearing formed in this method is used as the rotary disk in the first exemplary embodiment, a thin and inexpensive spindle motor of high precision of rotation is realized. The detailed description of the configuration of the spindle motor is same as in the first exemplary embodiment and is hence omitted herein.

The following explanation is about a method of forming and processing dynamic pressure generating grooves of radial dynamic pressure fluid bearing of spindle motor for information recording and reproducing apparatus composed as in the second exemplary embodiment.

Figure 30:
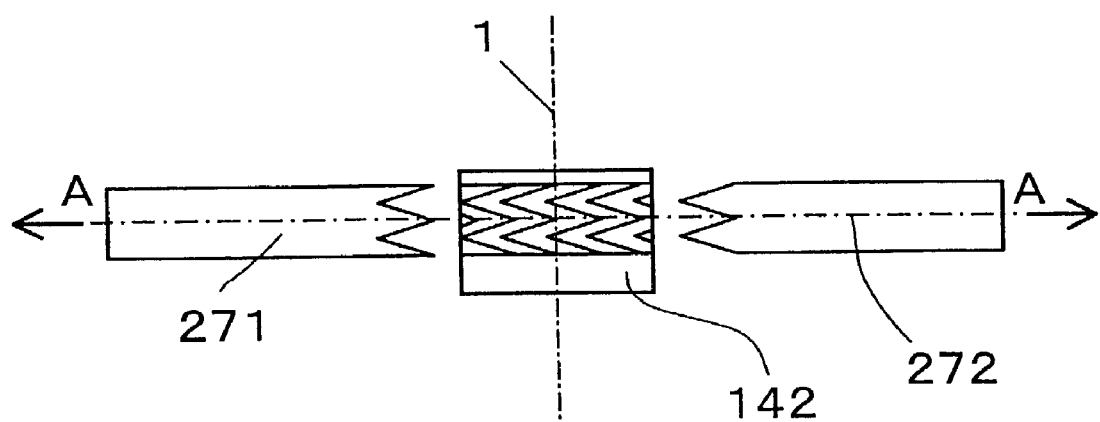
FIG. 30 is a side view of bearing support shaft in the fourth exemplary embodiment of the invention.
Figure 31:
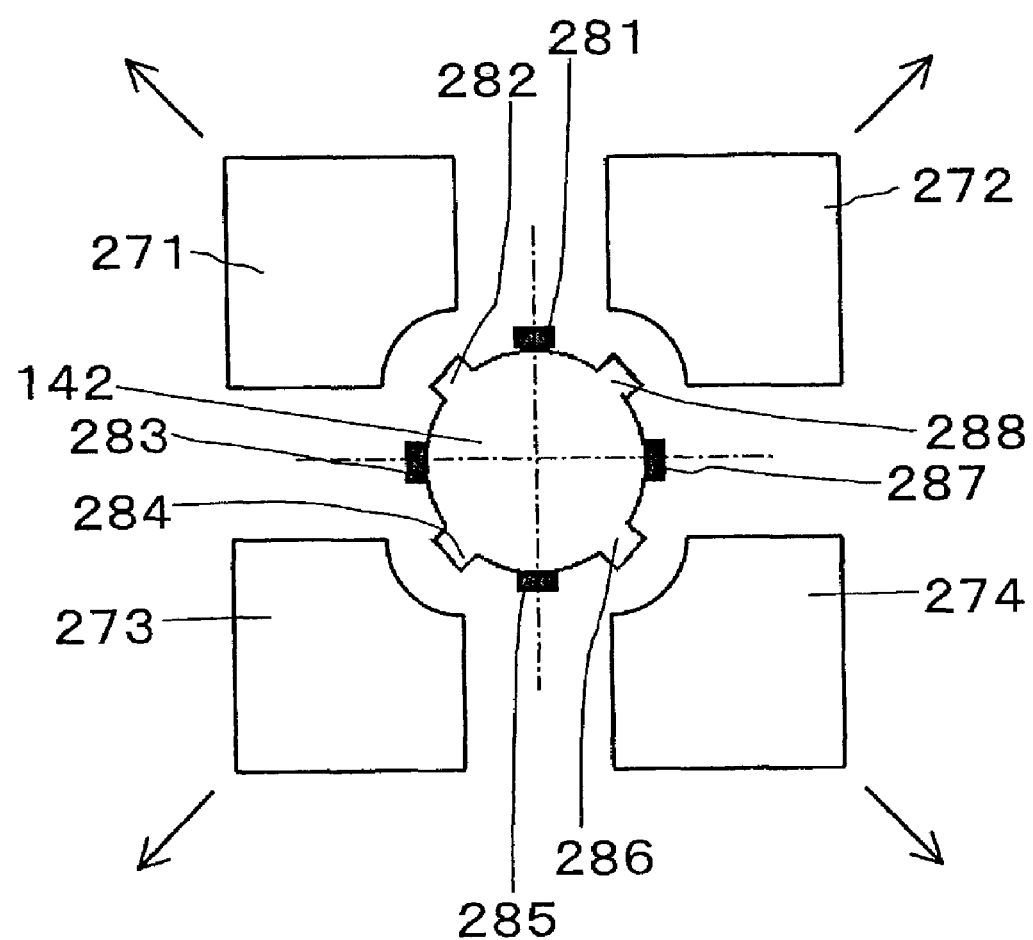
FIG. 31 is a plan view of the bearing support shaft as seen from the lower end side in the fourth exemplary embodiment of the invention.
Figure 32:
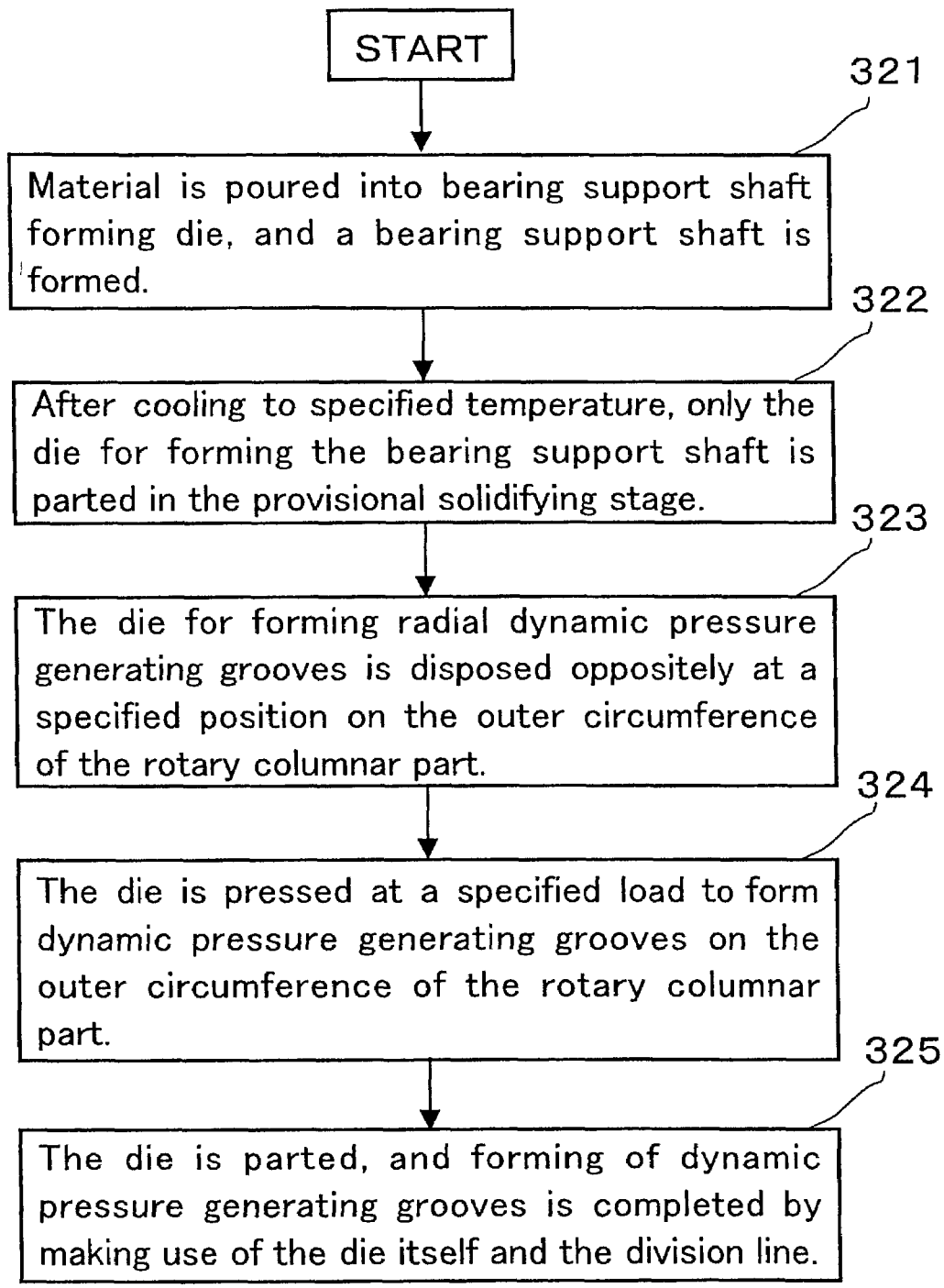
FIG. 32 is a flowchart explaining the processing procedure of forming dynamic pressure generating grooves in the outer circumference of the bearing support shaft in the fourth exemplary embodiment of the invention.

FIG. 30, FIG. 31, and FIG. 32 are diagrams schematically explaining the method of forming and processing radial dynamic pressure generating grooves for composing the fluid bearing of spindle motor of information recording and reproducing apparatus in the second exemplary embodiment of the invention, in which eight dynamic pressure generating grooves of herringbone shape are formed in the outer circumference of a bearing support shaft 142 composing a radial fluid bearing, together with a recess inner circumference of a rotary cylindrical part 141. FIG. 30 is a schematic side view of the bearing support shaft 142 as seen from the side, FIG. 31 is a schematic plan view of the dies and bearing support shaft 142 as seen from the lower end side of the sectional view along plane A-A vertical to the axial center of the center of rotation 1 in FIG. 30, and FIG. 32 is a flowchart explaining the procedure of forming dynamic pressure generating grooves in the outer circumference of the bearing support shaft 142. In FIG. 30 and FIG. 31, elements corresponding to the constituent elements in FIG. 14 in the second exemplary embodiment are identified with same reference numerals as in FIG. 14, and elements corresponding to the constituent elements in FIG. 27 and FIG. 28 in the fourth exemplary embodiment are identified with same reference numerals as in FIG. 27 and FIG. 28.

In FIG. 30 and FIG. 31, radial dynamic pressure generating groove forming dies 271, 272, 273, and 274 are four-division dies for forming and processing dynamic pressure generating grooves 281, 282, 283, 284, 285, 286, 287, and 288 of herringbone shape in the outer circumference of the bearing support shaft 142. The forming procedure is explained according to the flowchart in FIG. 32. First, at step S321, in the dies (not shown) for forming a bearing support shaft 142, a thermoplastic material such as glass, liquid crystal polymer or PPS (polyphenylene sulfide) is poured, and the bearing support shaft is formed. At step S322, when the forming part is cooled to a specified temperature and the material is solidified to a certain extent, the dies are parted. At step S323, patterns carved symmetrically to the dynamic pressure generating grooves 282, 284, 286, and 288 of a first group of herringbone shape to be formed on the quarter columnar arc surfaces of the radial dynamic pressure generating groove forming dies 271, 272, 273, and 274 are disposed oppositely to the specified positions on the outer circumference of the bearing support shaft 142. At step S324, to form dynamic pressure generating grooves in the outer circumference of the bearing support shaft 142, the dies are pressed with a specified load from the diagonal directions. After the dynamic pressure generating grooves of the first group are formed, at step S325, the radial dynamic pressure generating groove forming dies 271, 272, 273, and 274 are drawn in the arrow direction in FIG. 30 and FIG. 31, and parted. As a result, by the division line portion of the dies shown in sawtooth shape in FIG. 30, since the radial dynamic pressure generating groove forming dies 271, 272, 273, and 274 are designed and fabricated so that the four die division lines generated at the time of parting may coincide with dynamic pressure generating grooves 281, 283, 285, and 287 of a second group, eight dynamic pressure generating grooves are formed together with the four dynamic pressure generating grooves 282, 284, 286, and 288 of the first group formed from the dies.

Therefore, by this processing method, same as in the above case of forming the dynamic pressure generating grooves in the rotary shaft, without using large or complicated processing apparatus, the grooves for generating dynamic pressures can be formed precisely in the outer circumference of the bearing support shaft at low cost.

The bearing support shaft 142 thus forming the dynamic pressure generating grooves 281, 282, 283, 284, 285, 286, 287, and 288 in the outer circumference in this manner is affixed to the base 10. By freely inserting, together with a lubricant, the bearing support shaft 142 into the circular hole of the rotary cylindrical part 141 of the rotary disk 6 integrally forming the disk unit 4 having the information recording medium layer on the principal plane 2 and the rotary cylindrical part 141 of cylindrical shape, a spindle motor for information recording and reproducing apparatus can be assembled. The detailed description of the configuration of the spindle motor is omitted herein because it is same as the configuration using the bearing support shaft having dynamic pressure generating grooves formed in this processing method in the second exemplary embodiment.

Using the spindle motor composed of the rotary disk or bearing support shaft fabricated in these methods, an information converting element such as an optical pickup having a magnetic head mounted on a slider or an objective lens for focusing the light, and oscillating means for positioning the information converting element at a specified position of the information recording medium layer, by recording and reproducing on the information recording medium layer on the rotary disk by a known method, an information recording and reproducing apparatus realizing a high recording density in reduced size and thickness is composed same as in the first exemplary embodiment, second exemplary embodiment, and third exemplary embodiment.

Thus, according to the fourth exemplary embodiment, dynamic pressure generating grooves can be formed precisely as the radial bearing, without requiring any particular holding tool on the rotary shaft of the rotary disk or outer circumference of the bearing support shaft, without using large or complicated processing apparatus, and at low cost. Therefore, the spindle motor having the radial fluid bearing formed in this method is high in precision of rotation and is manufactured at low cost.

Fifth Exemplary Embodiment

Figure 33:
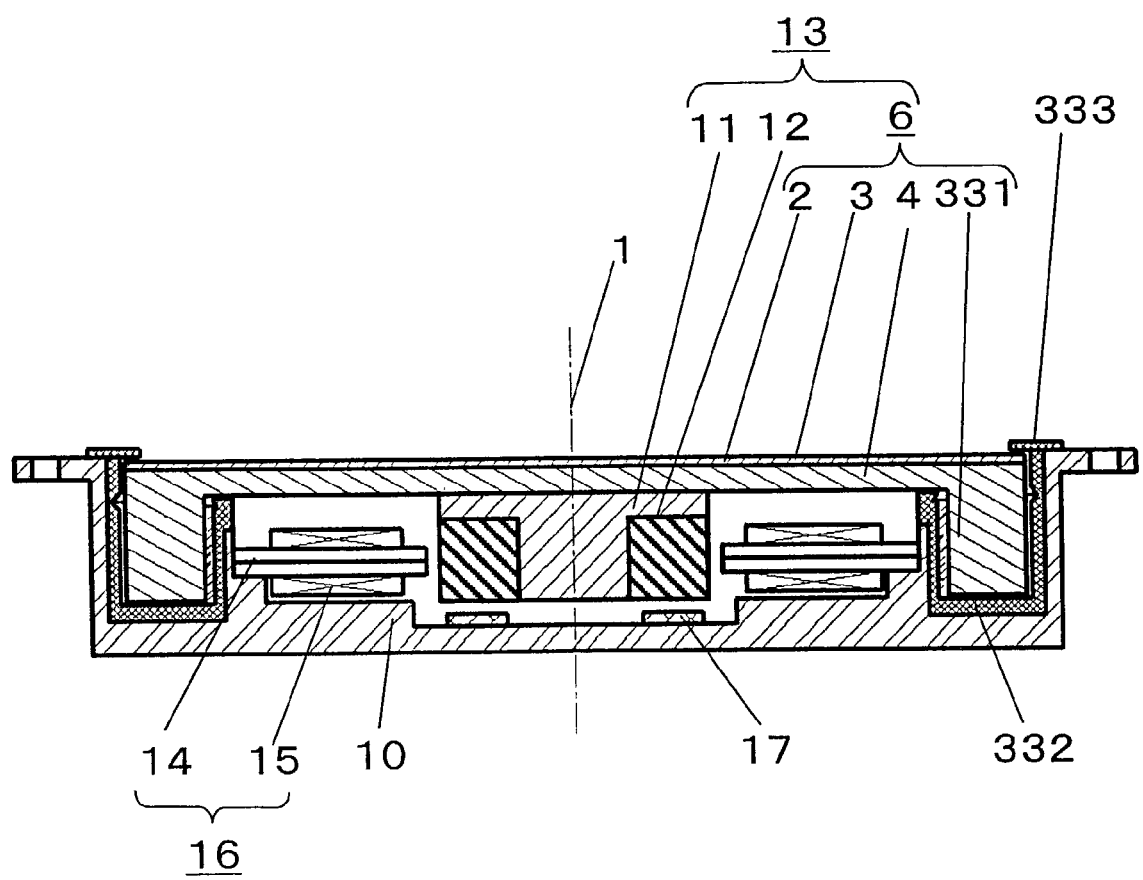
FIG. 33 is a sectional view showing principal parts of a spindle motor in a fifth exemplary embodiment of the invention.
Figure 34:
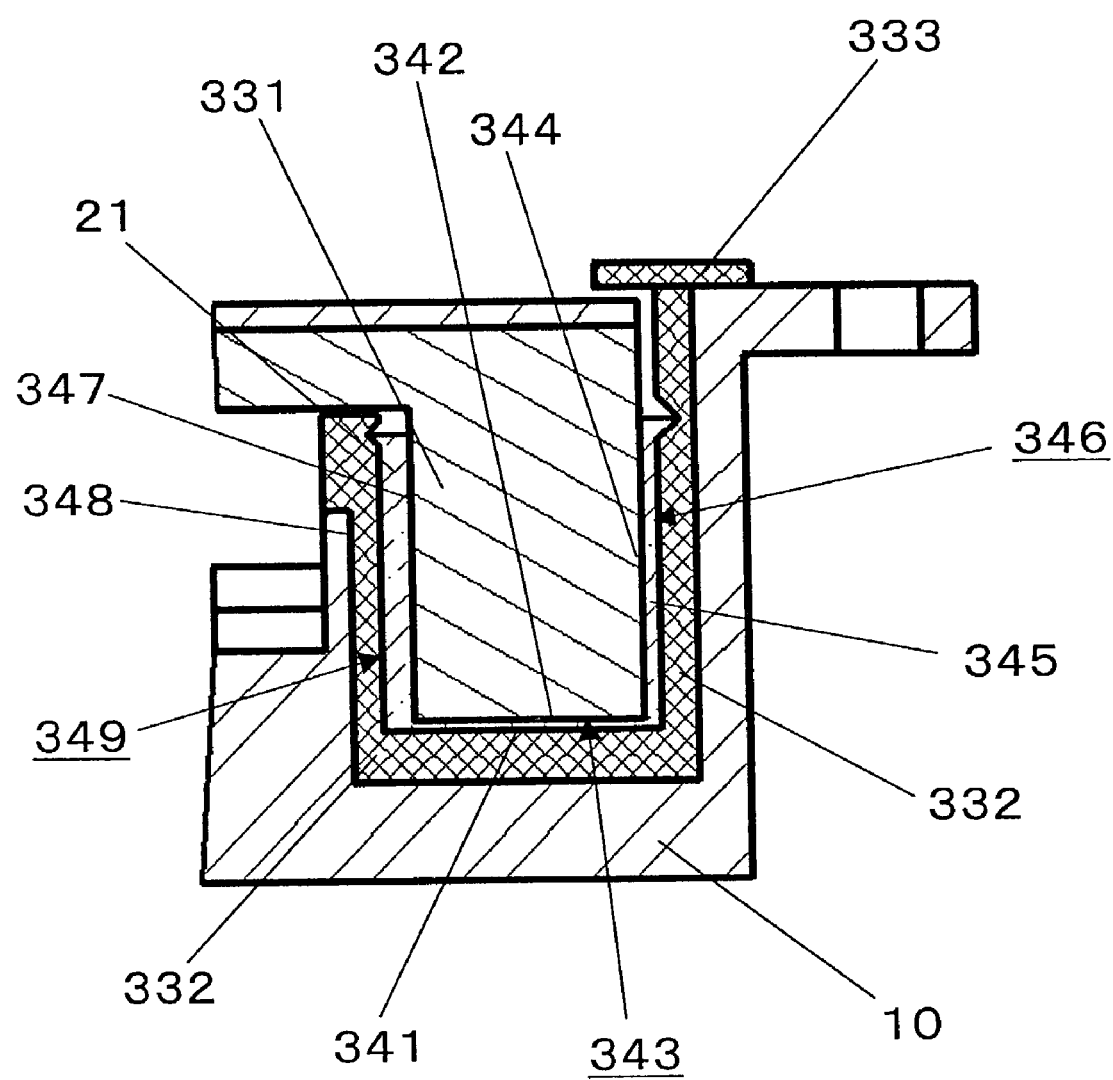
FIG. 34 is a partially magnified view of a part of the spindle motor in the fifth exemplary embodiment of the invention.
Figure 35:
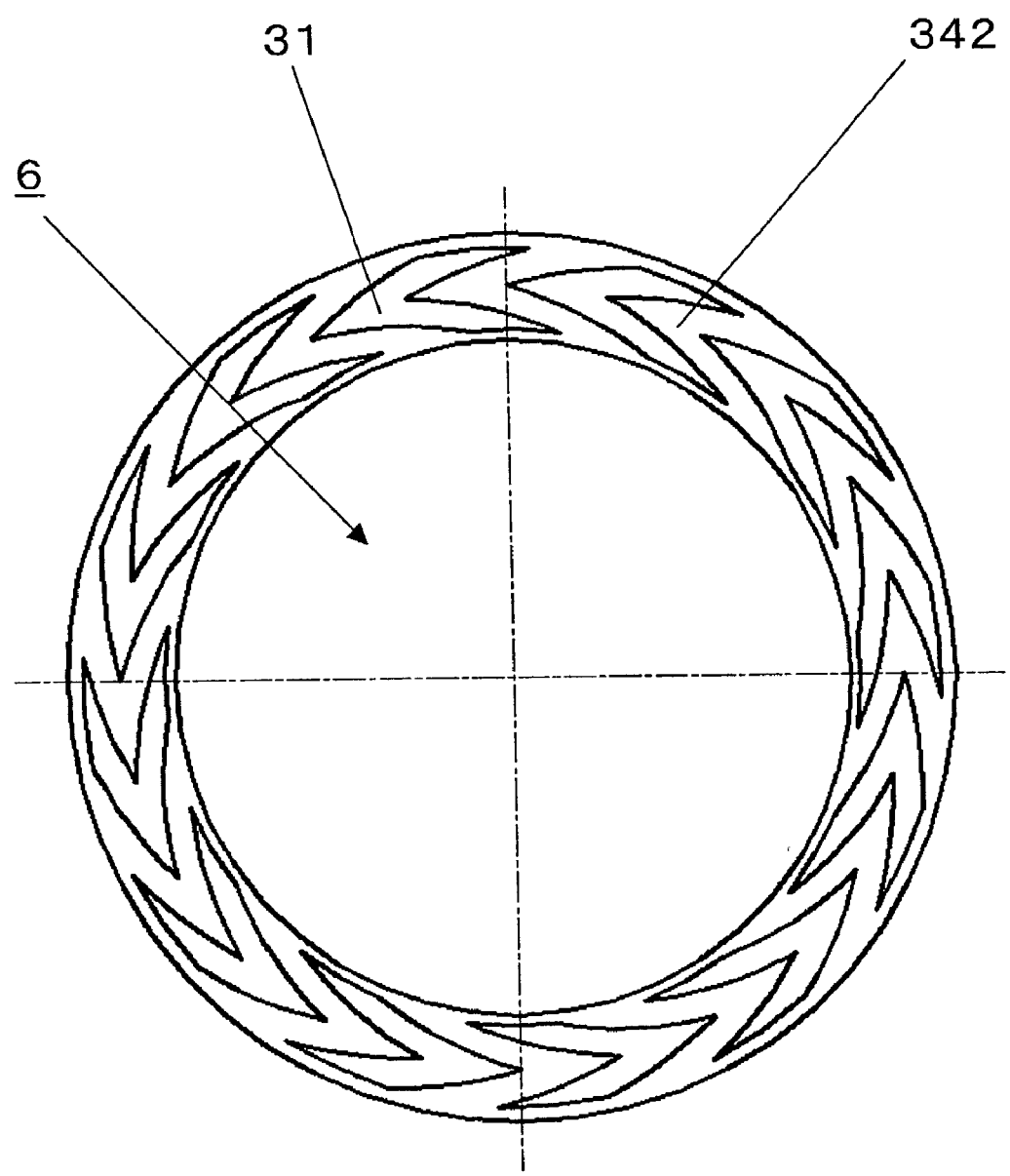
FIG. 35 is a back side plan view of rotary disk of the spindle motor in the fifth exemplary embodiment of the invention.

FIG. 33, FIG. 34, and FIG. 35 are diagrams schematically explaining the configuration of principal parts of a spindle motor used in an information recording and reproducing apparatus in a fifth exemplary embodiment of the invention, and specifically FIG. 33 is a schematic sectional view of principal parts of the spindle motor, FIG. 34 is a partially magnified view of a part of FIG. 33, and FIG. 35 is a schematic plan view of a rotary disk of the invention as seen from the opposite side. In FIG. 33, FIG. 34, and FIG. 35, elements corresponding to the constituent elements in FIG. 1A in the first exemplary embodiment are identified with same reference numerals as in FIG. 1A.

In FIG. 33, a disk unit 4 forming an information recording medium layer 3 on a principal plane 2 vertical to the rotation center axis 1, and an annular protuberance 331 projecting in a direction at the opposite side of the principal plane 2 along the outer peripheral edge are formed integrally, and a rotary disk 6 is composed. Further, at the opposite side of the principal plane 2 of the rotary disk 6, that is, at the lower side of the disk unit 4 at the annular protuberance 331 side, a rotor yoke 11 is affixed, and an annular rotary magnet 12 magnetized in plural poles is affixed to the rotor yoke 11 by adhering or other method. A rotating element 13 is composed of the rotary disk 6, rotor yoke 11, and rotary magnet 12. On the other hand, a stator 16 having a coil 15 wound on an iron core 14 is affixed to the base 10 by press-fitting, adhering or other method. On the base 10, further, a ring-shaped fixed side bearing 332 of a U-section is affixed, which has a recess composed of a concave upper flat surface facing the lower end of the annular protuberance 331 of the rotary disk 6, a concave outer side inner circumference facing the inner circumference of the protuberance 331 across a tiny gap, and a concave inner side inner circumference facing the inner circumference of the protuberance across a tiny gap, and the protuberance 331 of the rotary disk 6 is inserted into the recess of the fixed side bearing 332, and the rotary magnet 12 and the iron core 14 wound with the coil are disposed oppositely to each other across a gap. Further, as shown in the partially magnified view in FIG. 34, the tiny gap between the annular protuberance 331 and the recess of the fixed side bearing 332 is packed with a dynamic pressure lubricant 21 such as ester compound synthetic oil. Further, facing the lower end face in the axial direction of the rotary magnet 12, a thrust attraction plate 17 is affixed to the base 10, and the same thrust attracting means as in the first exemplary embodiment is disposed, and a magnetic attracting force is generated by the thrust generating means for attracting the rotating element 13 to the fixed side bearing 332 side.

As shown in FIG. 34 and FIG. 35, a thrust bearing 343 is composed by forming dynamic pressure generating grooves 31 at the lower end face 342 of the annular protuberance 331 of the rotary disk 6 facing the concave upper flat surface 341 of the fixed side bearing 332, and a radial bearing 346 is composed by forming dynamic pressure generating grooves (not shown) in the concave outer side inner circumference 345 of the fixed side bearing 332 facing the outer circumference 344 of the annular protuberance 331 of the rotary disk 6. Further, a fall preventive cover 333 is affixed to the top of the base 10 by adhering or other method, and a part of it is designed to cover by forming a tiny gap against the outer peripheral edge of the principal plane 2 of the rotary disk 6, so that the rotary disk 6 will not be dislocated from the fixed side bearing 332 even in the event of a strong impact of falling or the like. Although not shown, the fall preventive cover 333 may be affixed to the upper side of the fixed side bearing 332, instead of the base 10.

By supplying an electric current to the coil 15, as known well, the rotary magnet 12 rotates, that is, the rotary disk 6 is put in rotation, and by rotation of the annular protuberance 331, a dynamic pressure is generated in the dynamic pressure lubricant 21. As a dynamic pressure is generated in the dynamic pressure lubricant 21, the fixed side bearing 332 and protuberance 331 of the rotary disk 6 receive a dynamic pressure in the radial direction and axial direction, and the rotary disk 6 rotates smoothly about the rotation center axis 1, so that a spindle motor ideal for driving an information recording and reproducing apparatus is composed.

Instead of forming the dynamic pressure generating grooves 31, as the thrust bearing, at the lower end face 342 of the annular protuberance 331 of the rotary disk 6 facing the concave upper flat surface 341 of the fixed side bearing 331 as in this exemplary embodiment, same effects are obtained by forming the dynamic pressure generating grooves in the concave upper flat surface 341 of the fixed side bearing 332 facing the lower end face 342 of the annular protuberance 331 of the rotary disk 6. The dynamic pressure generating grooves are formed in the same shape as the dynamic pressure generating grooves formed in the lower end face 342 of the protuberance 331 of the rotary disk 6 facing the concave upper flat surface 341 of the fixed side bearing 332. As the radial bearing 346, instead of forming dynamic pressure generating grooves (not shown) in the concave outer side inner circumference 345 of the fixed side bearing 332, dynamic pressure generating grooves may be formed in the outer circumference 344 of the annular protuberance 331 of the rotary disk 6 facing the concave outer side inner circumference 345 of the fixed side bearing 332.

Further, instead of composing, the radial bearing by forming dynamic pressure generating grooves either in the concave outer side inner circumference 345 of the fixed side bearing 332 or the outer circumference 344 of the annular protuberance 331 of the rotary disk 6 facing the concave outer side inner circumference 345 of the fixed side bearing 332, as the radial fluid bearing as in the fifth exemplary embodiment, as shown in FIG. 34, a radial bearing 349 may be composed by forming dynamic pressure generating grooves (not shown) either in the inner circumference 347 of the annular protuberance 331 of the rotary disk 6 or the concave inner side inner circumference 348 of the fixed side bearing 332 facing the inner circumference of the annular protuberance 331 of the rotary disk 6.

In the explanation herein, the fixed side bearing 332 and base 10 are shown as separate members, but, although not shown, the fixed side bearing 332 and base 10 may be formed integrally and used as a single member, and by forming integrally, the size and thickness can be further reduced.

Effects and actions by generating a magnetic attracting force by the thrust attracting means are same as in the first exemplary embodiment, and specific description is omitted.

By using the thrust attracting means such as thrust attraction plate 17 facing the lower end face of the rotary magnet 12, or by filling the gap formed by the recess of the fixed side bearing 332 and the annular protuberance 331 of the rotary disk 6 is the dynamic pressure lubricant 21, the annular protuberance 331 of the rotary disk 6 will not be dislocated from the recess of the fixed side bearing 332, in spite of any difference in position of the information recording and reproducing apparatus, and the dynamic pressure lubricant 21 is not used up, and these actions and effects are also same as in the first exemplary embodiment.

Same as in the first exemplary embodiment, the motor may be also composed as so-called radial gap type outer rotor motor, or so-called axial gap type motor. The configuration of the radial gap type outer rotor motor and axial gap type motor is explained below.

Figure 36:
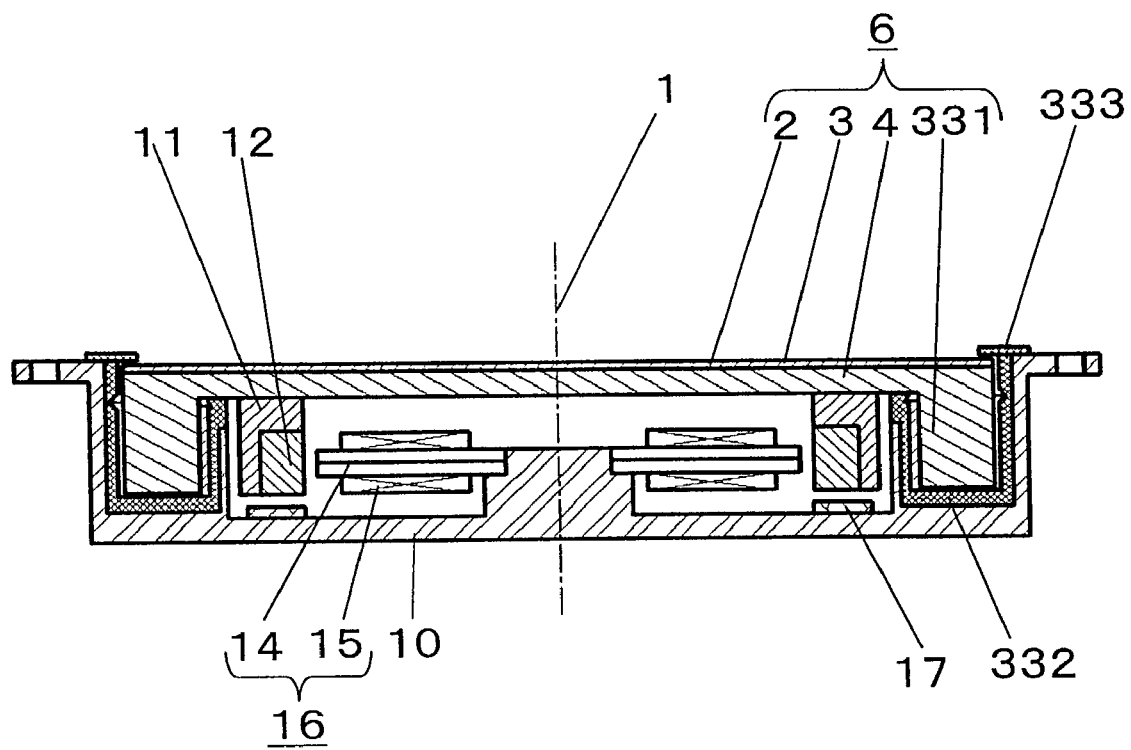
FIG. 36 is a sectional view showing principal parts of an outer rotor type motor in the fifth exemplary embodiment of the invention.

FIG. 36 is a diagram explaining the radial gap type outer rotor motor, showing a schematic sectional view of principal parts of the radial gap type outer rotor motor. In FIG. 36, elements corresponding to the constituent elements in FIG. 33 are identified with same reference numerals as in FIG. 33.

In FIG. 36, an iron core 14 wound with a coil 15 is affixed to a base 10 by press-fitting, adhering or other method, and an annular rotary magnet 12 affixed to a rotor yoke 11 is affixed to a rotary disk 6 by adhering or other method, and the outer circumference of the iron core 14 and the inner circumference of the rotary magnet 12 are disposed oppositely to each other. The other aspects are same as in the radial gap type inner rotor motor in FIG. 33, and detailed description is omitted.

Figure 37:
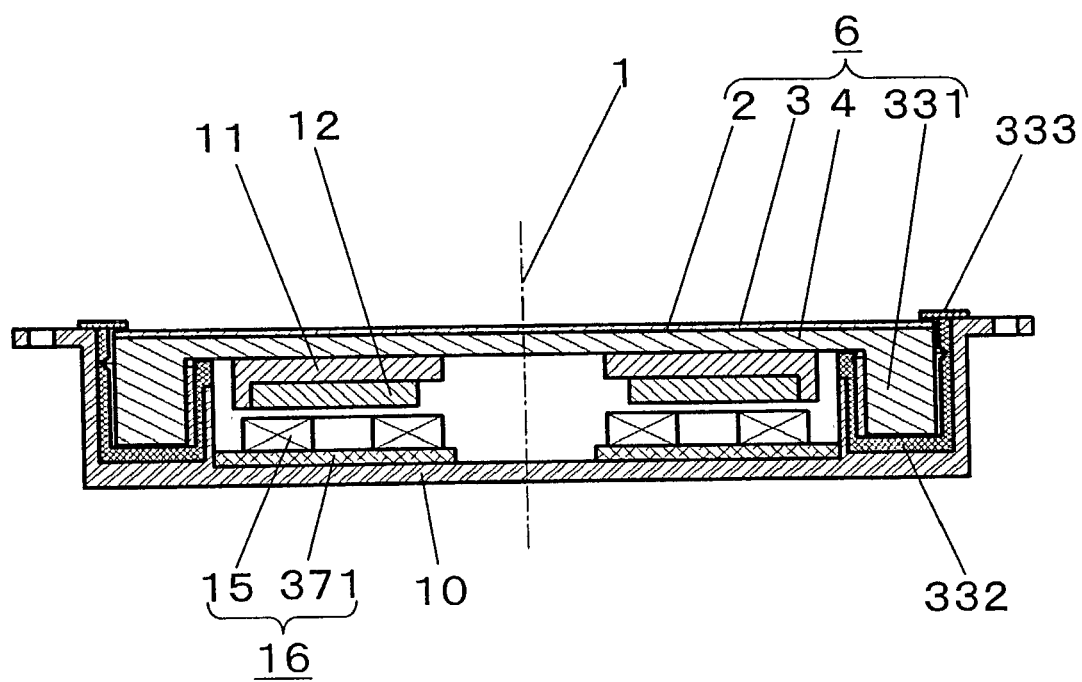
FIG. 37 is a sectional view showing principal parts of an axial gap type motor in the fifth exemplary embodiment of the invention.

FIG. 37 is a diagram explaining the axial gap type motor, showing a schematic sectional view of principal parts of the axial gap type motor. In FIG. 37, elements corresponding to the constituent elements in FIG. 33 are identified with same reference numerals as in FIG. 33.

In FIG. 37, a rotor yoke 11 is affixed to the annular protuberance 331 side of the rotary disk 6 by adhering or other method, and an annular rotary magnet 12 magnetized in plural poles is affixed to the rotor yoke 11 similarly by adhering or other method. On the other hand, for example, on a printed wiring board 371, a stator 16 wound with a plurality of coils 15 in triangular shape is affixed to a base 10, and the rotary magnet 12 and coil 15 are disposed oppositely to each other while forming a gap in the axial direction. The other aspects are same as in the radial gap type inner rotor motor in FIG. 33, and detailed description is omitted.

In various spindle motors of the fifth exemplary embodiment (radial gap type inner rotor motor, radial gap type outer rotor motor, and axial gap type motor), the assembly by inserting the annular protuberance 331 of the rotary disk 6 into the recess of the fixed side bearing 332 is same as in the first exemplary embodiment, and it is briefly explained below. A specified amount of the dynamic pressure lubricant is weighed, and a part of it is dropped into the recess of the fixed side bearing 332, and the fixed side bearing 332 is put into a vacuum chamber in this state, and is evacuated. After holding the evacuated state for a specified time, the evacuated state is once released, and returned to an atmospheric pressure. Further, the rest of the specified amount of the dynamic pressure lubricant is dropped into the fixed side bearing 332, and the protuberance 331 of the rotary disk is inserted into the recess of the fixed side bearing 332 in vacuum state, and this state is held for a specific time. Then by returning to an atmospheric pressure, the assembly is completed. The actions and effects of assembling in this method are same as in the first exemplary embodiment, and detailed description is omitted.

In the fifth exemplary embodiment, the thrust bearing rigidity is very large because the thrust bearing is composed by forming dynamic pressure generating grooves either in the lower end face 342 of the annular protuberance 331 projecting along the outer peripheral edge of the rotary disk 6 or the concave upper flat surface 341 of the fixed side bearing 332 facing the lower end face 342 of the annular protuberance 331 of the rotary disk 6. It is relatively easy to expand the area for forming the dynamic pressure generating grooves, and the thrust bearing rigidity can be easily increased. Therefore, same as in the first exemplary embodiment and second exemplary embodiment, if the motor is reduced in size, a high thrust rigidity is obtained, and the disk surface deflection of a higher precision is realized. The effects of forming the rotary disk 6 by integrally forming the disk unit 4 having the information recording medium layer on the principal plane and the protuberance 331 for composing the thrust bearing, and other effects are same as in the foregoing first exemplary embodiment and second exemplary embodiment, and specific description is omitted.

Using the spindle motor explained in the fifth exemplary embodiment, an information converting element such as an optical pickup (not shown) having a magnetic head (not shown) mounted on a slider or an objective lens for focusing the light, and oscillating means (not shown) for positioning the information converting element at a specified position of the information recording medium layer, by recording and reproducing on the information recording medium layer on the rotary disk by a known method, an information recording and reproducing apparatus realizing a high recording density in reduced size and thickness is composed same as in the first exemplary embodiment, second exemplary embodiment, third exemplary embodiment, and fourth exemplary embodiment.

Thus, according to the fifth exemplary embodiment, the same effects as in the first exemplary embodiment, second exemplary embodiment, third exemplary embodiment, of which detail is not explained herein. Among other effects, by forming the thrust bearing near the peripheral edge of the rotary disk, the thrust bearing rigidity can be notably increased, and a disk surface deflection of a very high precision is realized, and further the vibration outside of plane can be suppressed substantially. At the same time, deflection in the radial direction to the rotation center axis is kept very small, deviation between the rotation center of servo signal preliminarily transferred to the rotary disk and rotation center during actual operation of the rotary disk is suppressed, and therefore a spindle motor suited to high density recording may be realized. Moreover, since the radial bearing is composed on the outer circumference of the rotary disk, the bearing diameter is larger, the radial bearing rigidity is higher, and hence the radial axial length can be shortened, so that the thickness can be reduced. Further, by composing the radial bearing and thrust bearing by the rotary disk and fixed side bearing on the outer circumference of the rotary disk, the rotary shaft and rotor hub of the motor in the prior art can be omitted, and the number of parts can be curtailed, and in the omitted space, the rotary magnet affixed to the rotor yoke and stator facing the rotary magnet can be disposed, so that the spindle motor in the configuration suited to smaller size and smaller thickness can be realized.

Further, by having the spindle motor of such configuration, the size and thickness can be reduced, and an information recording and reproducing apparatus suited to high density recording may be realized.

The foregoing first to fifth exemplary embodiments of the invention mainly relate to examples of the spindle motor used in the information recording and reproducing apparatus for recording and reproducing magnetically by the magnetic head in the information recording medium layer of the disk unit, or for recording and reproducing optically by the optical pickup, and the manufacturing method of such spindle motor, and the information recording and reproducing apparatus having such spindle motor, but the invention is not limited to these examples alone. For example, as far as the recording system handles non-converting medium, such as the magneto-optical recording system or recording system making use of phase change, the invention includes any information recording and reproducing apparatus using disk type information recording medium of any system.

Thus, according to the spindle motor of the invention, as compared with the apparatus of conventional structure in which the disk is coupled to the flange of the rotor hub of the motor for driving the disk, by integrally forming the disk unit and the rotary shaft or rotary cylindrical part, or forming so as to be integral, the squareness of the principal plane of the disk unit holding the information recording medium layer to the rotation center axis can be realized at a very high precision. Therefore, surface deflection by defective squareness can be notably decreased, and the vibration outside of plane can be suppressed, and the recording density can be enhanced. At the same time, since the deflection in the radial direction to the center of rotation can be suppressed, it is possible to suppress the position deviation between the center of rotation of the servo signal preliminarily recorded to follow up precisely to concentric plural recording tracks and the center of rotation during actual operation of the disk unit, so that a high recording density may be realized. Further, it does not require the member for clamping the disk in the flange of the rotor of the motor for driving the disk or the rotor hub itself, and the number of constituent members can be curtailed substantially, so that the spindle motor may be reduced in thickness and lowered in cost.

Further, by composing the thrust bearing by forming dynamic pressure generating grooves either in the opening side end face of the bearing sleeve or the lower side of the rotary disk facing the same as in the configuration of the first exemplary embodiment, or either in the opening side end face or the rotary cylindrical part or the upper side of the base facing this opening side face as in the configuration of the second exemplary embodiment, the position for forming the dynamic pressure generating grooves is longer in the distance in the radial direction from the center of rotation than in the prior art. Therefore, the bearing rigidity is higher as the thrust bearing, the rotation precision of the rotary disk is higher, so that a thrust bearing stable in operation can be formed. Moreover, since the bearing rigidity as the thrust bearing is higher, the axial length of the radial bearing can be shortened, and it is effective to reduce the thickness of the spindle motor.

Alternatively, as in the configuration of the first exemplary embodiment of the invention, the first thrust bearing is composed by forming the first dynamic pressure generating grooves either in the opening side end face of the bearing sleeve or the lower side of the rotary disk facing it, and the second thrust bearing is composed by forming the second dynamic pressure generating grooves either in the upper end of the thrust support plate facing the lower side of the rotary shaft or the lower side of the rotary shaft. Or, as in the configuration of the second exemplary embodiment, the first thrust bearing is composed by forming the first dynamic pressure generating grooves either in the opening side end face of the rotary cylindrical part or the upper side of the base unit facing this opening side end face, and the second thrust bearing is composed by forming the second dynamic pressure generating grooves either in the lower side of the rotary disk facing the upper side of the rotary support shaft or the upper side of the rotary disk.

In the spindle motor having such configuration, the bearing rigidity as the thrust bearing is much higher, and a high thrust bearing rigidity is obtained if the motor is reduced in size. Therefore, the surface deflection and axial center deflection of rotary disk of very high precision can be obtained, and a spindle motor suited to recording and reproducing at very high recording density is realized. Further, since the bearing rigidity is higher as the thrust bearing, the axial length of the radial bearing is shortened, so that effects are obtained in reduction of thickness of the spindle motor.

Further, by forming the annular first lubricant sump and taper (slope) either in the inner circumference of the rotor yoke affixed to the rotary disk in the configuration composed of the rotary shaft of the rotary disk and the bearing sleeve of the fixed side bearing, or in the cylindrical member affixed to the base in the configuration composed of the rotary cylindrical part of the rotary disk and the bearing support shaft affixed to the base, the dynamic pressure lubricant forced out by impact, thermally expanded by temperature rise, or forced out due to impact in a thermally expanded state due to temperature rise, moves along the taper by the centrifugal force by rotation of the rotor yoke, and returns to the first lubricant sump. Therefore, the dynamic pressure lubricant does not scatter outside of the motor to reach and stain the rotary disk, so that it is free from contamination of the information recording medium layer or ruin of recorded data, and a spindle motor of a high reliability is realized. In particular, the bearing structure in the first exemplary embodiment and second exemplary embodiment of the invention is very effective for the spindle motor reduced in size and thickness, so that very beneficial effects are obtained for enhancing the reliability.

In the processing method of forming the dynamic pressure generating grooves for composing the radial bearing in the spindle motor of the invention in the rotary shaft of the rotary disk or in the outer circumference of the bearing support shaft affixed to the base, by processing same as in the ordinary forming process by using dies for forming radial dynamic pressure generating grooves of four-division dies for forming and processing dynamic pressure generating grooves in herringbone shape, without requiring special holding tool, or large or complicated processing apparatus, or at low cost, grooves for generating dynamic pressure can be formed precisely in the rotary shaft or bearing support shaft, and an outstanding effect is obtained for fabricating a spindle at low cost.

According to the spindle motor of the invention, the protuberance of the rotary disk of the annular protuberance projecting in the direction of the opposite side of the principal plane along the outer peripheral edge to the disk being formed integrally in the rotary disk is inserted into the recess of the ring-shaped fixed side bearing of U-section, and a thrust bearing is composed by forming dynamic pressure generating grooves either in the lower end face of the protuberance of the rotary disk or the concave upper flat surface of the fixed side bearing facing the lower end face of the protuberance, thereby forming the rotary disk integrally forming the disk unit and protuberance, and therefore aside from the suppressing effects of the surface deflection and axial center deflection, it is also possible to form the thrust bearing near the peripheral edge of the rotary disk, and the thrust bearing rigidity can be notably increased, and the surface deflection of the disk of very high precision is realized, and further the vibration outside of plane can be suppressed significantly. At the same time, deflection in the radial direction with respect to the rotation center axis can be suppressed, and deviation of the center of rotation during actual operation of the rotary disk with respect to the center of rotation of the servo signal preliminarily transferred to the rotary disk can be suppressed, so that a spindle motor suited to high recording density can be realized. Incidentally, since the radial bearing is composed on the outer circumference of the rotary disk, the bearing diameter is larger, and the radial bearing rigidity is higher. Therefore, the length of the radial bearing is shortened, and the thickness is reduced. Further, by composing the radial bearing and thrust bearing by the rotary disk and fixed side bearing at the outer circumference of the rotary disk, the rotary shaft of the motor in the prior art can be omitted, and the number of parts can be curtailed, and further in the vacated space, the rotary magnet affixed to the rotor yoke and the stator opposite to the rotary magnet can be installed, so that it is effective for obtaining a spindle motor in a configuration suited to reduction of size and thickness.

Further, in the spindle motor of the invention, by the thrust attracting means such as thrust attraction plate disposed oppositely to the lower end face of the rotary magnet, a magnetic attracting force is generated to attract the rotating element magnetically to the fixed side bearing or bearing support shaft, and therefore if the oil viscosity is lowered at high temperature, the bearing rigidity of the thrust bearing is not lowered relatively as compared with the level at the time of low temperature, but it is slightly higher at high temperature. As a result, the bearing rigidity of the thrust bearing is not lowered even in high temperature region, and effects are obtained in realization of spindle motor having surface deflection and axial center deflection of high precision.

The information recording and reproducing apparatus of the invention comprises the rotary disk integrally forming the disk unit and rotary shaft, rotary cylindrical part, or protuberance, a spindle motor of small and thin type having a thrust bearing of high thrust rigidity, an information converting element such as optical pickup having a magnetic head mounted on a slider or an objective lens for focusing the light, and oscillating means for positioning the information converting element at a specified position of an information recording medium layer, and by recording and reproducing in the information recording medium on the rotary disk, marked effects are obtained for realization of the information recording and reproducing apparatus of smaller size, smaller thickness, and higher recording density.

What is claimed is:

1. A spindle motor comprising:
   a rotary disk including a disk unit, with a rotary shaft, and an information recording layer above said disk unit, the information recording layer being attached from an underside thereof
   a rotor yoke attached to said rotary disk below said rotary disk;
   a rotary magnet affixed to said rotor yoke;
   a bearing unit, including a fixed side bearing member that includes a bearing sleeve and a thrust supporting plate, wherein a plurality of dynamic pressure generating grooves are formed in a) one of an outer circumference of the rotary shaft or an inner circumference of the bearing sleeve, and b) in one of a bottom of said rotary shaft or an upper surface of the thrust supporting plate; and
   thrust attracting means for attracting said rotor yoke and said rotary magnet to a side of the fixed side bearing member.

2. The spindle motor of claim 1,
   wherein said rotary disk is an integrated structure comprising said disk unit and said rotary member.

3. The spindle motor of claim 2, further comprising
   a lubricant sump in an inner circumference of an annular wall of said rotor yoke.

4. The spindle motor of claim 3,
   wherein the inner circumference of the annular wall of the rotor yoke is tapered, said taper being wider at said lubricant sump than near an opening of said rotor yoke.

5. The spindle motor of claim 1, further comprising
   a lubricant sump in an inner circumference of an annular wall of said rotor yoke.

6. The spindle motor of claim 5,
   wherein the inner circumference of the annular wall of the rotor yoke is tapered, said taper being wider at said lubricant sump than near an opening of said rotor yoke.

7. The spindle motor of claim 1, wherein said rotary shaft rotates said side bearing member.

8. The spindle motor of claim 7,
   wherein said rotary disk includes an integrated structure comprising said disk unit and said rotary shaft.

9. The spindle motor of claim 8, wherein the inner circumference of the annular wall of the rotor yoke is tapered, said taper being wider at said lubricant sump than near an opening of said rotor yoke.

10. The spindle motor of claim 1, wherein said rotary shaft is a cylindrical member which rotates about said side bearing member.

11. The spindle motor of claim 10,
    wherein said rotary disk includes an integrated structure comprising said disk unit and said rotary shaft.

12. The spindle motor of claim 10, further comprising a lubricant sump in an inner circumference of the said annular wall of the rotary disk.

13. The spindle motor of claim 12,
    wherein the inner circumference of the annular wall is tapered, said taper being wider at said lubricant sump than near an opening side lower end of said annular wall.

14. The spindle motor of claim 1, wherein the plurality of dynamic pressure generating grooves in one of the outer circumference of the rotary shaft or in the inner circumference of the bearing sleeve are disposed in the outer circumference of the rotary shaft.

* * * * *